(12) United States Patent
Gocho

(10) Patent No.: US 8,742,890 B2
(45) Date of Patent: *Jun. 3, 2014

(54) IMAGE ACQUISITION SYSTEM AND METHOD OF AUTHENTICATING IMAGE ACQUISITION DEVICE IN THE IMAGE ACQUISITION SYSTEM

(75) Inventor: Nagahiro Gocho, Hachioji (JP)

(73) Assignee: Olympus Corporation, Tokyo (JP)

( * ) Notice: Subject to any disclaimer, the term of this patent is extended or adjusted under 35 U.S.C. 154(b) by 1316 days.

This patent is subject to a terminal disclaimer.

(21) Appl. No.: 12/548,329

(22) Filed: Aug. 26, 2009

(65) Prior Publication Data

US 2009/0315671 A1 Dec. 24, 2009

Related U.S. Application Data

(63) Continuation of application No. PCT/JP2008/053429, filed on Feb. 27, 2008.

(30) Foreign Application Priority Data

Feb. 28, 2007 (JP) ................................ 2007-050387

(51) Int. Cl.
*G05B 19/00* (2006.01)
(52) U.S. Cl.
USPC ........ 340/5.8; 340/12.22; 396/56; 348/207.1; 348/211.2
(58) Field of Classification Search
USPC ........ 340/5.1, 5.2, 5.53, 5.54, 5.55, 5.8, 5.81; 348/211.2, 207.1; 235/375
See application file for complete search history.

(56) References Cited

U.S. PATENT DOCUMENTS

| | | | |
|---|---|---|---|
| 2002/0032911 A1* | 3/2002 | Tanaka et al. | 725/153 |
| 2005/0001024 A1 | 1/2005 | Kusaka et al. | |
| 2005/0052569 A1* | 3/2005 | Ibaraki et al. | 348/375 |
| 2008/0303909 A1* | 12/2008 | Watanabe et al. | 348/211.2 |

FOREIGN PATENT DOCUMENTS

| | | |
|---|---|---|
| EP | 1 003 069 A2 | 5/2000 |
| JP | 5-45667 U | 6/1993 |
| JP | 2005-42398 A | 2/2005 |
| JP | 2006-157686 A | 6/2006 |
| JP | 2006-180140 A | 7/2006 |

OTHER PUBLICATIONS

International Preliminary Report on Patentability and Written Opinion (in English) dated Sep. 11, 2009 issued in a counterpart International Application No. PCT/JP2008/053429.
English Language International Search Report dated Apr. 15, 2008 issued in parent Appln. No. PCT/JP2008/053429.

* cited by examiner

*Primary Examiner* — Nabil Syed
(74) *Attorney, Agent, or Firm* — Holtz Holtz Goodman & Chick PC

(57) ABSTRACT

An image acquisition system includes an image acquisition device and a commanding device configured as a member separate from the image acquisition device to transmit a command to the image acquisition device for controlling the image acquisition device in such a manner as to permit the image acquisition device to operate in response to the command. The image acquisition device transmits to the commanding device identification information permitting the image acquisition device to identify the commanding device. The commanding device receives the transmitted identification information and transmits a command with authentication information contains authentication information permitting the image acquisition device to authenticate the commanding device, the authentication information containing one of the received identification information and information derived from the identification information.

43 Claims, 38 Drawing Sheets

| Type | Authentication mode switch | Image acquisition and other operation | How to use | Example of remote controller |
|---|---|---|---|---|
| Common remote controller (without authentication information) (without identification information light-receiving unit) | No function | Command containing no authentication information | Permit or limit mode | 92 94 |
| Authentication mode switching remote controller (with authentication information) | Only authentication mode switching command has authentication information | Command with authentication information | Command containing no authentication information (used by switching to permit mode or limit mode) | Can be set to permit or limit mode for image acquisition, etc. and to prohibit mode for carrying or holding devices | 12 74 |
| Authentication command remote controller (with authentication information) | All commands have authentication information | Command with authentication information | Command with authentication information | Usable also in prohibit mode | 96 |

FIG. 4

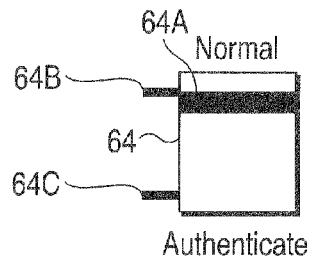

FIG. 5A

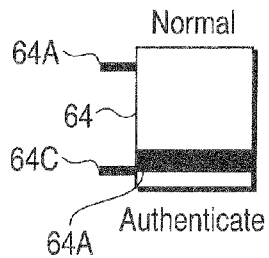

FIG. 5B

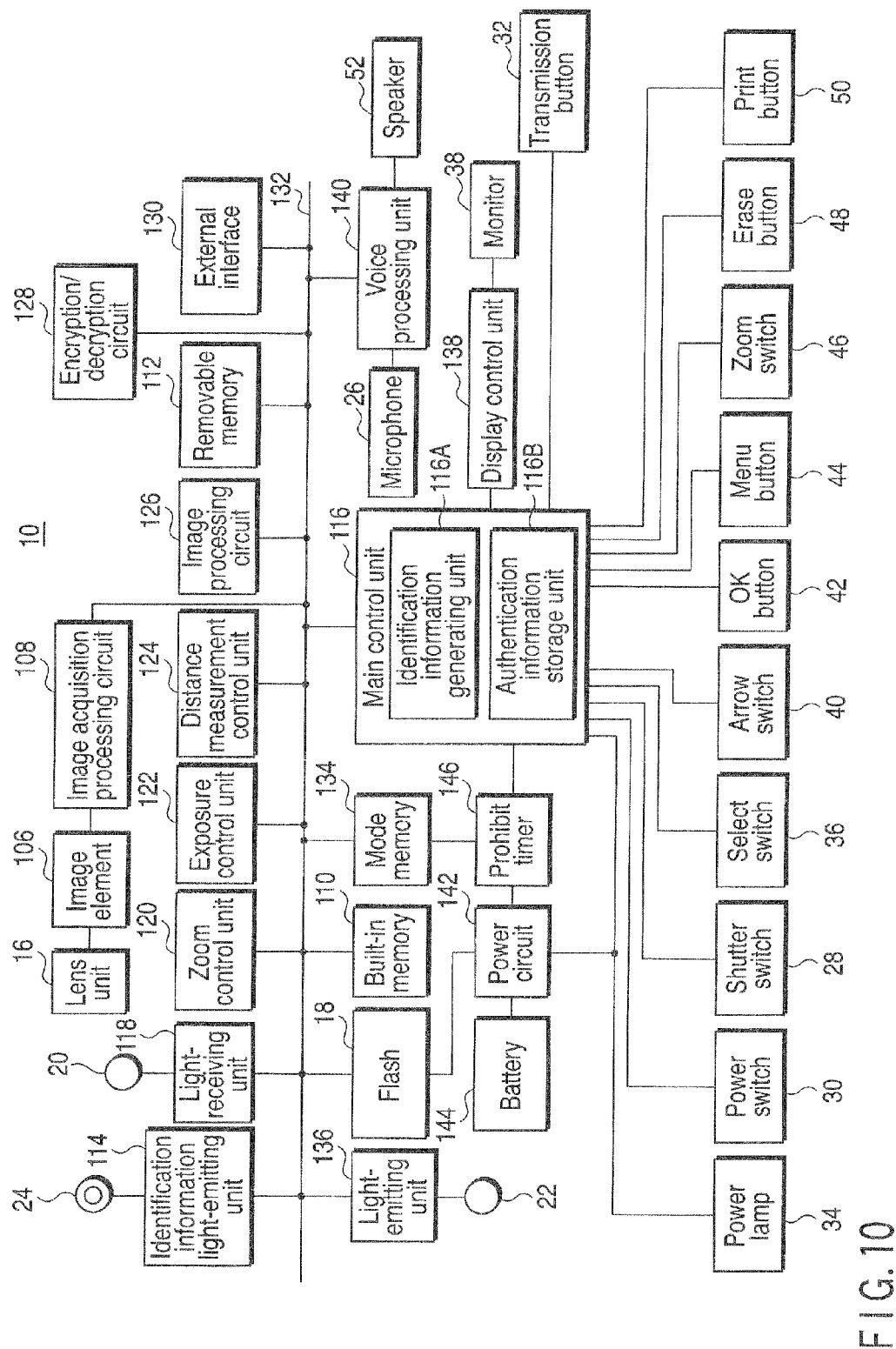
F I G. 10

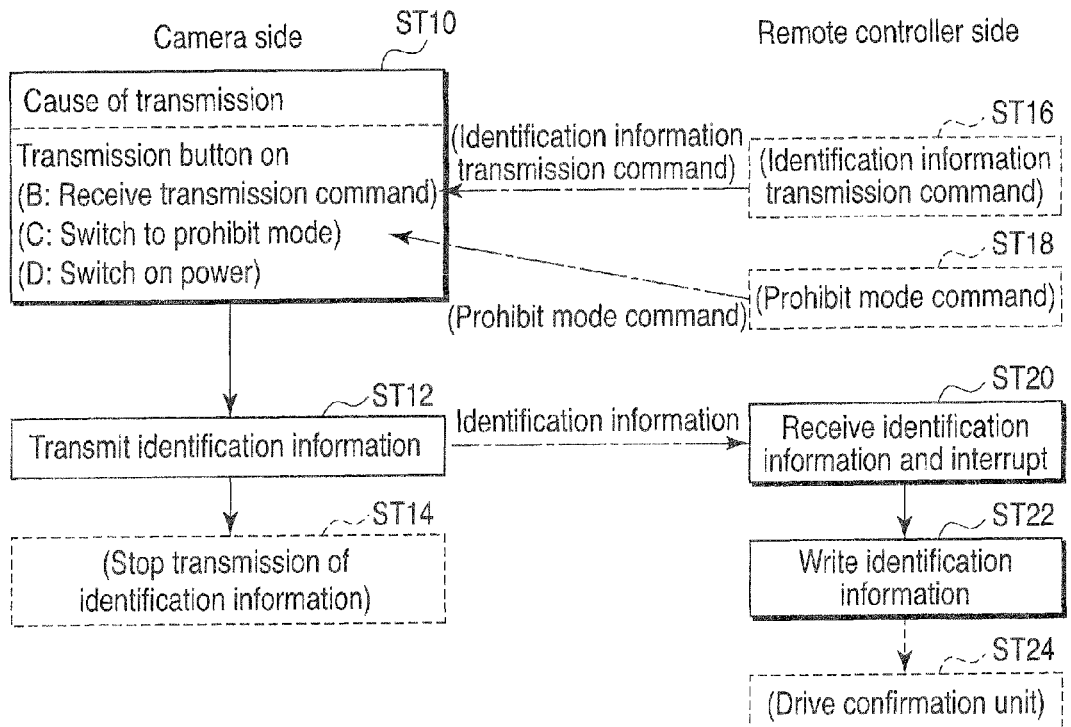
F I G. 21
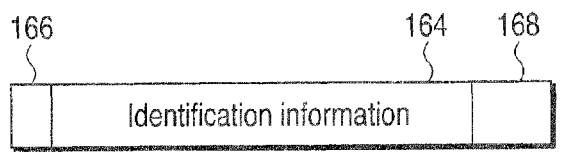
F I G. 22A
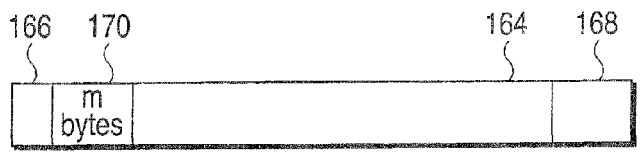
F I G. 22B

FIG. 26A
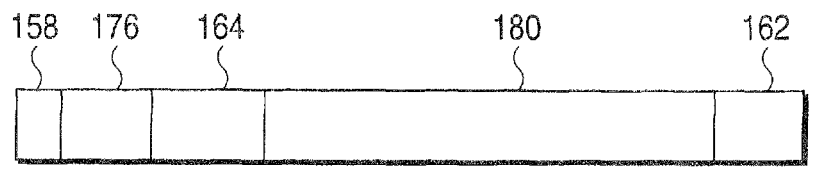
FIG. 26B
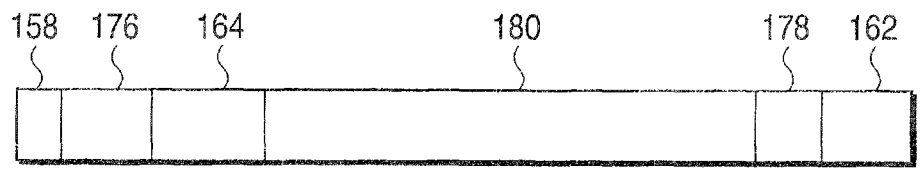
FIG. 26C
| Authentication mode switching command | Corresponding operation |
| --- | --- |
| ZZAA | Switch to prohibit mode |
| ZZBB | Switch to limit mode |
| ZZCC | Switch to setting mode |
| ZZDD | Switch to permit mode |
FIG. 27

| Authentication mode | State of camera proper | Application |
|---|---|---|
| Prohibit mode | Unusable by other than remote controller | Safety assured when carried and not used, when stored (held separately from remote controller) or when out |
| Limit mode | Limit use of function | When lent |
| Setting mode | Set/change limit function | |
| Permit mode | Normally usable | When lent or used by owner in low-risk situation |

F I G. 28

| Power on | Setting |
|---|---|
| Prohibit mode | Forcibly set to prohibit mode regardless of mode memory |
| Mode memory storage mode | Set to mode stored in mode memory |

F I G. 29

| Function | | Limit flag | Purpose of limitation |
|---|---|---|---|
| Image acquisition | | 1: Possible, 0: Impossible | Image hiding, privacy protection |
| Play | | 1: Possible, 0: Impossible | In case of only image visible (album, etc.) |
| | Erase | 1: Possible, 0: Impossible | Image protection (willfully or negligently) |
| | Transfer | 1: Possible, 0: Impossible | Image distribution or theft prevention |
| | Print | 1: Possible, 0: Impossible | Image distribution or theft prevention |
| | Edit | 1: Possible, 0: Impossible | Image alteration prevention |
| Menu | | | Optimum condition change prevention |

F I G. 30

| Switch, button | Corresponding operation |
|---|---|
| Power switch | Initialize by turning on; end operation by turning off |
| Select switch | Change operation when switching |
| Shutter switch | Switch operation flag set |
| Menu button | Start, set, change and end menu |
| Zoom switch T, W | T, W switch operation flag set, operation command |
| Arrow switch/left, right, up, down | Each switch operation flag set |
| OK button | Switch operation flag set |
| Erase button | Display erase check menu, corresponding operation |
| Print button | Display print menu, corresponding operation |
| Transmission button | Switch operation flag on, transmit identification information |

FIG. 31

| Button | Corresponding operation |
|---|---|
| Remote controller image acquisition command button | Shutter operation, OK button function |
| Remote controller wide-angle button, telephoto button | Wide-angle button, telephoto button operation flag set, operation command |
| Remote controller (+) button, (-) button | Each switch operation flag set |
| Remote controller arrow switch/ left, right, up, down | Each switch operation flag set |
| Remote controller OK button | Switch operation flag set |
| Remote controller information button | Information button operation flag set |
| Remote controller print button | Display print menu, corresponding operation |
| Remote controller menu button | Start, set, change and end menu |
| Remote controller erase button | Display erase check menu, corresponding operation |
| Remote controller protection button | Protection button operation flag set |
| Remote controller rotation button | Rotation button operation flag set |
| Remote controller limit button | Switch to limit mode |
| Remote controller prohibit button | Switch to prohibit mode |
| Remote controller setting button | Switch to setting mode |
| Remote controller permit button | Switch to permit mode |

FIG. 32

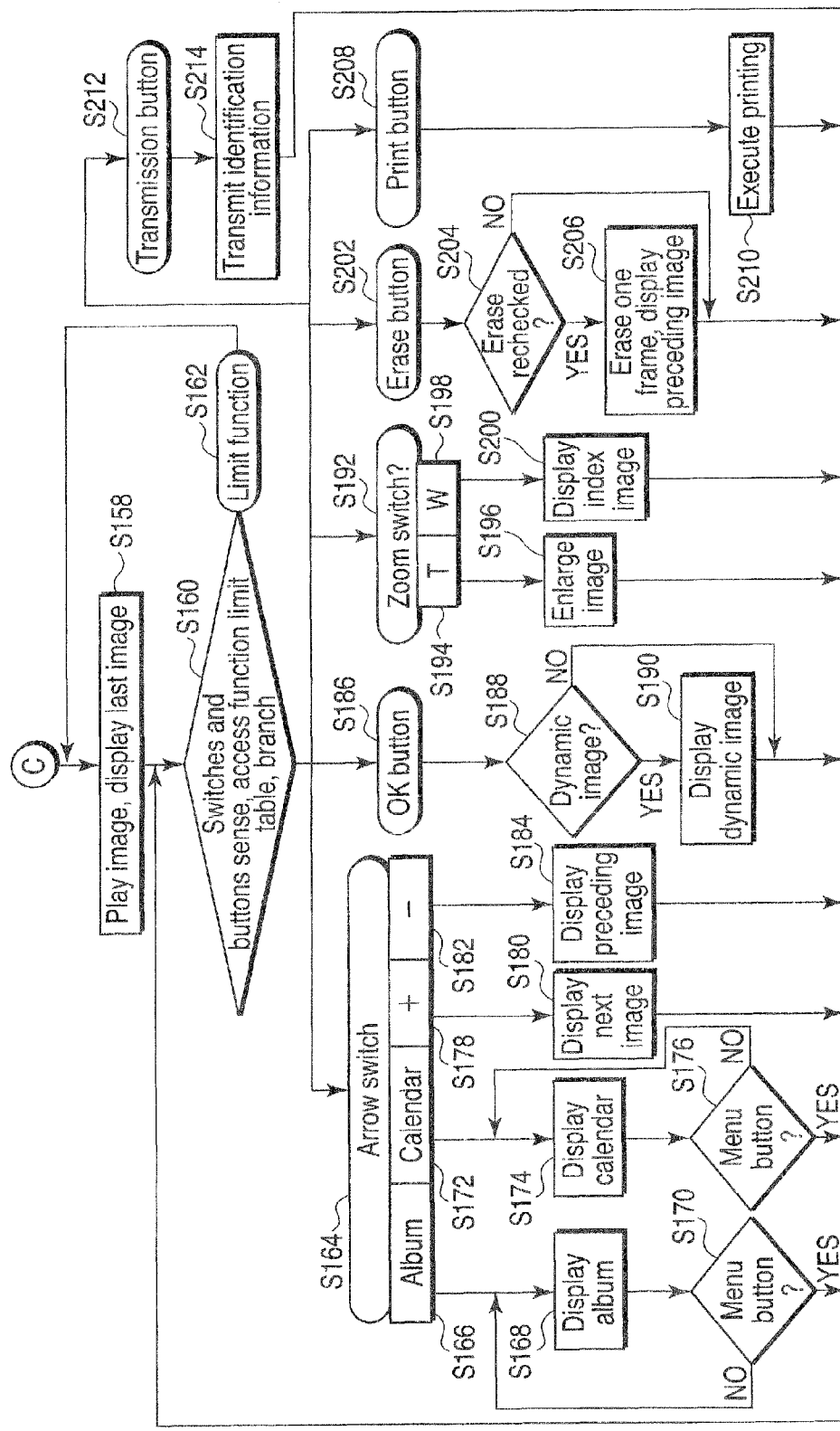
F I G. 34C

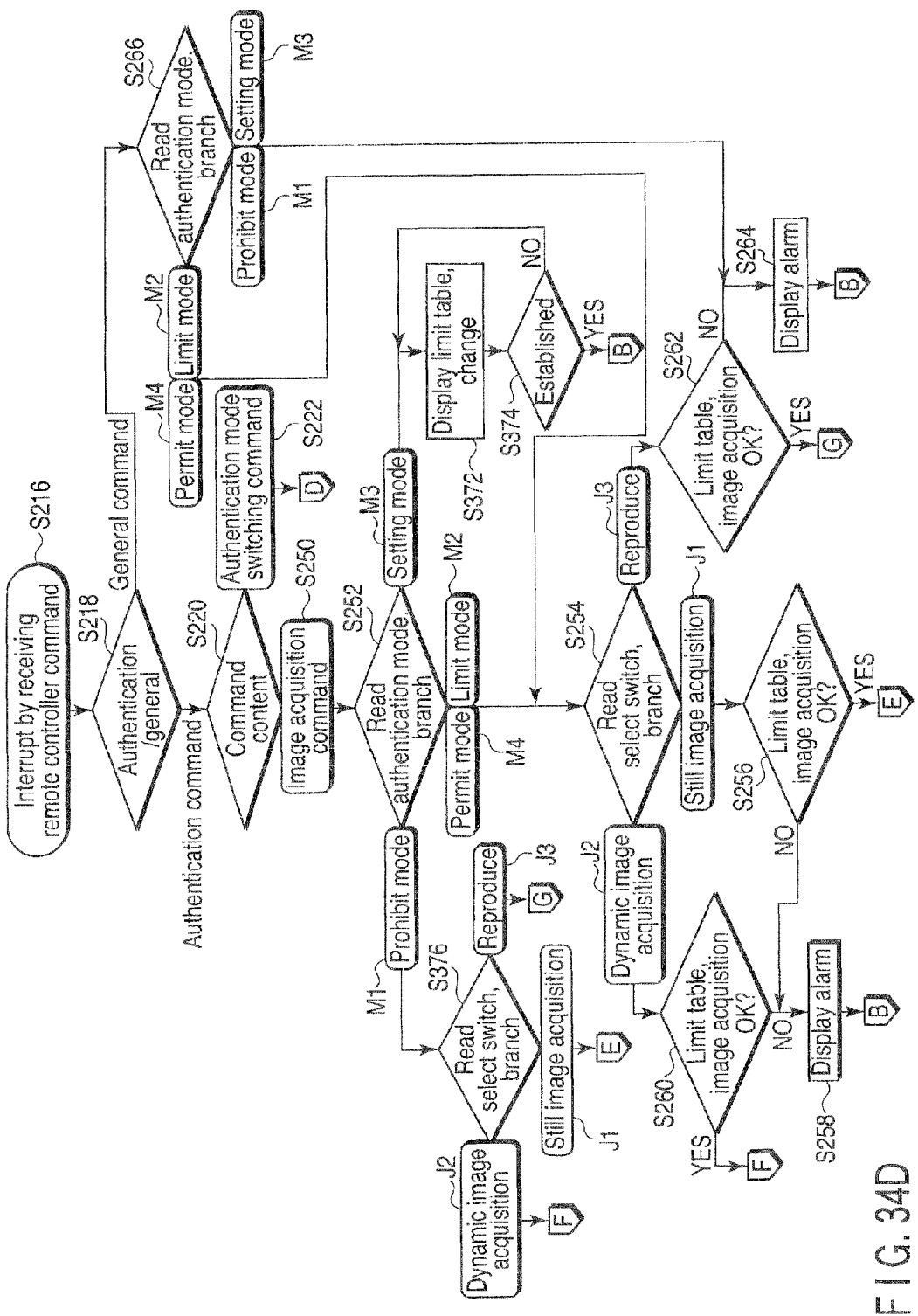
F I G. 34D

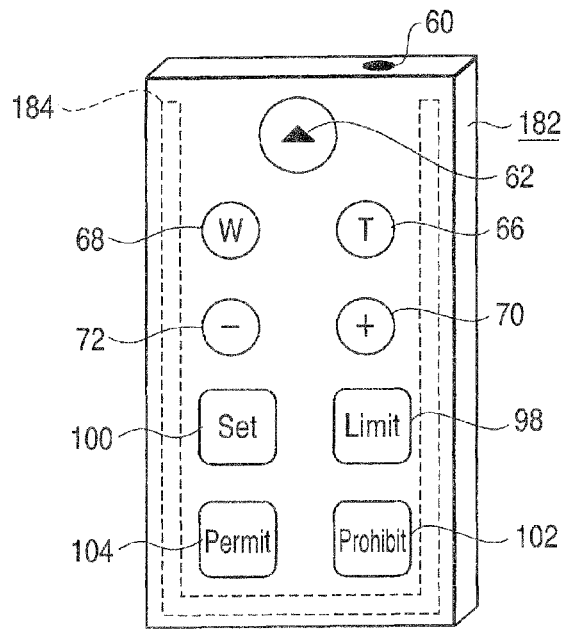
F I G. 35
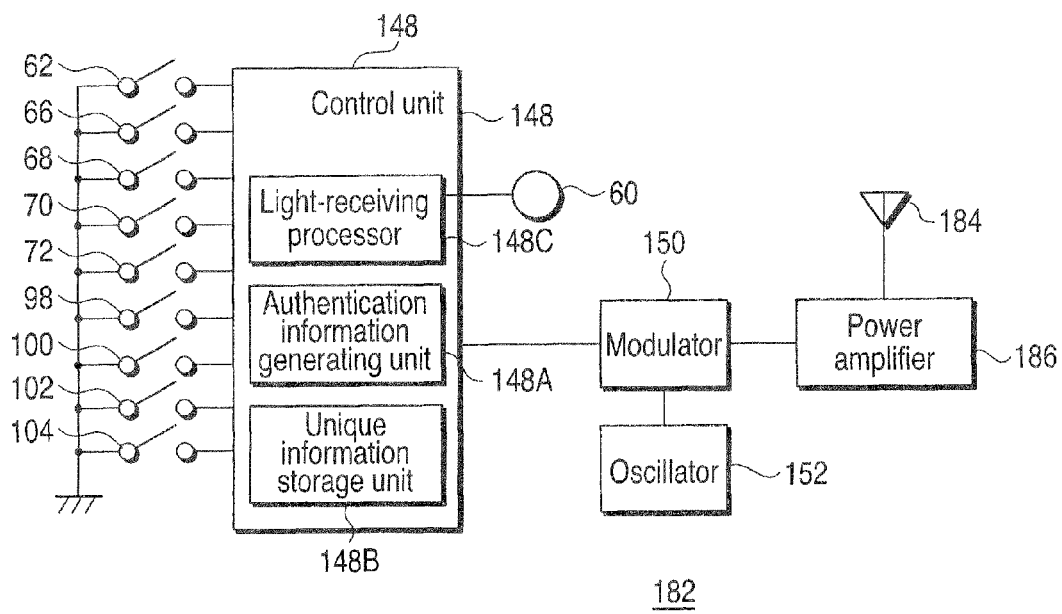
F I G. 36

| 50 | 36 | 62 | 04 | 38 | 52 | 41 | 90 | 91 | 39 |
|---|---|---|---|---|---|---|---|---|---|
| 27 | 82 | 39 | 83 | 73 | 20 | 63 | 49 | 73 | 15 |
| 60 | 32 | 46 | 07 | 87 | 80 | 97 | 61 | 42 | 51 |
| 11 | 47 | 87 | 73 | 62 | 76 | 21 | 00 | 39 | 09 |
| 25 | 08 | 69 | 04 | 08 | 64 | 43 | 64 | 24 | 90 |
| 46 | 89 | 66 | 60 | 48 | 30 | 22 | 50 | 68 | 20 |
| 16 | 38 | 03 | 26 | 50 | 72 | 21 | 14 | 16 | 04 |
| 05 | 76 | 93 | 88 | 88 | 92 | 43 | 99 | 29 | 76 |
| 72 | 38 | 76 | 72 | 19 | 56 | 09 | 71 | 67 | 03 |
| 78 | 64 | 19 | 15 | 01 | 30 | 48 | 46 | 16 | 21 |
116A2
FIG. 43
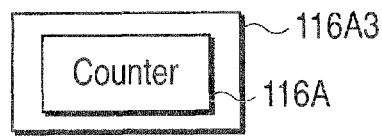
FIG. 44
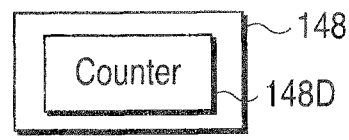
FIG. 45

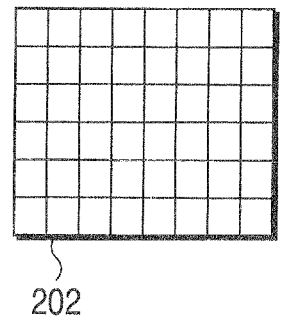
FIG. 50
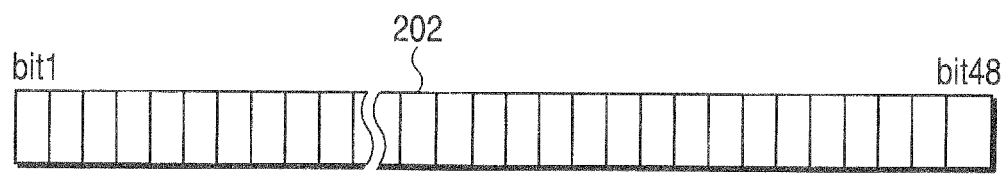
FIG. 51
FIG. 52

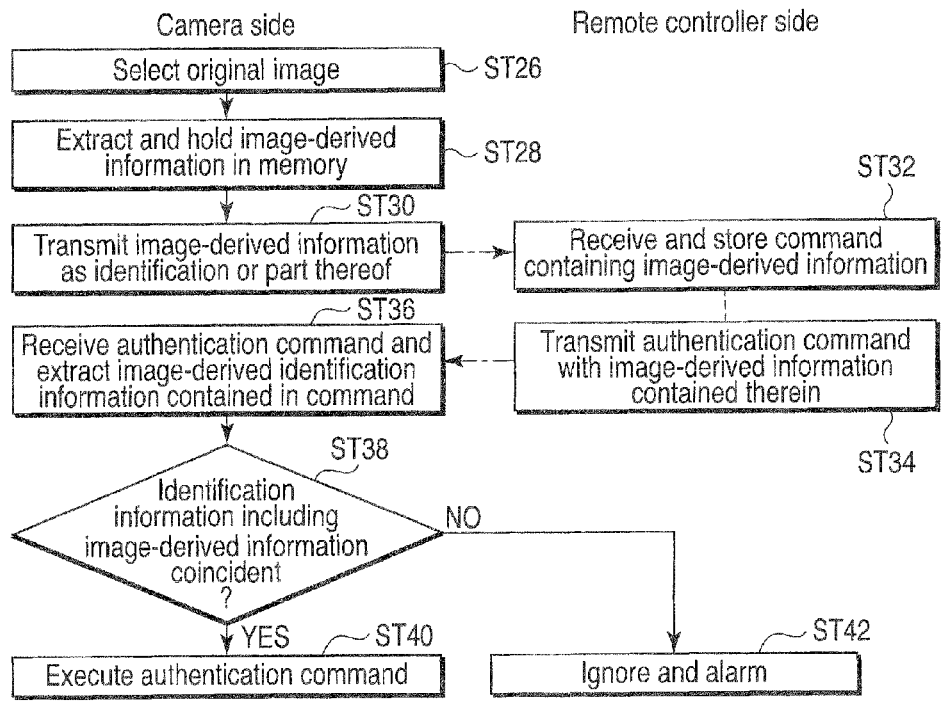
F I G. 53
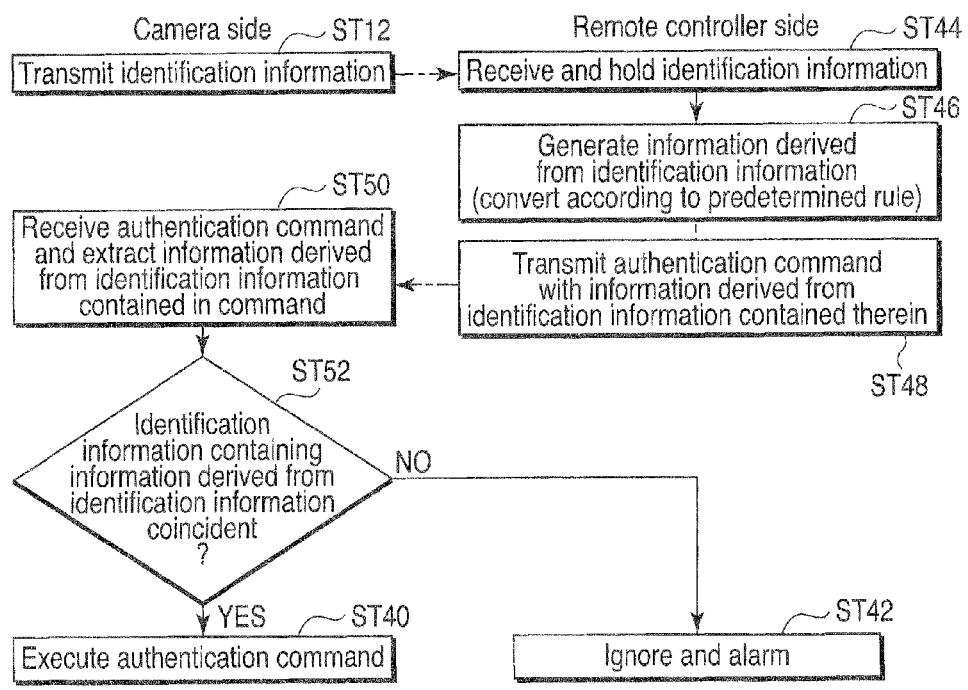
F I G. 54

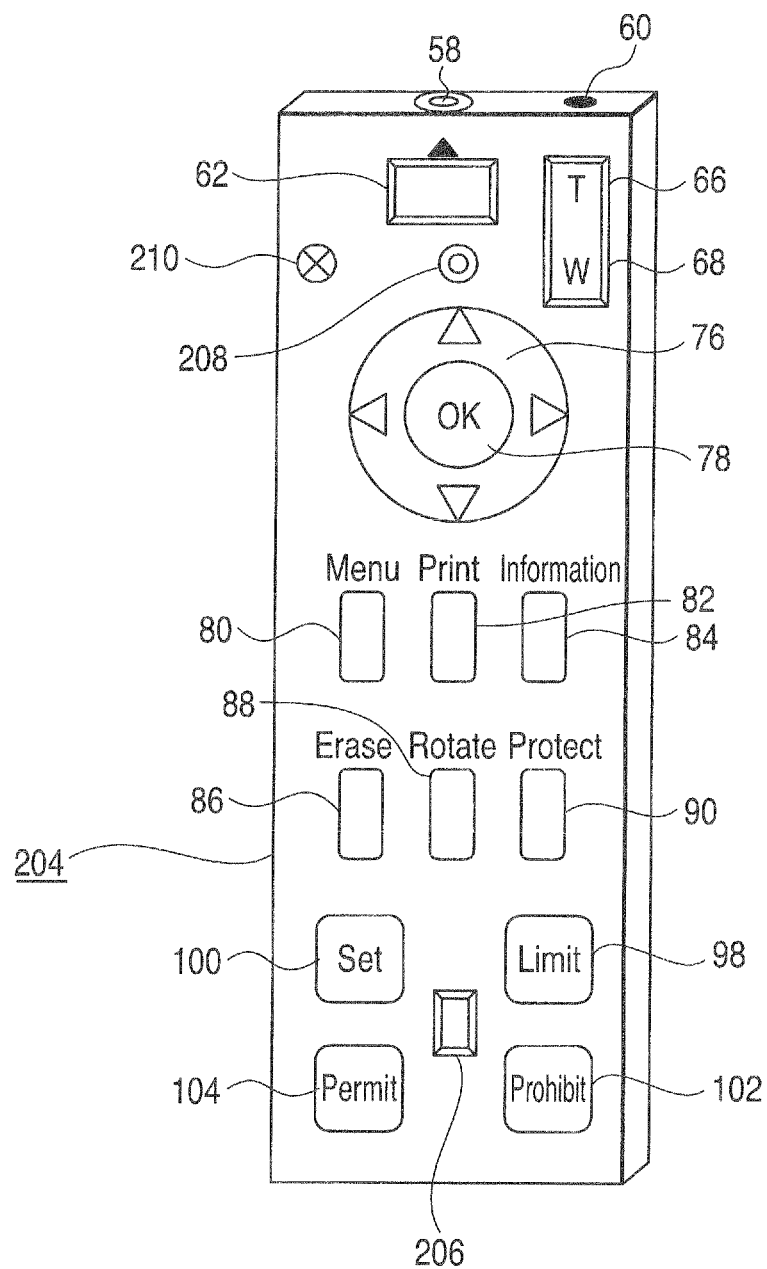
F I G. 55

IMAGE ACQUISITION SYSTEM AND METHOD OF AUTHENTICATING IMAGE ACQUISITION DEVICE IN THE IMAGE ACQUISITION SYSTEM

CROSS REFERENCE TO RELATED APPLICATIONS

This is a Continuation Application of PCT Application No. PCT/JP2008/053429, filed Feb. 27, 2008, which was published under PCT Article 21(2) in Japanese.

This application is based upon and claims the benefit of priority from prior Japanese Patent Application No. 2007-050387, filed Feb. 28, 2007, the entire contents of which are incorporated herein by reference.

BACKGROUND OF THE INVENTION

1. Field of the Invention

The present invention relates to an image acquisition system including an image acquisition device and a commanding device configured as a unit separate from the image acquisition device proper and a method of authenticating the image acquisition device in the image acquisition system.

2. Description of the Related Art

In recent years, concern about the protection of personal information and information security has become so high that, from the viewpoint of protection of personal information and privacy, even an image acquired by oneself must be carefully handled in an increased number of cases depending on the image contents, especially in the case where an image of another person is included.

In a conventional 35-mm film camera, the number of frames is 24 to 36, and should a camera loaded with a film of 36 frames imaged be lost or stolen, at most 36 images lost, this being a relatively small number compared with a digital camera. Depending on the contents, the loss would of course be great and so would be the risk of the information leakage.

With the advent of the age of the digital camera, on the other hand, the acquired images are recorded in the internal memory of the camera as digital information. The images thus recorded can be easily copied on the one hand, and even if they are copied without permission of the owner, the original images remain as they are, and therefore, the owner may not be aware that the images have been copied on the other hand.

Recently, the storage capacity of the storage medium of the digital camera has been so increased that the memory card of even 4 gigabytes is now placed on the market. In the semiconductor market, Moor's Law is known, according to which the design rule is decreased from 90 to 65 mm and further to as small as 45 mm. In the future, the storage capacity of the semiconductor memory continues to be in upward tendency. The capacity of the compact hard disk is also on the increase, and even the hard disk in the size of a Compact Flash (registered trademark) card has reached several gigabytes in capacity. This tendency is expected to continue in the future.

In the case where the storage capacity per frame of image is one megabyte on the average, for example, 2000 frames of images can be recorded in the memory card of 2 gigabytes, and 6000 frames of images in the hard, disk of 6 gigabytes. Under the circumstances, an enormous amount of personal information beyond comparison with the storage capacity for the film camera is now carried with each camera.

The image is recorded in the digital camera with the image acquisition date, etc. Some cameras can record even positional information by GPS. In other words, privacy information such as the behavior and the relationships of individual persons are stored in a great amount as images and data. If the camera is lost, a similar camera can be repurchased at several ten to several hundred thousand yen, but the lost images and information may invite the risk of a greater loss.

The image recording format of the digital camera is standardized, and by removing a removable memory card or a card-type hard disk from the camera and inserting it into the memory slot of the card reader or the personal computer (hereinafter sometimes referred to simply as PC), the images and the accompanying information can be easily viewed or copied.

With the increased memory capacity and the decreased price as a background, even a camera with a nonreplicable built-in memory of about 16 megabytes has appeared, with which images can still be recorded even if the removable memory is full or not installed. In view of this situation, a method has been realized to improve the security by increasing the capacity of the built-in memory and preventing the reproduction of the images from the built-in memory without meeting specified conditions, while at the same time making the conventional removable memory compatible with other cameras.

A considerable number of methods have so far been proposed to improve the security by prohibiting the use of the camera by other than the owner and thus preventing the information leakage and the illegal use.

According to EF 1003069 A2, for example, the ID information of the user is registered, and by reading and collating in advance, the use is permitted only in the case where the ID is coincident. Specifically, the function of verifying the retina pattern, the fingerprint or the voiceprint has been proposed. Also, a method has been proposed in which the ID information is input in the memory card in advance and required to be read. In still another method proposed, a keyboard is provided as an ID input unit to input the ID number.

On the other hand, US 2005/0001024 A1 proposes that a first electronic device held by the user and having stored the personal information of the user communicates with a second electronic device by radio, and the second electronic device is customized in accordance with the user by automatically reading the personal information of the particular user.

Further, Jpn. Pat. Appln. KOKAI Publication No. 2005-42396 proposes a car garage shutter system in which the identification data is stored in a remote controller. The use of a private key as the authentication information or the encrypted information has been proposed. The authentication of voice, iris or fingerprints has also been proposed.

To maintain the security of the information, devices and system, on the other hand, an electronic certificate based on a public key and the one-time password utilizing an authentication server and a network also find practical application as a method high in security.

BRIEF SUMMARY OF THE INVENTION

According to a first aspect of the present invention, there is provided an image acquisition system comprising:

an image acquisition device having a image acquisition unit; and a commanding device configured as a member separate from the image acquisition device and adapted to transmit a command to the image acquisition device to control the image acquisition device, thereby permitting the image acquisition device to perform an operation corresponding to the command, wherein the image acquisition device includes an identification information transmission unit configured to transmit identification information to the commanding device to permit the image acquisition device to identify the commanding device, and the commanding device includes:

an identification information receiving unit configured to receive the identification information transmitted from the image acquisition device; and a command transmission unit configured to transmit a command to control the image acquisition device as a command with authentication information containing the authentication information for permitting the image acquisition device to authenticate the commanding device, the authentication information containing one of the identification information and the information derived from the identification information received by the identification information receiving unit.

According to a second aspect of the present invention, there is provided a method of authentication for an image acquisition device between the image acquisition device having image acquisition unit and a commanding device configured as a member separate from the image acquisition device for transmitting a command to the image acquisition device proper to control the image acquisition device, thereby permitting the image acquisition device to perform an operation corresponding to the command, the method comprising:

transmitting identification information from the image acquisition device to the commanding device to permit the image acquisition device to identify the commanding device; and in the commanding device, receiving the identification information transmitted by the image acquisition device, and transmitting a command with authentication information containing the authentication information which contains one of the received identification information and information derived from the identification information and which permits the image acquisition device to authenticate the commanding device.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a diagram showing the types of the remote controller as a commanding device.

FIG. 5A is an enlarged view showing the state in which the authentication setting switch of the remote controller shown in FIG. 1 is at the normal position.

FIG. 5B is an enlarged view of an authentication setting switch at the authentication position.

FIG. 10 is a block diagram showing an electrical configuration of the digital camera.

FIG. 21 is a diagram for explaining the identification information transmission/reception steps from the camera proper to the remote controller with the authentication information (the authentication mode switching remote controller and the authentication command remote controller).

FIG. 22A is a diagram showing an example of the data format of the identification information.

FIG. 22B is a diagram showing another example of the data format of the identification information.

FIG. 26A is a diagram showing an example of the data format of an authentication mode switching command as the authentication command of the optical remote controller.

FIG. 26B is a diagram showing another example of the data format of an authentication mode switching command as the authentication command of the optical remote controller.

FIG. 26C is a diagram showing another example of the data format of an authentication mode switching command as the authentication command of the optical remote controller.

FIG. 27 is a diagram showing an example of character strings used as the authentication mode switching command data.

FIG. 28 is a diagram showing the authentication mode of the camera proper.

FIG. 29 is a diagram for explaining the selection as to the designation of the authentication mode setting at the time of switching on the power of the camera proper.

FIG. 30 is a diagram for explaining the functions available in the limiting mode.

FIG. 31 is a diagram showing the outline of the operation in the case where the switches or the buttons of the camera proper are depressed.

FIG. 32 is a diagram showing the outline of the corresponding operation of the camera proper in the case where the switches or the buttons of the camera proper are depressed.

FIG. 34C is a diagram showing a third part of a series of flowcharts for explaining the process and the status transition in the image acquisition device.

FIG. 34D is a diagram showing a fourth part of a series of flowcharts for explaining the process and the status transition in the image acquisition device.

FIG. 35 is a perspective view showing the outer configuration of a radio remote controller as an example of the commanding device according to a second embodiment of the invention.

FIG. 36 is a block diagram showing the electrical configuration of the radio remote controller shown in FIG. 35.

FIG. 43 is a diagram showing an example of the data table.

FIG. 44 is a diagram showing the configuration of an identification information generating unit of the main control unit of the camera according to a fifth embodiment of the invention.

FIG. 45 is a diagram showing the configuration of the control unit of the remote controller according to the fifth embodiment.

FIG. 50 is a diagram showing the original image for explaining the information derived from the image information as the identification information according to a seventh embodiment of the invention.

FIG. 51 is a diagram showing an example of the data derived from the image as the information derived from the image information.

FIG. 52 is a diagram showing another example of the data derived from the image as the information derived from the image information.

FIG. 53 is a diagram showing a flowchart for explaining a method of utilizing the information derived from the image information.

FIG. 54 is a diagram showing a flowchart for explaining a method of utilizing the information derived from the identification information according to a ninth embodiment of the invention.

FIG. 55 is a perspective view showing the outer configuration of the optical remote controller capable of transmitting an identification information transmission command as an example of the commanding device according to an eleventh embodiment of the invention.

DETAILED DESCRIPTION OF THE INVENTION

The best mode for carrying out the invention will be explained below with reference to the drawings.

First Embodiment

Figure 1:
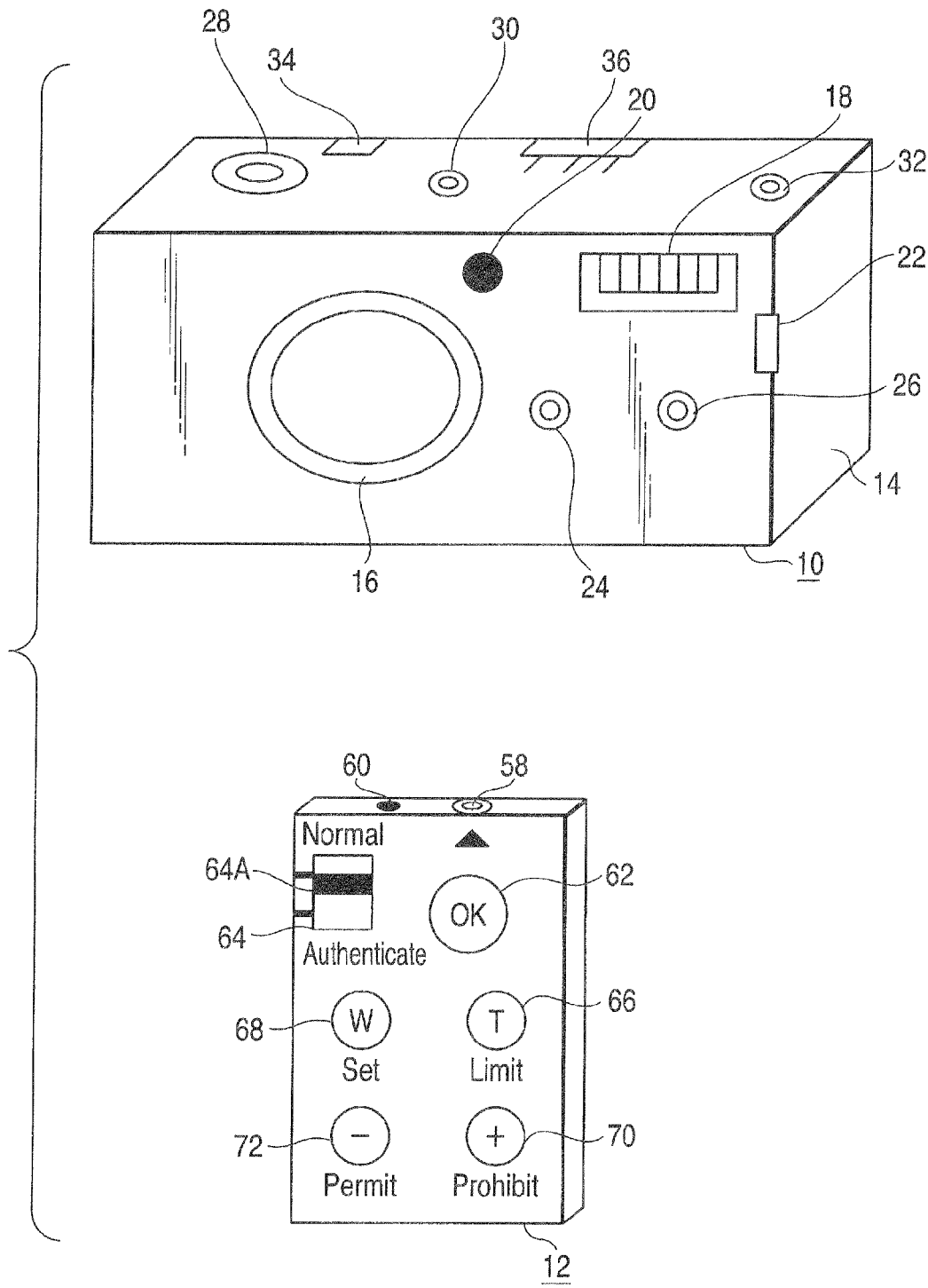
FIG. 1 is a perspective view showing the outer configuration of a digital camera as an example of the image acquisition device and an optical remote controller providing an authentication mode switching remote controller as an example of a commanding device of an image acquisition system according to a first embodiment of the invention.

The image acquisition system according to the first embodiment of the invention, as shown in FIG. 1, includes an image acquisition device such as a digital camera 10 and a commanding device such as an optical remote controller 12 configured, as a member separate from the image acquisition device, to transmit a command to the image acquisition device proper so that the image acquisition device can perform the operation corresponding to the command.

On the front surface of the camera proper 14 of the digital camera 10, there are arranged an image acquisition lens unit 16, a flash 18 for emitting an auxiliary image acquisition light, a photodetector element 20 for receiving the optical signal from a commanding device such as the optical remote controller 12, a light-emitting element 22 for giving an advance notice of the image acquisition operation with the timer or confirming the command from the remote controller, a light-emitting element 24 for transmitting the identification information, and a microphone 26 used for sound recording during the image acquisition operation or adding a voice message after the image acquisition operation. Incidentally, the light-emitting element 24 for transmitting the identification information may either be arranged independently as an infrared LED or the like separately from the light-emitting element 22 emitting the visible light, or may double as the light-emitting element 22.

Figure 2:
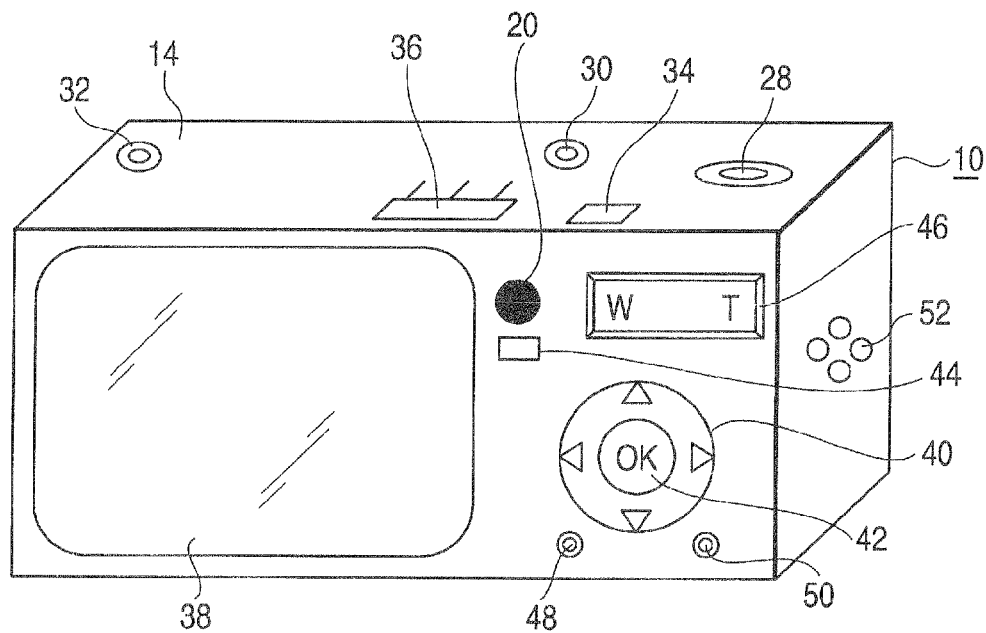
FIG. 2 is a perspective view showing the rear outer configuration of the digital camera as an example of the image acquisition device according to the first embodiment.

Also, a shutter switch 28 is arranged on the upper surface of the camera proper 14. This shutter switch 28, which is a two-stage motion switch in still image acquisition mode, can focus the image by half push and snap the shutter by full push. In dynamic image acquisition mode, on the other hand, the image acquisition operation is started by a first push and stopped by a second push. On the upper surface of the camera proper 14, there are also arranged a power switch 30 for switching on/off the power supply, a transmission button 32 for instructing the camera proper 14 to transmit the identification information to the commanding device, a power lamp 34 that lights when the power is on, and a select switch 36 which is three-way slide switch for selecting the still image acquisition mode, the dynamic image acquisition mode and the image play mode. As shown in FIG. 2, on the other hand, the monitor 38 is arranged on the back of the camera proper 14. This monitor 38 is formed of a liquid crystal display unit 1.8 to more than 3 inches in size and having 110 to more than 230 thousand pixels. The fields of application of the monitor 38 include the image confirmation at the time of the image acquisition operation, the image display after the image acquisition operation, the display examples of acquired images for selecting the image acquisition scene, and the display of the setting menu such as the image acquisition conditions, the number of frames of acquired images and the residual capacity of the battery.

Further, an arrow switch 40, an OK button 42, a menu button 44, a zoom switch 46, an erase button 46, a print button 50, etc., are arranged on the back of the camera proper 14. The arrow switch 40 is four-way seesaw switch adapted for depression in four directions, up, down, left and right and used to move the selection items up, down, left or right at the time of selecting a plurality of items displayed on the monitor 38 or to feed the frames of the reproduced images longitudinally. The OK button 42 is a switch to determine the selection items on the monitor 38 at the time of setting conditions, and the menu button 44 is a switch for causing the various menus to be displayed for setting conditions. The zoom switch 46 is a left-right two-way seesaw switch in which the depression of T side moves the zoom lens of the lens unit 16 toward the telephoto side, while the depression of the W side drives the zoom lens to wide-angle side. Also, in play mode, the zoom switch 46 is used also to enlarge or reduce the image or to control the multiscreen display. When the erase button 48 is depressed in play mode, the erase execution confirmation is displayed on the monitor 38, and upon depression of the OK button 42 by selecting the erase by the arrow switch 40, the image being displayed is erased. Also, assuming that the print button 50 is depressed in play mode, the print menu is displayed on the monitor 38, and as long as the digital camera 10 and the printer (not shown) are connected to each other, the image in the digital camera 10 can be printed.

Further, the light-receiving element 20 for receiving the light as a signal from the commanding device such as the optical remote controller 12 may be arranged not only on the front of the camera proper 14 as shown in FIG. 1 but also on the rear surface of the camera proper 14 as shown in FIG. 2. The light-receiving element 20 may also be arranged, on the side surface of the camera proper 14. By arranging the light-receiving elements 20 on a multiplicity of surfaces in this way, the command light from the optical remote controller 12 can be easily received from many directions.

Also, a speaker 52 for producing the alarm sound or the confirmation sound or reproducing the recorded sounds in play mode is arranged on the side surface of the camera proper 14.

Figure 3:
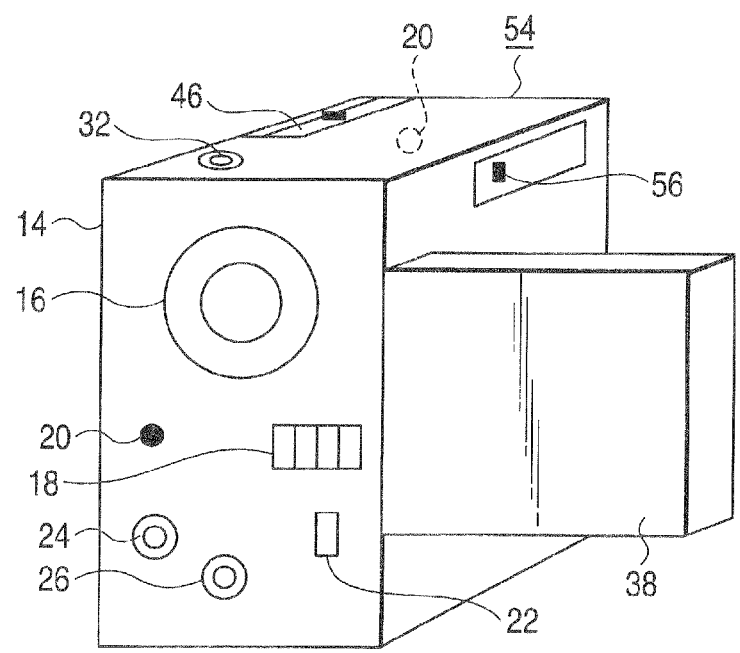
FIG. 3 is a perspective view showing the appearance of the configuration of a digital movie camera as another example of the image acquisition device according to the first embodiment.

The image acquisition device in the image acquisition system according to the first embodiment may be a digital movie camera 54 as shown in FIG. 3. In FIG. 3, the functional members similar to those of the digital camera 10 are designated by the same reference numerals, respectively. Specifically, in this digital movie camera 54, the front surface of the camera proper 14 has arranged thereon a lens unit 16, an auxiliary image acquisition light-emitting flash 18, a light-receiving element 20 for receiving the optical signal from the optical remote controller 12 constituting the commanding device, a light-emitting element 22 for displaying an advanced notice at the time of the image acquisition operation with timer or confirming the command from the optical remote controller 12, a light-emitting element 24 for transmitting the identification information and a microphone 26 used for sound recording during the image acquisition operation or adding the audio message after the image acquisition operation. Incidentally, the light-emitting element 24 for transmitting the identification information may be either an independent infrared LED separately from the light-emitting element 22 for emitting the visible light or double as the light-emitting element 22.

Also, the side surface of the camera proper 14 has a monitor 38 rotatably mounted thereon to display the image being acquired or the reproduced image after image acquisition operation. The monitor 38, when out of use, can be closely accommodated in the camera proper 14. Further, the side surface of the camera proper 14 has arranged thereon a power mode switch 56 adapted to turn on/off the power supply or switch the image acquisition mode and the play mode.

A zoom switch 46 is arranged on the upper surface of the camera proper 14. The zoom switch 46 is a left-right two-way seesaw switch in which the depression on T side moves the zoom lens toward telephoto side, while the depression on W side drives the zoom lens to wide-angle side. Also, in play mode, the zoom switch 46 is used also to enlarge or reduce the image or to control the multiscreen display on the monitor 33. Also, a transmission button 32 is arranged on the upper surface of the camera proper 14 to give a command to transmit the identification information from the camera proper 14 of the digital movie camera 54 to the commanding device.

In addition, though not specifically shown, various connectors, menu button and shutter button are arranged on the side and back, surfaces of the camera proper 14. Further, the light-emitting element 20 for receiving the optical signal from the commanding device such as the optical remote controller 12 may be arranged on the rear or side surface as well as on the front surface to easily receive the command light from the optical remote controller 12 in many directions.

FIG. 4 is a diagram showing the types of the remote controller as a commanding device. The remote controller is of two types. One is a remote controller with the authentication information for transmitting the command with the authentication information (hereinafter referred to as the authentication command) containing the authentication information permitting the camera proper 14 to authenticate the remote controller. The other is a remote controller without the authentication information (hereinafter referred to as the common remote controller) for transmitting the command without the authentication information (general command). The authentication command includes an image acquisition command (for image acquisition or reproduction) with the authentication information and an authentication mode switching command. The general command is an image acquisition command such as for the image acquisition or reproduction and contains no authentication information. The general command from the common remote controller as a general commanding device can be issued for all the functions in permit mode as described later and the functions not restricted in limit mode described later. The authentication information will be described in detail later.

The common remote controller has neither the authentication information nor the authentication mode switching function, and the command therefrom contains no authentication information. The common remote controller is thus used in permit or limit mode. This common remote controller is suitably used at home or where the chance of the camera proper 14 being stolen or forgotten is slim.

The remote controller with the authentication information, on the other hand, is of two types, an authentication mode switching remote controller and an authentication command remote controller.

The authentication mode switching remote controller carries the authentication information when transmitting the authentication mode switching command, and carries no authentication information when transmitting other image acquisition commands. This authentication mode switching remote controller is suitably used in the following ways. Specifically, the image acquisition operation is performed using the general command without the authentication information in permit or limit mode. As long as the image acquisition operation is suspended, the authentication mode is switched to prohibit mode, as described later, in preparation to be stolen or forgot. Once the image acquisition operation is desired again, the authentication mode is switched to permit or limit mode again.

The authentication command remote controller, on the other hand, is the one in which the authentication information is attached to all the transmitted commands including the image acquisition command. This authentication command remote controller is suitably used while on trip or in a congested place where the image acquisition device is liable to be stolen or forgotten. Specifically, the camera proper 14 is set to prohibit mode and all the commands are transmitted as authentication commands, so that the camera proper 14 can be operated in accordance with the remote controller command even in prohibit mode. Also, should the camera proper 14 be lost, the fact that it is set in prohibit mode makes it impossible for the camera alone to be used, and therefore, the risk of illegal viewing of the information including the image acquired can be reduced.

As an example of the authentication mode switching remote controller of the image acquisition system according to the first embodiment, the optical remote controller 12, as shown in FIG. 1, is configured of a light-emitting unit 58 at the end surface thereof to transmit the authentication command, so that the general command for the image acquisition operation or the authentication mode switching command is transmitted as a command from the light-emitting unit 58 to the digital camera 10 or the digital movie camera 54 making up the image acquisition device. Further, a light-receiving unit 60 for receiving the identification information is arranged at the same end surface to receive the identification information transmitted from the light-emitting element 24 arranged on the camera proper 14 of the digital camera 10 or the digital movie camera 54 constituting the image acquisition device to transmit the identification information.

Also, the upper surface of the optical remote controller 12 has arranged thereon an image command button 62, an authentication setting switch 64, a telephoto button 66, a wide-angle button 68, a plus button 70, a minus button 72, etc. From the optical remote controller 12, an image acquisition execution command is transmitted to the camera proper 14 as an image acquisition command in the form of a general command when the image acquisition command button 62 is depressed. The authentication setting switch 64 switches between the normal position and the authentication, position in accordance with the position of the operating unit 64A thereof, and the functions of other switches 66 to 72 are switched by the position thereof.

The authentication setting switch 64 is a two-position change-over switch. The normal position is assumed when the operating unit 64A is located at the normal position 64B above in FIG. 5A, and the authentication position is assumed when the operating unit 64A is located at the lower authentication position 64C as shown in FIG. 5B.

Specifically, as long as the operating unit 64A is at the normal position 643 when the telephoto button 66 is depressed, the optical remote controller 12 transmits the T button command to the camera proper 14 as an image acquisition command in the form of the general command to drive the lens unit 16 to telescopic mode. In the case where the operating unit 64A is set at the authentication position 64C, on the other hand, a command (limit command) to switch the camera proper 14 to limit mode is transmitted as an authentication mode switching command in the form of the authentication command.

Upon depression of the wide-angle button 68 with the operating unit 64A at the normal position 64B, the W button command to drive the lens unit 16 to wide angle mode is transmitted as an image acquisition command in the form, of the general command to the camera proper 14. In the case where the operating unit 64A is at the authentication position 64C, on the other hand, a command (setting command) to switch the camera proper 14 to the setting mode is transmitted as an authentication mode switching command in the form of the authentication command.

Upon depression of the plus button 70 with the operating unit 64A at the normal position 64B, a command to move the select item for menu selection or frame feed for reproduction is transmitted as an image acquisition command in the form of the general command. With the operating unit 64A at authentication position 64C, on the other hand, a command (prohibit command) to switch the camera proper 14 to prohibit mode is transmitted as an authentication mode switching command in the form of the authentication command.

Upon depression of the minus button 72 with the operating unit 64A at the normal position 64B, a command to move the select item for menu selection and frame feed for reproduction is transmitted as an image acquisition command in the form of the general command. With the operating unit 64A at the authentication position 64C, on the other hand, a command (permit command) to switch the camera proper 14 to permit mode is transmitted as an authentication mode switching command in the form of the authentication command.

Incidentally, each mode of the camera proper 14 will be explained in detail later.

Figure 6:
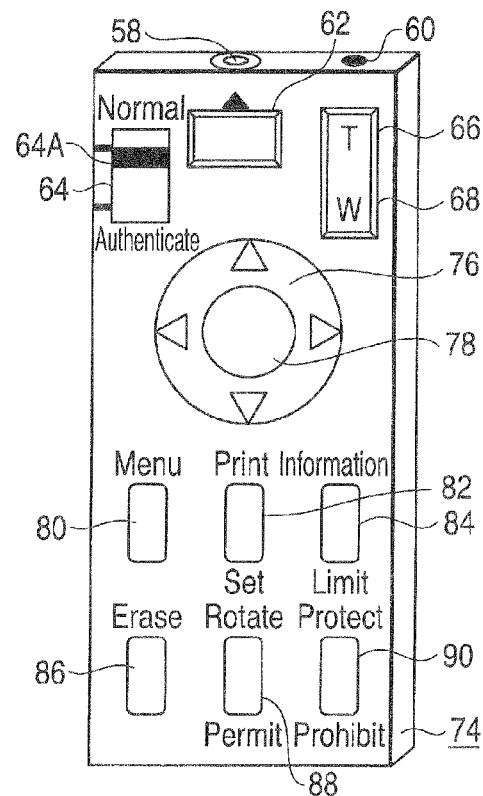
FIG. 6 is a perspective view showing the outer configuration of another optical remote controller providing an authentication mode switching remote controller as another example of the commanding device according to the first embodiment.

Next, the optical remote controller 74 for the camera will be explained as another example of the authentication mode switching remote controller with reference to FIG. 6. The functional members similar to the corresponding ones of the optical remote controller 12 are designated by the same reference numerals, respectively.

Specifically, the optical remote controller 74 also has a light-emitting unit 58 at the end surface thereof for command transmission, and transmits the general command or the authentication mode switching command to the image acquisition device as a command from the light-emitting unit 58. Further, a light-receiving unit 60 for receiving the identification information is arranged at the particular end surface to receive the identification information transmitted from the light-emitting element 24 arranged on the camera proper 14 of the digital camera 10 or the digital movie camera 54 making up an image acquisition device to transmit the identification information. On the upper surface of the optical remote controller 74, on the other hand, there are arranged an image acquisition command button 62, an authentication setting switch 64, a telephoto button 66, a wide-angle button 68, an arrow switch 76, an OK button 78, a menu button 80, a print button 82, an information button 84, an erase button 86, a rotation button 88, a protection button 90, etc.

The optical remote controller 74, upon depression of the image acquisition command button 62, transmits the image acquisition execution command as an image acquisition command in the form of the general command to the camera proper 14. Also, the telephoto button 66 and the wide-angle button 68 constitute a seesaw switch. Upon depression of the telephoto button 66, the T-button command is transmitted as an image acquisition command in the form of the general command. The camera proper 14 that has received it drives the lens unit 16 to the telephoto side during the image acquisition operation, or enlarges the image or controls the multiscreen display in the monitor 38 during the play mode. Similarly, upon depression of the wide-angle button 68, the W-button command is transmitted as an image acquisition command in the form of the general command. In the camera proper 14 that has received the W button command, the lens unit 16 is driven to the wide-angle side during the image acquisition operation, while the image is reduced or the multiscreen display is controlled in the monitor 38 during the play mode.

Also, the arrow switch 76 is a four-way seesaw switch adapted to be depressed at any of four points including up, down, left and right, and transmits the operation command corresponding to the depressed direction as an image acquisition command in the form of the general command. This switch is used to designate the selection items to the positions up, down, left or right at the time of selecting a plurality of items displayed on the monitor 38 of the image acquisition device or to feed the frames before and after the reproduced image. The OK button 78 is a switch for determining the selection item on the monitor 38 at the time of setting conditions, and upon depression thereof, transmits the OK command as an image acquisition command in the form of the general command. The menu button 80 is a switch for displaying the various condition setting menus on the monitor 38, and upon depression thereof, transmits a menu command as an image acquisition command in the form of the general command.

Also, upon depression of the erase button 86, an erase command is transmitted as an image acquisition command in the form of the general command. As long as the erase function is not limited in play mode at the time of reception thereof in the camera proper 14, the erase execution confirmation is displayed on the monitor 38. Then, upon depression of the OK button 78 after selecting the erase by the arrow switch 76, the image being displayed is erased.

The authentication setting switch 64, like in FIGS. 5A and 5B, is to switch between the normal position and the authentication position of the operating unit 64A. In accordance with the position of the operating unit 64A, the functions of other buttons 78, 80, 84, 86 are switched.

Specifically, upon depression of the print button 82 with the operating unit 64A at the normal position 64B, a print command is transmitted as an image acquisition command in the form of the general command. In the camera proper 14 that has received the print command, the print menu is displayed on the monitor 38, and if the camera proper 14 and the printer are connected to each other, the image in the camera proper 14 can be printed out. Upon depression of the print-button 32 with the operating unit 64A at the authentication position 64C, on the other hand, a setting command is transmitted as the authentication mode switching command in the form of the authentication command. Upon receipt thereof, the camera proper 14 switches to the setting mode.

Also, upon depression of the information button 84 with the operating unit 64A at the normal position 64B, an information display command is transmitted as an image acquisition command in the form of the general command. In the camera proper 14 that has received it displays the information of the display image on the monitor 38. In the case where the information button 84 is depressed with the operating unit 64A at the authentication position 64C, on the other hand, a limit command is transmitted as an authentication mode switching command in the form of the authentication command. In accordance with the reception thereof, the camera proper 14 switches to the limiting mode.

Also, upon depression of the rotation button 88 with the operating unit 64A at the normal position 64B, a rotation command is transmitted as an image acquisition command in the form of the general command. In the camera proper 14 that has received it, the display image of the monitor 38 is rotated by 90 degrees. Upon depression of the rotation button 88 with the operating unit 64A at the authentication position 64C, on the other hand, a permit command is transmitted as the authentication mode switching command in the form of the general command. In accordance with the reception thereof, the camera proper 14 is switched to the permit mode.

Upon depression of the protect button 90 with the operating unit 64A at the normal position 64B, a protect command is transmitted as an image acquisition command in the form of the general command. In the camera proper 14 that has received it, the image displayed on the monitor 38 is protected from erasure by attaching a protective flag thereto. Incidentally, this protective flag can be cleared on the menu displayed by the operation of the menu button 80. Upon depression of the protect button 90 with the operating unit 64A at the authentication position 64C, on the other hand, a prohibit command is transmitted as the authentication mode switching command in the form of the authentication command. In accordance with the reception thereof, the camera proper 14 is switched to the prohibit mode.

Figure 7:
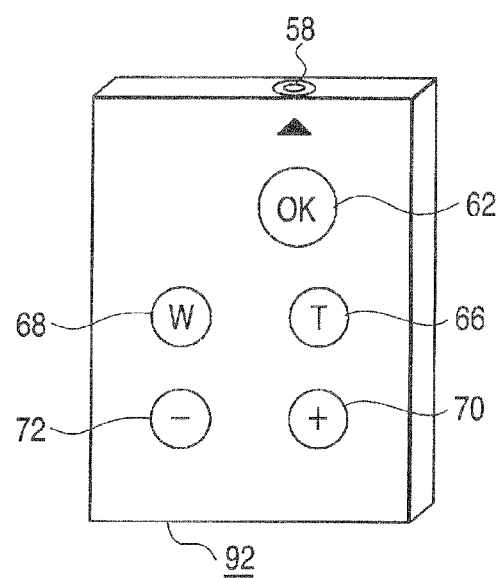
FIG. 7 is a perspective view showing the outer configuration of a further optical remote controller providing a common remote controller as another example of the commanding device according to the first embodiment.

Next, with reference to FIG. 7, the optical remote controller 92 for the camera will be explained as an example of the common remote controller constituting a remote controller without the authentication information. This optical remote controller 92 without the authentication information can transmit only the general command and has neither the authentication setting switch 64 nor the authentication function. Also, it has neither the light-receiving unit for the identification information nor the information unique to the commanding device. As described later, therefore, the commands for the functions permitted for the image acquisition device in permit mode or limit mode can be transmitted.

Specifically, in this optical remote controller 92, the light-emitting unit 58 for transmitting the general command is configured at the end surface thereof, and the general command is transmitted from the light-emitting unit 58 to the image acquisition device such as the digital camera 10 or the digital movie camera 54.

Also, the upper surface of the optical remote controller 92 has arranged thereon an image command button 62, a telephoto button 66, a wide-angle button 68, a plus button 70, a minus button 72, etc. From the optical remote controller 92, an image acquisition execution command is transmitted to the camera proper 14 as an image acquisition command when the image acquisition command button 62 is depressed. Upon depression of the telephoto button 66, the optical remote controller 92 transmits the T button command to the camera proper 14 as an image acquisition command to drive the lens unit 16 to telescopic mode. Upon depression of the wide-angle button 68, the W button command to drive the lens unit 16 to wide angle mode is transmitted as an image acquisition command to the camera proper 14. Upon depression of the plus button 70, a command to move the select item for menu selection or frame feed for reproduction is transmitted as an image acquisition command. Upon depression of the minus button 72, a command to move the select item for menu selection and frame feed for reproduction is transmitted as an image acquisition command.

Figure 8:
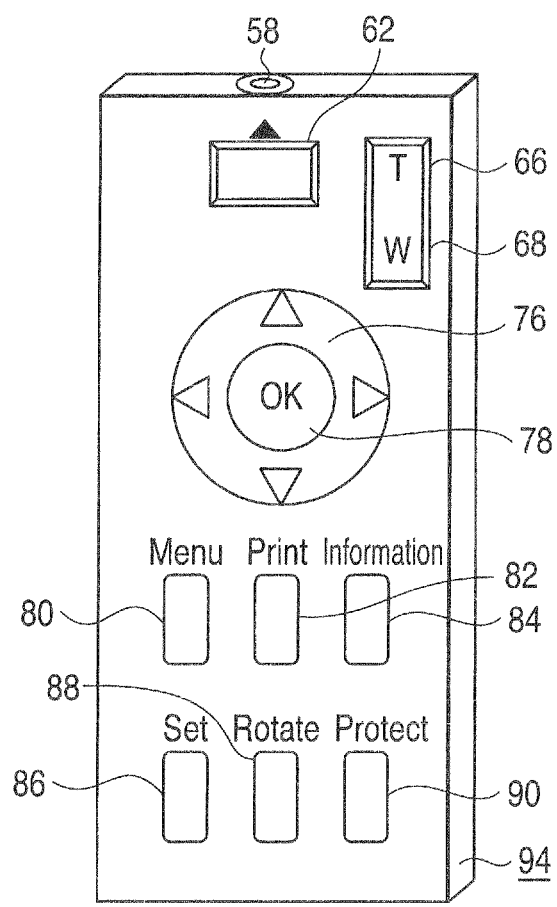
FIG. 8 is a perspective view showing the outer configuration of another optical remote controller providing a common remote controller as another example of the commanding; device according to the first embodiment.

Next, with reference to FIG. 8, another optical remote controller 94 for the camera will be explained as another example of the common remote controller. This optical remote controller 94 without the authentication information can transmit only the general command and has neither the authentication setting switch 64 nor the authentication function. Also, it has neither the light-receiving unit for the identification information nor the information unique to the commanding device. As described later, the commands for the functions permitted for the image acquisition device in permit mode or limit mode can be transmitted.

Specifically, the optical remote controller 94 also has a light-emitting unit 58 at the end surface thereof for command transmission, and transmits the general command to the image acquisition device as a command from the light-emitting unit 58. On the upper surface of the optical remote controller 94, on the other hand, there are arranged an image acquisition command button 62, a telephoto button 66, a wide-angle button 68, an arrow switch 76, an OK button 78, a menu button 80, a print button 82, an information button 84, an erase button 86, a rotation button 88, a protection button 90, etc.

The optical remote controller 94, upon depression of the image acquisition command button 62, transmits the image acquisition execution command as an image acquisition command to the image acquisition device. Upon depression of the telephoto button 66, the T-button command is transmitted as an image acquisition command. Upon depression of the wide-angle button 68, the W-button command is transmitted as an image acquisition command. The arrow switch 76 is a four-way seesaw switch adapted to be depressed at any of four points including up, down, left and right, and transmits the operation command corresponding to the depressed direction as an image acquisition command. Upon depression of the OK button 78, the OK command is transmitted as an image acquisition command.

Also, upon depression of the menu button 30, a menu command is transmitted as an image acquisition command. Upon depression of the erase button 86, an erase command is transmitted as an image acquisition command. Upon depression of the print button 82, a print command is transmitted as an image acquisition command. Upon depression of the information button 84, an information display command is transmitted as an image acquisition command. Upon depression of the rotation button 88, a rotation command is transmitted as an image acquisition command. Upon depression of the protect button 90, a protect command is transmitted as an image acquisition command.

Figure 9:
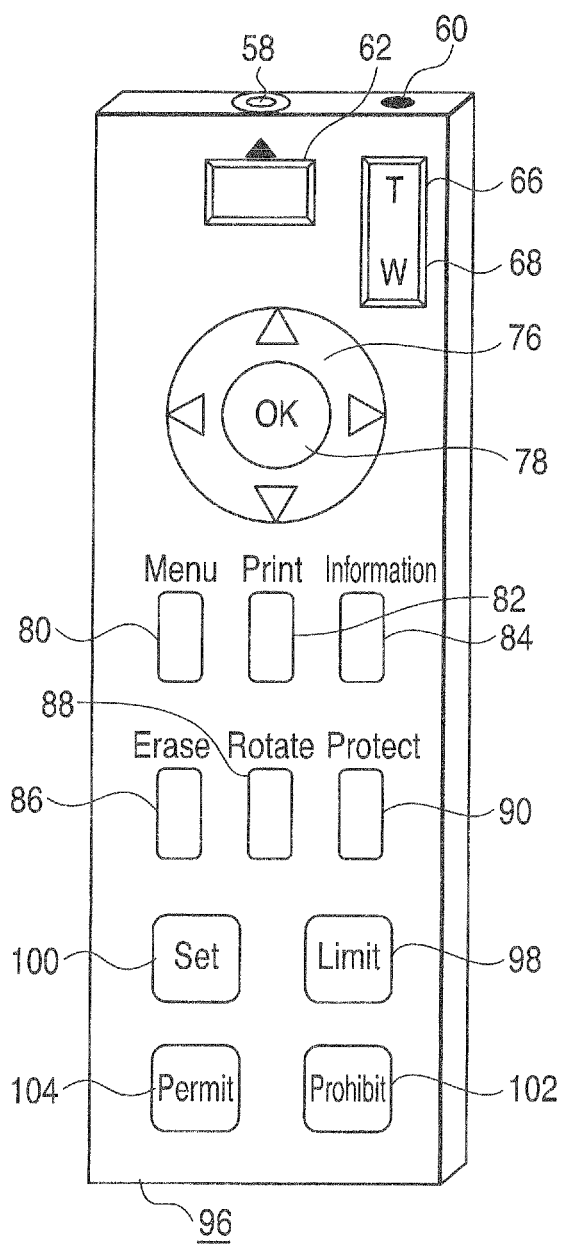
FIG. 9 is a perspective view showing the outer configuration of a further optical remote controller providing an authentication command remote controller as another example of the commanding device according to the first embodiment.

Next, with reference to FIG. 9, an optical remote controller 96 for the camera will be explained as an example of the authentication command remote controller. The functional members similar to the corresponding ones of the optical remote controller 12 are designated by the same reference numerals, respectively.

Specifically, this optical remote controller 96 has a light-emitting unit 58 for command transmission at the end surface thereof, and the authentication command is transmitted from the light-emitting unit 58 as a command to the image acquisition device. Further, a light-receiving unit 60 for receiving the identification information is arranged at the particular end surface to receive the identification information transmitted from the light-emitting element 24 arranged on the camera proper 14 of the digital camera 10 or the digital movie camera 54 making up an image acquisition device to transmit the identification information.

On the upper surface of the optical remote controller 96, on the other hand, there are arranged an image acquisition command button 62, a telephoto button 66, a wide-angle button 68, an arrow switch 76, an OK button 78, a menu, button 80, a print button 82, an information button 84, an erase button 86, a rotation button 88, a protection button 90, a limit button 98, a setting button 100, a prohibit button 102, a permit button 104, etc. are arranged. All the commands transmitted from the optical remote controller 96 are the authentication commands, i.e. the commands with the authentication information.

The optical remote controller 96, upon depression of the image acquisition command button 62, transmits the image acquisition execution command as an image-acquisition command to the camera proper 14. Upon depression of the telephoto button 66, the T-button command is transmitted as an image acquisition command. The camera proper 14 that has received it drives the lens unit 16 to the telephoto side during the image acquisition operation, or enlarges the image or controls the multiscreen display in the monitor 38 during the play mode. Similarly, upon depression of the wide-angle button 68, the W-button command is transmitted as an image acquisition command. In the camera proper 14 that has received the W button command, the lens unit 16 is driven to the wide-angle side during the image acquisition operation, while the image is reduced or the multiscreen display is controlled in the monitor 38 during the play mode.

Also, the arrow switch 76 is a four-way seesaw switch adapted to be depressed at any of four points including up, down, left and right, and transmits the operation command corresponding to the depressed direction as an image acquisition command. This switch is used to designate the selection items to the positions up, down, left or right at the time of selecting a plurality of items displayed on the monitor 38 of the image acquisition device or to feed the frames before and after the reproduced image. The OK button 78 is a switch for determining the selection item on the monitor 38 at the time of setting conditions, and upon depression thereof, transmits the OK command as an image acquisition command. The menu button 80 is a switch for displaying the various condition setting menus on the monitor 38, and upon depression thereof, transmits a menu command as an image acquisition command. Upon depression of the erase button 86, an erase command is transmitted as an image acquisition command. As long as the erase function is not limited in play mode at the time of reception thereof in the camera proper 14, the erase execution confirmation is displayed on the monitor 38. Then, upon depression of the OK button 78 after selecting the erase by the arrow switch 76, the image being displayed is erased.

Upon depression of the print button 82, a print command is transmitted as an image acquisition command. In the camera proper 14 that has received the print command, the print menu is displayed on the monitor 38, and if the camera proper 14 and the printer are connected to each other, the image in the camera proper 14 can be printed out. Upon depression of the information button 84, an information display command is transmitted as an image acquisition command. In the camera proper 14 that has received it displays the information of the display image on the monitor 33. Upon depression of the rotation button 88, a rotation command is transmitted as an image acquisition command. In the camera proper 14 that has received it, the display image of the monitor 38 is rotated by 90 degrees. Upon depression of the protect button 90, a protect command is transmitted as an image acquisition command. In the camera proper 14 that has received it, the image displayed on the monitor 38 is protected from erasure by attaching a protective flag thereto. Incidentally, this protective flag can be cleared on the menu displayed by the operation of the menu button 80.

Also, upon depression of the limit button 98, a limit command is transmitted as the authentication mode switching command. In accordance with the reception of the command, the camera proper 14 is switched to limit mode. Upon depression of the setting button 100, on the other hand, a setting command is transmitted as the authentication mode switching command. In accordance with the reception of this command, the camera proper 14 is switched to setting mode. Upon depression of the prohibit button 102, a prohibit command is transmitted as the authentication mode switching command. In accordance with the reception of this command, the camera proper 14 is switched to prohibit mode. Upon depression of the permit button 104, on the other hand, a permit command is transmitted as the authentication mode switching command, and in accordance with the reception of this command, the camera proper 14 is switched to permit mode.

As described above, this optical remote controller 96 has no authentication setting switch, and the buttons for the commands for the image acquisition operation and the buttons for switching the authentication mode are independent of each other. To switch the authentication mode is so important that in order to prevent an operation error, such as by accidental touching, a configuration may be employed in which a switching command that switches to a corresponding authentication mode is transmitted in the case where any of the buttons 98, 100, 102, 104 is depressed at the same time as the image acquisition command button 62.

The remote controllers 12, 74, 92, 94 and 96 described above are each an example of the commanding device, and the invention is not of course limited to the above-mentioned configuration. For example, switches and buttons may be added.

Next, the electrical configuration of the digital camera 10 will be explained with reference to FIG. 10.

The digital camera 10 includes an imager element 106 for converting the image of an object focused thereon by the lens unit 16 into an electrical signal. The lens unit 16 focuses the image of the object on the imager element 106. Depending on the type of the image acquisition device, the lens unit 16 is of a single-lens reflex type or shutter type and may have a zoom function, auto focus function and brightness reduction function. As the imager element 106, a CCD type or CMOS type is used, and pixels on the order of one million or more than ten million is used. An image acquisition processing circuit 108 processes the signal from the imager element 106, and by analog-to-digital conversion, records it in a built-in memory 110 or a removable memory 112 in a predetermined format set in the menu or the like. As such a format, the RAW data format with the image not compressed, the JPEG format based on the standard compression scheme, or in the case of dynamic images, the motion JPEG format, the MPEG2 or MPEG4 format is used.

In an identification information light-emitting unit 114, the identification information is transmitted from the light-emitting element 24 to the optical remote controller 12, 74 or 96 with a function for receiving the identification information. Specifically, as explained with reference to FIG. 12, a main control unit 116 drives a transistor 114C by modulating the carrier wave of a transmission unit 114B through a modulator 114A based on the information of a identification information generating unit 116A, and the identification information, etc. are transmitted to the optical remote controller 12, 74, 96 from the light-emitting element 24. In a light-receiving unit 118, on the ether hand, the command light from the optical remote controller 12, 74, 92, 94 or 96 is converted into an electrical signal by the photodetector element 20, amplified, demodulated, and in collaboration with the main control unit 116, decoded and converted into a command data.

In the case where a still image or a dynamic image can be acquired, a zoom control unit 120 drives the lens unit 16 by operating the zoom switch 46 of the camera proper 14 or the telephoto button 66 or the wide-angle button 68 of the remote controller 12, 74, 92, 94 or 96. An exposure control unit 122, in accordance with the image acquisition conditions set in the digital camera 10, controls the diaphragm or the imager element 106 in accordance with the brightness of the object. A distance measurement control unit 124 controls the operation of driving the lens unit 16 and the detection of the focal point using the signal from the imager element 106.

An image processing circuit 126, in collaboration with the program and the CPU of the main control unit 116, executes such processes as the enlargement/reduction, compression/expansion, distortion correction, color correction, noise removal, synthesis and rotation of the image. The removable memory 112 for recording the image is configured of a semiconductor memory card and a hard disk drive, and can be mounted on or demounted from the connector (not shown) of the camera proper 14. This removable memory 112 has the capacity of several tens of megabytes to several gigabytes to record the image and the attribute information thereof. An encryption/decryption circuit 128 is used to encrypt the image recorded and to decrypt the encrypted image in the removable memory 112 or used for encryption and decryption of the authentication information, etc. This process can be omitted, however, and can alternatively be executed according to a program by the CPU of the main control unit 116. An external interface 130 includes the signal conversion function and the connector for connecting the digital camera 10 to the printer or the personal computer, the external storage device such as the hard disk or the TV receiver (hereinafter referred to simply as TV). The connection with the printer can use the Picto-Bridge, while the personal computer or the external storage device can be connected using USB, and with the TV using the video cable or the like.

A bus 132 is a group of common signal lines connecting the units, and includes the data bus, the address bus and the control bus.

The main control unit 116, though not specifically illustrated, is a microcomputer system including CPU, ROM, RAM, register, counter, timer and the rewritable nonvolatile memory to take charge of control, display and the data processing of the digital camera 10 as a whole.

Also, the main control unit 116 includes an identification information generating unit 116A for generating the identification information for permitting the digital camera 10 to identify the remote controller with the authentication information (the optical remote controller 12, 74 constituting the authentication mode switching remote controller, or the optical remote controller 96 constituting the authentication command remote controller). This identification information is first transmitted to the remote controller with the authentication information from the identification information light-emitting unit 114 described above, and the authentication command from the particular remote controller with the authentication information is transmitted together with the identification information. By doing so, it is possible to positively identify whether the particular remote controller corresponds to the digital camera 10 or not. This identification information, as described later, includes the fixed identification information and the variable identification information.

Also, this main control unit 116 may include a unique information storage unit 116B for storing the information unique to the digital camera 10 so that the unique information stored in the unique information storage unit 116B may be transmitted to the remote controller with the authentication information as a part of the identification information. By doing so, the correspondence between the digital camera 10 and the remote controller with the authentication information can be more positively established.

Desirably, these identification information are recorded in a nonvolatile memory, and the fixed identification information and the unique identification information are recorded before factory shipment or distribution of the digital camera 10. Further, this identification information is desirably encrypted from the viewpoint of preventing any illegal use.

The built-in memory 110, which can record the image in the case where an acquired image is selectively recorded only in the built-in memory, cannot be removed from the digital camera 10. Further, the built-in memory 110 can record the image acquired in prohibit mode, and also in the case where the removable memory 112 is full or lacking in limit mode or permit mode. A suitable built-in memory 110 is a semiconductor memory of several tens of megabytes to several gigabytes or a miniature hard disk of the order of several hundred megabytes to ten gigabytes.

A mode memory 134 is configured of a nonvolatile memory and capable of storing and holding the authentication mode. The storage is maintained even when power is switched off. Even in the case where the battery is removed willfully or negligently in prohibit mode, therefore, the particular prohibit mode set is held and is in effect at the next time of power on.

The flash 18 emits a flash light in accordance with the flash mode set by menu at the time of a still image acquisition. The flash mode includes a mode in which light is automatically emitted in a dark or backlit scene, a soft light-emission mode in which light is emitted softly, a red-eye reduction mode in which several preliminary light emissions are made before the main light emission, a forcible light-emission mode in which light is emitted without fail and a light-emission prohibit mode in which no light is emitted. A light-emitting unit 136 controls the lighting of the light-emitting element 22. A display control unit 138 controls the display of the acquired image, reproduced image, the menu, the information or the alarm characters or symbols on the monitor 38. A voice processing unit 140 processes and records the sound acquired by the microphone 26 during the image acquisition operation, reproduces and supplies the recorded sound to the speaker 52 during the play mode, or supplies the alarm sound or the like to the speaker 52.

In a power circuit 142, the power from a battery 144 or an external power supply (not shown) is converted into a required voltage and supplied to each part. The battery 144 is replaceable and includes a lithium ion rechargeable battery or a dry cell.

A prohibit timer 146 times out and sets the authentication mode of the mode memory 134 to prohibit mode upon the elapse of a preset time after starting. In collaboration with the battery 144 and the power circuit 142, the prohibit timer 146 is supplied with power and continues to count even in the case where the camera proper 14 is powered off. Upon the elapse of the preset time, the authentication mode of the mode memory 134 is set to prohibit mode. In the process, the prohibit mode may be set according to a program after power is supplied to the main control unit 116 and the mode memory 134 for a short time. As an alternative, the mode memory 134 may be set to the prohibit mode by generating the prohibit mode setting address or the prohibit mode data and driving the control bus for a short time in such a manner that the prohibit mode of the mode memory 134 can be set by the prohibit timer 146 without the intermediary of the main control unit 116. Also, the power circuit 142 may be assigned the voltage monitor function to set the prohibit mode before the voltage reaches an insufficient level for the circuit operation. In the case where the battery 144 is pulled off, the prohibit mode may be forcibly set upon lapse of a preset time taking the presence or absence of the backup battery or capacitor into consideration.

By employing this method, the situation can be prevented in which the battery 144 is pulled off willfully or negligently or left consumed up while the backup battery or capacitor is consumed to such an extent that the prohibit timer 146 cannot perform the counting operation with the result that the prohibit mode cannot be set upon lapse of the preset time, thereby making it possible to use the digital camera 10.

The power of the camera proper 14 is switched on/off by the power switch 30, and while the power is on, the power lamp 34 is lighted. The shutter switch 28, the transmission button 32, the select switch 36, the arrow switch 40, the OK button 42, the menu button 44, the zoom switch 46, the erase button 48 and the print button 50 are similar to those explained with reference to FIGS. 1 and 2. Each switch and button are connected to the interrupt line of the CPU of the main control unit 116 and/or the input/output port.

The digital movie camera 54 is formed to have the appearance in the shape taking the operability for the protracted dynamic image acquisition operation into consideration. The basic functional configuration, however, is similar to that of the digital camera 10 shown in FIG. 10.

Figure 11:
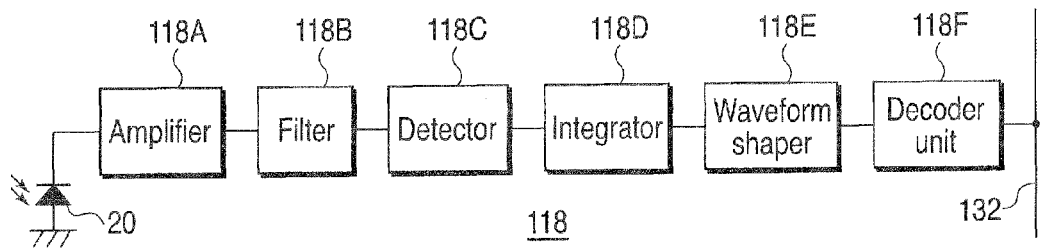
FIG. 11 is a block diagram showing the configuration of a light-receiving unit of the digital camera.

Next, the configuration of the light-receiving unit 118 in the digital camera 10 will be explained with reference to FIG. 11.

The photodetector element 20 converts the light from the optical remote controller 12, 74, 82, 94 or 96 into an electric current. Incidentally, the photodetector element 20 preferably has, on the front surface thereof, an optical filter (not shown) for passing the light conforming with the wavelength involved thereby to remove the effect of the external light disturbance. The current converted by the photodetector element 20 is amplified by an amplifier 118A and, after the band conforming to the carrier frequency is passed by a filter 118B, detected by a detector 118C. Thus, the carrier frequency component is removed by an integrator 118D thereby to reproduce the signal component. This reproduced signal component is shaped by a waveform shaper 118E and input to a decoder unit 118F. In the decoder unit 118F, the general command or the authentication command is decoded and the main control unit 116 is notified through the bus 132.

Next, the configuration of the identification information light-emitting unit 114 of the digital camera 10 will be explained with reference to FIG. 12.

In the modulator 114A, the carrier wave generated by the oscillator 114B is modulated by the signal from the main controller 116 and thus the transistor 114C is driven thereby to blink the light-emitting element 24. The resistor 114D is for limiting the current. The light-emitting element 24, which is often an infrared light-emitting diode having a wavelength of 900 to 950 mm, may alternatively emit other wavelengths or visible light.

Next, an example of the electrical configuration of the optical remote controller 12 will be explained with reference to FIG. 13 as an example of the remote controller with the authentication information (authentication mode switching remote controller).

The control unit 148, though not specifically shown, includes a CPU and a memory to control the optical remote controller 12 as a whole or execute the display and data processing. The control unit 148 reads the state of the authentication setting switch 64 when any of the buttons 62, 66 to 72 is turned on and produces a command signal corresponding to the particular state. Also, the control unit 148 includes an authentication information generating unit 148A for generating the authentication information transmitted from the remote controller to permit the digital camera 10 or the digital movie camera 54 as the image acquisition device to authenticate the remote controller with the authentication information. The authentication information includes, as described later, the image acquisition device identification information transmitted from the image acquisition device or the information derived from it and the unique information of the image acquisition device. Also, the control unit 148 includes a unique information storage unit 148B for storing the information unique to the optical remote controller 12 to authenticate the image acquisition device corresponding to the remote controller. This unique information is transmitted to the image acquisition device as a part of the authentication information. These authentication information are recorded in the nonvolatile memory, and the unique identification information is desirably recorded before factory shipment or distribution of the optical remote controller 12. Further, the identification information is desirably encrypted to prevent any illegal use.

The control unit 148 produces the signal as long as the button is kept depressed for a preset length of time. In a modulator 150, the carrier wave produced by an oscillator 152 is modulated by the signal from the control unit 148 thereby to drive a transistor 154 and blink a light-emitting element 58A of the light-emitting unit 58. The resistor 156 is for limiting the current. The light-emitting element 58A, which is often an infrared light-emitting diode having a wavelength of 900 to 950 mm, may alternatively be an element for emitting other wavelengths or visible light.

Also, the control unit 148 includes a light-receiving processor 148C whereby the identification information received from the image acquisition device by the light-receiving element 60A of the light-receiving unit 60 is processed in the manner as explained with reference to FIG. 14.

Figure 13:
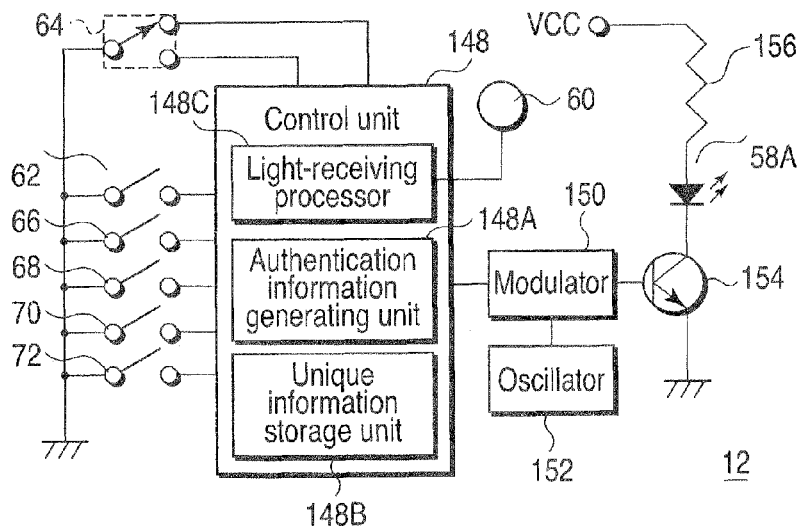
FIG. 13 is a block diagram she-wing an example of the electrical configuration of the optical remote controller shown in FIG. 1.

Incidentally, the electrical configuration of the optical remote controller 92 as a common remote controller without the authentication information is similar to the corresponding configuration of the optical remote controller 12 with the authentication information shown in FIG. 13, and therefore, neither illustrated nor explained. The optical remote controller 92 without the authentication information, however, is not equipped with the light-receiving element 60A of the light-receiving unit 60, the authentication information generating unit 148A of the control unit 148, the unique information storage unit 148B and the light-receiving processor 148C.

Next, an example of the configuration of the light-receiving processor 148C in the control unit 148 of the optical remote controller 12 with the authentication information will be explained with reference to FIG. 14.

The light-receiving element 60A of the light-receiving unit 60 converts the identification information light emitted by the digital camera 10 or the digital movie camera 54 into a current. The light-receiving element 60A of the light-receiving unit 60 preferably has, on the front surface thereof, an optical filter (not shown; for passing the light conforming with the wavelength involved thereby to remove the effect of the external light disturbance. The current converted by light-receiving element 60A of the light-receiving unit 60 is amplified by an amplifier 148C1 and, after the band conforming to the carrier frequency is passed by a filter 148C2, detected by a detector 148C3. Thus, the carrier frequency component is removed by an integrator 148C4 thereby to reproduce the signal component. This reproduced signal component is shaped by a waveform shaper 148C5 and input to a decoder unit 148C6. In the decoder unit 148C6, the general command or the authentication command is decoded.

Next, an example of the electrical configuration of the optical remote controller 74 as an example of the remote controller with the authentication information (the authentication mode switching remote controller) will be explained with reference to FIG. 15.

The control unit 148 reads the state of the authentication setting switch 64 when any of the buttons and switches 62, 66, 68, 76 to 90 is turned on and produces a command signal corresponding to the particular state. Also, the control unit 146 includes the authentication information generating unit 148A for generating the authentication information transmitted from the remote controller to permit the digital camera 10 or the digital movie camera 54 as the image acquisition device to authenticate the remote controller with the authentication information. The authentication information includes, as described later, the image acquisition device identification information transmitted from the image acquisition device or the information derived from it and the unique information of the image acquisition device. Also, the control unit 148 includes the unique information storage unit 148B for storing the information unique to the optical remote controller 74 to authenticate the image acquisition device corresponding to the remote controller. This unique information is transmitted to the image acquisition device as a part of the authentication information. These authentication information are recorded in the nonvolatile memory, and the unique identification information is desirably recorded before factory shipment or distribution of the optical remote controller 74. Further, the identification information is desirably encrypted to prevent any illegal use.

The control unit 148 produces the signal as long as a button or switch is kept depressed for a preset length of time. In the case where the carrier frequency is 40 kHz, the use of the control unit 148 formed of a one-chip microcomputer capable of driving the light-emitting element 58A of the light-emitting unit 58 directly makes it possible to produce the high-frequency modulation signal in accordance with a program in a configuration omitting the modulator 150, the oscillator 152 and the transistor 154. As a result, the light-emitting unit 58 connected to the power supply through the current-limiting resistor 156 is connected directly to the control unit 148.

Figure 14:
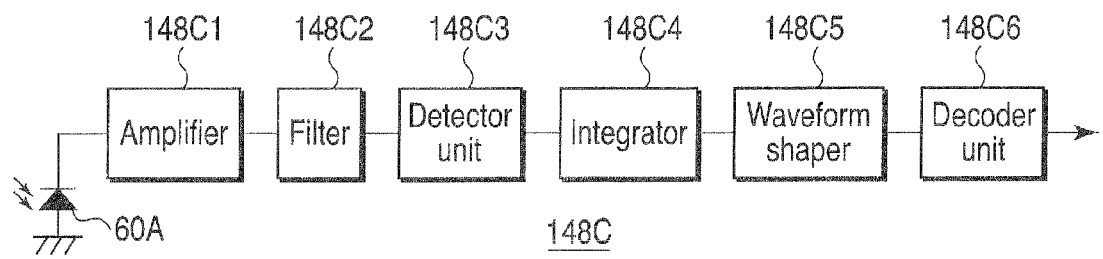
FIG. 14 is a block diagram showing the configuration of a light-receiving processing unit of the optical remote controller shown in FIG. 1.

Also, the control unit 148 includes the light-receiving processor 148C in which the identification information received from the image acquisition device by the light-receiving element 60A of the light-receiving unit 60 is processed as shown in FIG. 14.

Figure 15:
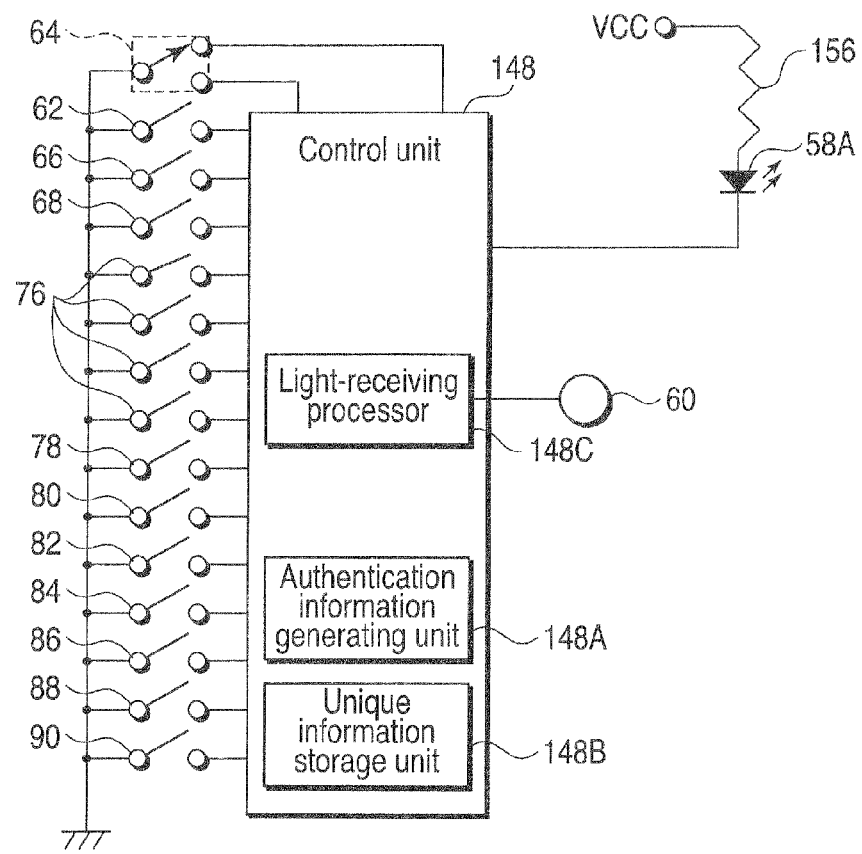
FIG. 15 is a block diagram showing an example of the electrical configuration of the optical remote controller shown in FIG. 6.

Incidentally, the electrical configuration of the optical remote controller 94 as a common remote controller without the authentication information is similar to that of the optical remote controller 74 with the authentication information shown in FIG. 15, and therefore, neither illustrated nor explained. The optical remote controller 94 without the authentication information, however, is not equipped with the light-receiving element 60A of the light-receiving unit 60, the light-receiving processor 148C, the authentication information generating unit 148A of the control unit 148 and the unique information storage unit 148B.

Next, an example of the electrical configuration of the optical remote controller 96 as an example of the remote controller with the authentication information (the authentication command remote controller) will be explained with reference to FIG. 16.

When any of the buttons and switches 62, 66, 68, 76 to 90, 98 to 104 is turned on, the control unit 148 produces a command signal. Also, the control unit 148 includes the authentication information generating unit 148A for generating the authentication information transmitted from the remote controller to permit the digital camera 10 or the digital movie camera 54 as the image acquisition device to authenticate the remote controller with the authentication information. The authentication information includes, as described later, the image acquisition device identification information transmitted from the image acquisition device or the information derived from it and the unique information of the image acquisition device. Also, the control unit 148 includes the unique information storage unit 148B for storing the information unique to the remote controller to authenticate the image acquisition device corresponding to the remote controller. This unique information is transmitted to the image acquisition device as a part of the authentication information. These authentication information are recorded in the nonvolatile memory, and the unique identification information is desirably recorded before factory shipment or distribution of the optical remote controller 96. Further, the identification information is desirably encrypted to prevent any illegal use.

The control unit 148 produces the signal as long as a button or switch is kept depressed for a preset length of time. In the case where the carrier frequency is 40 kHz, the use of the control unit 148 formed of a one-chip microcomputer capable of driving the light-emitting element 53A of the light-emitting unit 58 directly makes it possible to produce the high-frequency modulation signal in accordance with a program in a configuration omitting the modulator, the oscillator and the transistor. As a result, the light-emitting unit 58 connected to the power supply through the current-limiting resistor 156 is connected directly to the control unit 148.

Also, the control unit 148 includes the light-receiving processor 148C in which the identification information received from the image acquisition device by the light-receiving element 60A of the light-receiving unit 60 is processed as shown in FIG. 14.

Next, the signals generated by the digital camera 10 or the digital movie camera 54 as the image acquisition device and the optical remote controller 12, 74, 92, 94 or 96 as the commanding device will be explained with reference to FIGS. 17 to 20.

Figure 17:
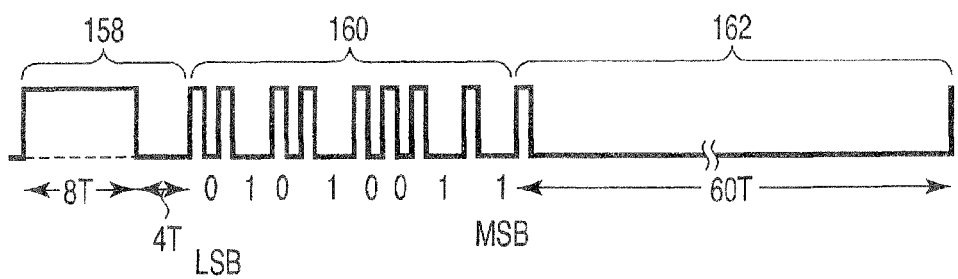
FIG. 17 is a diagram showing the fundamentals of a transmission data signal produced by the optical remote controller.

In transmitting the 1-byte data of 8 bits, the transmission data signal, as shown in FIG. 17, is configured of a leader code 158, an 8-bit data portion 160 and a stop code 162. FIG. 13 is a diagram showing the structure of one bit of the data signal.

The binary "0" is expressed by one millisecond (ms) as the sum of the on and off states each equal to the signal unit time T of 500 microseconds (μs), and the binary "1" by 2 ms as the sum of the on state of 1T and the off state of 3T. The data signal shown in FIG. 17 includes the leader code 158 of 6 ms as the sum 12T of the on state of 8T and the off state of 4T, the 8-bit data ("01010011") having four binary 0s of 4 ms and four binary 1s of 8 ms for the total of 12 ms, and the stop code 162 having 60T of 30 ms. Thus, the data signal has a total of 48 ms.

Figure 19:
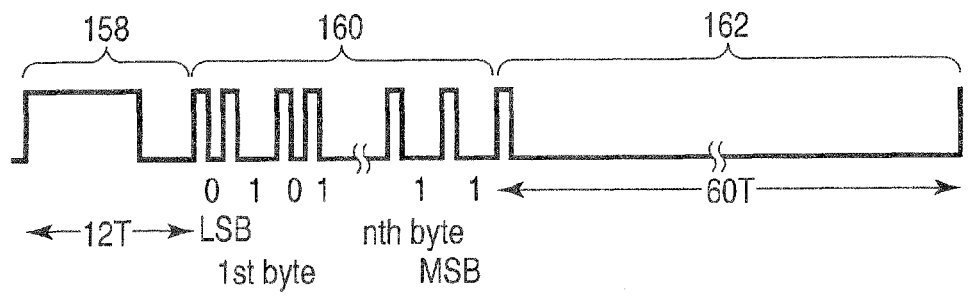
FIG. 19 is a diagram showing a case in which n bytes of data are transmitted.

In sending n bytes of data, as shown in FIG. 19, the leader code 158 is followed by n-byte data portion 160 which in turn is followed lastly by the stop code 162.

Figure 20:
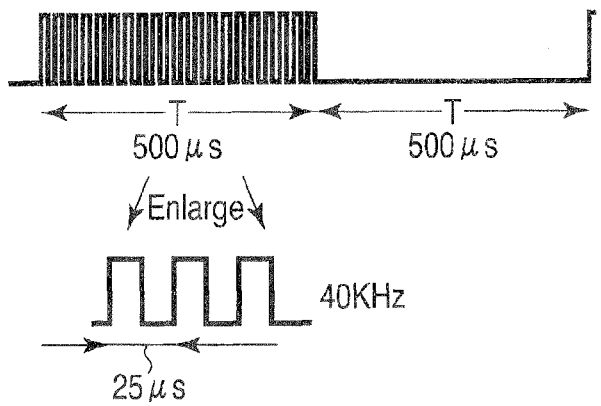
FIG. 20 is a diagram showing the output waveform of a modulation unit of the optical remote controller.

The output waveform as shown in FIG. 20 is produced by the modulator 150 of the optical remote controller 12 or 92 shown in FIG. 13. FIG. 20 shows the waveform of binary "0" obtained by modulating the carrier from the oscillator 152 with the data signal from the control unit 148 to drive the transistor 154. In the case of the carrier frequency of 40 kHz, 20 carrier wave pulses are inserted in 1T of 500 us thereby to blink the light-emitting element 58A of the light-emitting unit 58.

Figure 16:
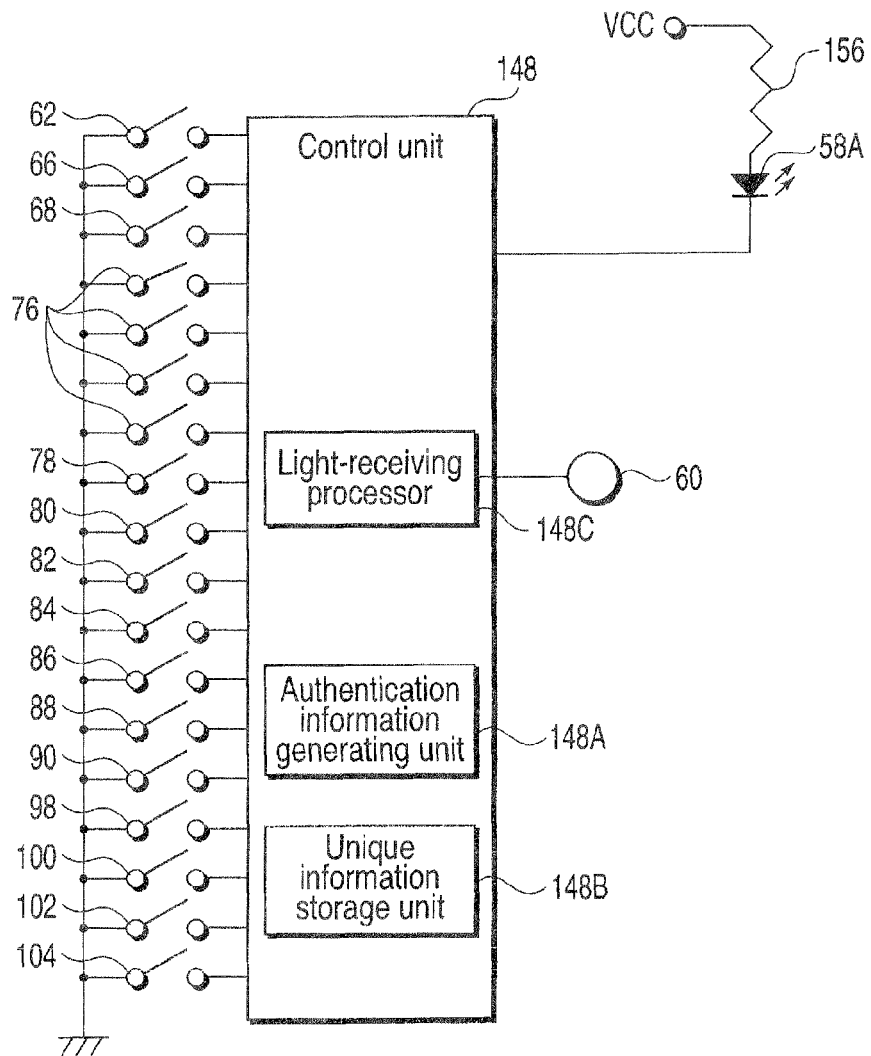
FIG. 16 is a block diagram showing an example of the electrical configuration of the optical remote controller shown in FIG. 9.

This is also the case with the waveform output to the light-emitting unit 58 from the control unit 148 of the optical remote controller 74 (and 94) shown in FIG. 15 and the optical remote controller 96 shown in FIG. 16.

Figure 12:
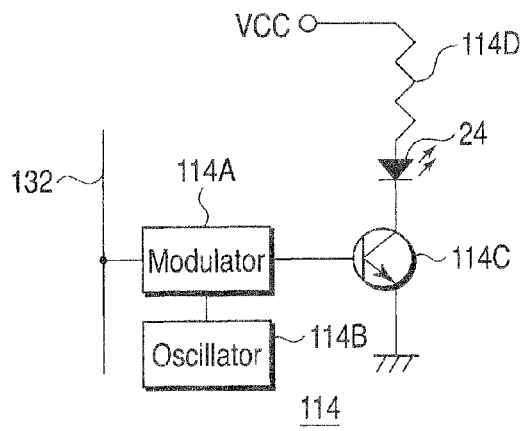
FIG. 12 is a block diagram showing the configuration of an identification information light-emitting unit of the digital camera.

This is also true for the identification information light-emitting unit 114 on the camera proper 14 side of the image acquisition device shown in FIG. 12.

In the camera proper 14, the light from the light-emitting unit 58 is reproduced by the photodetector 20 in the form approximate to the modulated waveform substantially as shown in FIG. 20 which carries various forms of noise and the DC component. After amplifying by the amplifier 118A and removing the noise through the bandpass filter 118B of the carrier frequency 40 kHz, the signal waveform shown in FIG. 19 is reproduced by the detector 118C, the integrator 118D and the waveform shaper 118E, followed by being converted into the data by the decoder unit 118F.

Similarly, in the light-receiving processor 146C of the optical remote controller 12, 74, 96, the light from the light-emitting element 24 of the camera proper 14 is reproduced by the light-receiving element 60A of the light-receiving unit 60 into a form substantially similar to the modulation waveform shown in FIG. 20 with various types of noise and DC components. After being amplified in the amplifier 148C1 and removing the noise in the bandpass filter 148C2 having a carrier frequency of 40 kHz, the signal waveform shown in FIG. 19 is reproduced by the detector 143C3, the integrator 148C4 and the waveform shaper 148C5 and converted into data by the decoder unit 148C6.

Next, with reference to FIG. 21, the steps of transmitting and receiving the identification information between the camera proper 14 and the remote controller with the authentication information (the optical remote controller 12, 74 as the authentication mode switching remote controller and the optical remote controller 96 as the authentication command remote controller) will be explained.

In the camera proper 14, the identification information is transmitted by the light-emitting element 24 (step ST12) in accordance with the generation of the cause of transmission of the identification information (step ST10). This transmission of the identification information is stopped after being carried out for a predetermined time or a predetermined number of times (step ST14)

One cause of transmission of the identification information is the depression of the transmission button 32 of the camera proper 14 (cause A). The causes of transmission other than the turning on of the transmission button 32 include the transmission of the identification information transmission command from the optical remote controller 12, 74 or 96 (step ST16) and the reception of the identification information transmission command (cause B), the transmission of the prohibit mode command from the optical remote controller 12, 74 or 96 (step ST18) and switching to prohibit mode upon reception of the prohibit mode command (cause C), and the power supply being switched on (cause D). These will be explained in detail later. Incidentally, in place of or in parallel with switching on the transmission button 32 of the camera proper 14, an identification information transmission command menu may be provided as one of the menus.

Also, in the optical remote controller 12, 74 or 96, the reception of the identification information generates an interruption in the control unit 148 (step ST20), and the identification information thus received is written in a corresponding memory (not shown) in the control unit 148 (step ST22). It is overwritten in the case where the identification information already written exists. Then, the reception of the identification information is announced (step ST24). This announcement will be explained in detail in the thirteenth embodiment later.

Next, the data format of the identification information will be explained.

Figure 22C:
FIG. 22C is a diagram showing another example of the data format of the identification information.

In the case where only the identification information is transmitted, as shown in FIG. 22A, the identification information 164 is transmitted in the state held between a reader code 166 and a stop code 168. Also, in addition to the identification information 164, a header 170 may be attached as shown in FIG. 22B to facilitate the information decoding at the receiving end. Further, as shown in FIG. 22C, an ECC 172 of P bytes may be added as the identification information for error correction to improve the transmission/reception reliability. The identification information 164 thus used may be the fixed information for each, type of the image acquisition device, the information unique to each unit of the image acquisition device, the variable information described later, or any combination thereof.

Figure 23A:
FIG. 23A is a diagram showing another example of the data format of the identification information.
Figure 23B:
FIG. 23B is a diagram showing another example of the data format of the identification information.
Figure 23C:
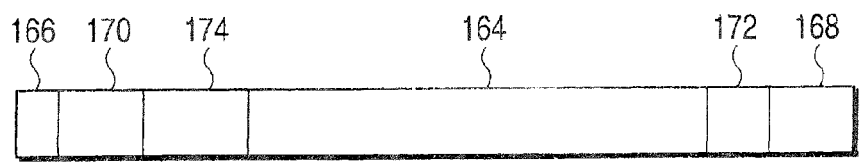
FIG. 23C is a diagram showing a further example of the data format of the identification information.

As another alternative, as shown in FIGS. 23A to 23C, the information 174 unique to the image acquisition device may be added, to those of FIGS. 22A to 22C, respectively. In the case where the information 174 unique to the image acquisition device and the identification information 164 are sent as the identification information, a random number, a value in the data table or a count value described later as variable information may be sent in combination. As a result, the security of the identification information can be improved.

The identification information is so important that it is desirably transmitted after being encrypted in the encryption/decryption circuit 128 shown in FIG. 10. As an alternative, the identification information may be encrypted by the main control unit 116 using the program and the CPU thereof. The identification information thus encrypted, after being received by the optical remote controller 12, 74 or 96 that is a commanding device, is provisionally decrypted by the program and the CPU of the control unit 148 of the optical remote controller 12, 74, 96, and after being encrypted again, transmitted together with the authentication command. As another alternative, the identification information may be kept encrypted and transmitted with the authentication command.

Next, the data format of the commanding device information of the optical remote controller will be explained.

Figure 24A:
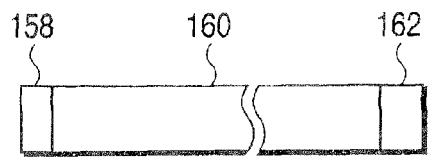
FIG. 24A is a diagram showing an example of the data format of a general command of the optical remote controller.
Figure 24B:
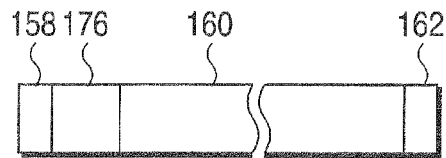
FIG. 24B is a diagram showing another example of the data format of a general command of the optical remote controller.
Figure 24C:
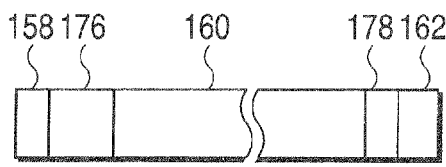
FIG. 24C is a diagram showing another example of the data format of a general command of the optical remote controller.

The general command from the optical remote controller 92 or 94 without the authentication information (the common remote controller), as shown in FIG. 24A, basically takes a form in which the data portion 160 indicating the content of the command is held between the leader code 158 and the stop code 162, and may be either fixed or variable in length. FIG. 24A corresponds to FIG. 19. Also, the general command, as shown in FIG. 24B, may be such that the data format or the type of the remote controller may be added in a fixed form with a header 176 attached before the data portion 160. Further, as shown in FIG. 24C, the data for error detection or the data for error correction (ECC 178) may be added after the data portion 160. As an alternative, the data bit pattern such as used in the commercially available remote controller for the home electronic appliances may be sent in an inverted form immediately following the data to detect the presence or absence of an error by coincidence or incoincidence between the two signals.

Figure 25A:
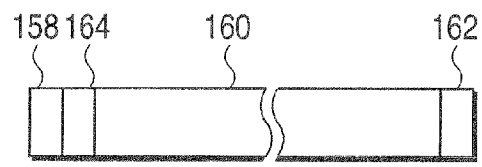
FIG. 25A is a diagram showing an example of the data format of an authentication command of the optical remote controller.
Figure 25B:
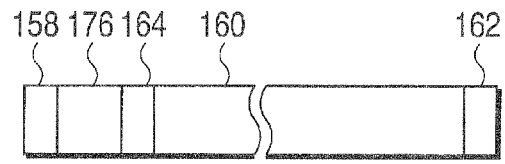
FIG. 25B is a diagram showing another example of the data format of an authentication command of the optical remote controller.
Figure 25C:
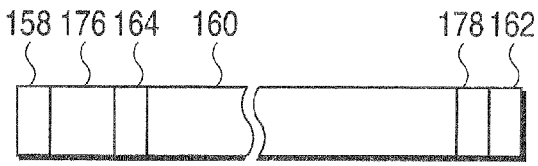
FIG. 25C is a diagram showing a further example of the data format of an authentication command of the optical remote controller.

Further, in the case where the identification information 164 received from the camera proper 14 is added to the authentication command, as shown in FIGS. 25A to 25C, the particular identification information 164 thus received is added and transmitted, or the identification information 164 may alternatively be transmitted as a part of the header 176 or the data section 160 (in which case, the data format is as shown in FIGS. 24A to 24C).

This identification information 164 is identical with the identification information which, as explained with reference to FIGS. 21 to 23C, is generated by the identification information generating unit 116A of the main control unit 116 of the camera proper 14 of the image acquisition device, transmitted using the light-emitting element 24 from the identification information light-emitting unit 114 and received by the light-receiving processor 148C in the control unit 148 using the light-receiving unit 60 of the optical remote controller 12, 74 or 96. This identification information is used by the camera proper 14 to determine whether the command has been transmitted from the correct remote controller or not. The main control unit 116 of the camera proper 14 that has received the authentication command compares the identification information 164 with the identification information transmitted by the camera proper 14 to confirm the identity therebetween, thereby making it possible to determine whether the optical remote controller 12, 74 or 96, that is a remote controller with the authentication information is the one intended by the holder of the camera proper 14. As a result, illegal use of the camera proper 14 by the remote controller that has not received the identification information 164 transmitted from the camera proper 14 can be prevented.

FIGS. 26A to 26C are diagrams showing the data formats of the authentication mode switching command as an authentication command of the optical remote controller 12, 74 or 96 that is the remote controller with the authentication information.

In the optical remote controller 12 or 74 as an authentication mode switching remote controller, the operating unit 64A of the authentication setting switch 64 is set at the authentication position 64C, and upon depression of the button assigned to prohibit, limit, setting or permit mode, the authentication mode switching command is transmitted as an authentication command from the optical remote controller 12 or 74. This authentication mode switching command is transmitted, as shown in FIG. 26A, for example, with the identification information 164 added thereto in the form of an authentication mode switching command data 180 corresponding to the depressed button and held between the reader code 158 and the stop code 162. As an alternative, this command signal is transmitted with the header 176 shown in FIG. 26B and further the ECC 178 shown in FIG. 26C added thereto. The signal of this format is received by the light-receiving element 20 of the camera proper 14 and converted into the authentication mode switching command by the decoder unit 118F.

The authentication mode switching command data 180, for distinction from the general data, uses a character string not normally appearing. For example, as shown in FIG. 27, it is expressed with four characters such as "ZZAA", "ZZBB", "ZZCC" or "ZZDD". Although the number of characters is arbitrary, a combination of certain characters and a certain length is required so that the authentication mode switching command can be positively distinguished.

Further, using the format shown in FIGS. 25A, to 25C, the command may be transmitted with the n bytes of the data portion 160 containing the character string for the authentication mode switching command. For example, the switching to the prohibit mode may use "ZZNINSHO=AA", the switching to the limit mode "ZZNINSHO=BB", the switching to the setting mode "ZZNINSHO=CC", and the switching to the permit mode "ZZNINSHO=DD".

Further, in the case of the optical remote controller 96 that is an authentication command remote controller, the authentication setting switch 64 is lacking, and the authentication mode switching buttons are arranged independently. Upon depression of the prohibit button 102, the limit button 98, the setting button 100 or the permit button 104, then, as shown in FIG. 26A, for example, the authentication mode switching command data 180 corresponding to the depressed button is transmitted in the form held between the reader code 158 and the stop cede 162 and with the identification information 164 added thereto. As an alternative, the authentication mode switching command data 180 is transmitted with the header 176 shown in FIG. 26B and further the ECC 178 shown in FIG. 26C added thereto.

Next, the authentication mode of the camera proper 14 will be explained. As shown in FIG. 28, the authentication mode includes four types, i.e., "prohibit mode", "limit mode", "setting mode" and "permit mode".

The "prohibit mode" is a mode not permitting the use for other than the remote controller with the authentication information. The camera proper 14 cannot be operated without the arrival of the command with the authentication information from the remote controller with the authentication information. Therefore, the remote controller 12, 74 or 96 that is the remote controller with the authentication information is carried or held separately from the camera proper 14, and the camera proper 14 is set in prohibit mode. Assume that the camera proper 14 is set in prohibit mode in this way. Then, should the camera proper 14 alone be lost and acquired by a third party, the third party cannot use the camera proper 14. The camera proper 14, if lost while the remote controller is held or carried, cannot be used on the one hand, and the leakage of the images in the camera proper 14 is prevented at the same time. Incidentally, even in the prohibit mode, the holder of the remote controller with the authentication information can operate the camera proper 14 using the remote controller with the authentication information (the optical remote controller 12, 74 or 96).

The "limit mode" is the mode in which only the functions permitted as described later with reference to FIG. 30 can be used regardless of the remote controller with the authentication information or the remote controller without the authentication information (common remote controller). This limit mode is conveniently used in the case where the camera proper 14 is lent temporarily or used by the owner only for image acquisition with the erasure or transfer prohibited.

The "setting mode" is the mode in which the limited function in the limit mode can be set or changed using the remote controller with the authentication information.

The "permit mode" is the mode in which the camera proper 14 can be freely used, i.e., the camera proper 14 is not locked and suitably used by the owner or his/her family members in a limited place such as a home where the risk of being stolen is low or in the case where the camera proper 14 is lent to others with the images therein erased. In this permit mode, the remote controller without the authentication information (common remote controller) can be operated. Also, the remote controller with the authentication mode switching function can execute all the functions other than the authentication switching. Further, the authentication command remote controller can be operated.

Next, the selection for designation and setting of the authentication mode at the time of switching on the power of the camera proper 14 will be explained with reference to FIG. 29.

This setting operation can designate either the setting ("prohibit mode") forcing the entrance into prohibit mode regardless of the storage mode of the mode memory 134 using the menu at the time of switching on power, or the setting in the authentication mode ("mode memory storage mode") stored in the mode memory 134 at the time of switching on power. This designation is made in such a manner that the authentication mode setting screen is displayed by menu at the time of switching on power, the plus button 70 and the minus button 72 of the optical remote controller 12 as the remote controller with the authentication information or the arrow switch 76 of the optical remote controller 74 or 96 as the remote controller with the authentication information is used for selection, and the operation is established by the image acquisition command button 62. The result of this setting can be held in the mode memory 134 or the nonvolatile memory in the main control unit 116.

By making the arrangement to set in "prohibit mode" at the time of switching on power, the camera proper 14 cannot be used alone without issuing a command from the remote controller with the authentication information or without switching to another authentication mode by the remote controller with the authentication information. In other words, the camera proper 14 can be locked. In the case where the arrangement is made to set in "mode memory storage mode" at the time of switching on power, on the other hand, the camera proper 14 enters the mode stored in the mode memory 134. Thus, the camera proper 14 can be used freely if in permit mode, or in accordance with the available function setting if in limit mode. In prohibit or setting mode, the remote controller with the authentication information is required. Once switched to permit or limit mode, however, the prohibit timer 146 starts and upon lapse of a set time, the prohibit mode is entered.

Next, the functions available in limit mode will be explained with reference to FIG. 30.

Upon depression of a setting switch of the remote controller with the authentication information (the authentication setting switch 64 and the wide-angle button 68 for the optical remote controller 12; the authentication setting switch 64 and the print button 82 for the optical remote controller 74; and the setting button 100 for the optical remote controller 96), the setting mode is entered. In this setting mode, the functions shown in FIG. 30 and the limiting flag are displayed on the monitor 38, and the item can be selected by the plus button 70 and the minus button 72 of the optical remote controller 12 or the optical remote controller 96, or the arrow switch 76 of the optical remote controller 74 or 96, as the case may be. Then, the item can be set by the operation using the image acquisition command button 62 to establish whether the operation is possible or impossible. The result of the setting is held in the mode memory 134 or the nonvolatile memory in the main controller 110 as a function limiting table.

In this case, a still image or a dynamic image can be acquired by the display "image acquisition possible".

In the case of the display "play possible", the image in the built-in memory 110 and the removable memory 112 can be reproduced. Further, the functions available in play mode can be set in detail. Specifically, the erasure is possible in "erase possible", the transfer to the personal computer is possible in "transfer possible", the printing on the printer is possible in "print possible", and the image can be edited in "edit possible".

In "menu possible", the image acquisition conditions, etc., can be changed.

Also, as described above, in the case where the switches or buttons of the camera proper 14 are depressed, the CPU of the control unit 116 of the camera proper 14 is interrupted, or reset and the corresponding operation is performed. FIG. 31 is a diagram showing the outline of this operation. Each corresponding operation will be described in detail later. For the present purpose, the corresponding operation is explained taking the digital camera 10 as an example. Depending on the type of the image acquisition device, the corresponding switch or button may be absent, or have a different name.

Assuming that the power switch 30 is depressed with the camera proper 14 in power off state, the power is switched on, and the CPU of the main control unit 116 is reset, thereby starting the operation. In the case where the power switch 30 is depressed with power on, on the other hand, the operation is ended and power supply is switched off.

Once the select switch 36 is turned, the present state is ended and transferred to a new state. Upon depression of the shutter switch 28, the "shutter switch operation flag" is set. This flag is read by the program, and the image acquisition operation starts or ends. Upon depression of the menu button 44, the menu is displayed on the monitor 38, and the setting can be changed by the arrow switch 40 and the OK button 42. Upon another depression of the menu button 44 while the menu is being displayed, the menu operation is ended. Upon depression of the zoom switch 46 on the T or W side, the zoom control unit 120 is driven. Upon depression of any part of the arrow switch 40, the corresponding switch flag is set. Upon depression of the OK button 42, the OK button flag is set. Upon depression of the erase button 48, the erase confirmation menu is displayed on the monitor 38, and upon depression of the corresponding confirmation switch, the erasure is executed. Upon depression of the print button 50, the print menu is displayed on the monitor 33, followed by a predetermined print operation.

Further, upon depression of the transmission button 32, an interrupt signal is generated, and the main control unit 116 transmits the identification information from the identification information light-emitting unit 114 in accordance with the particular interruption. As an alternative, upon depression of the transmission button 32, the corresponding switch flag is set, so that the main control unit 116 detects the state of the switch flag at a predetermined time as described in detail later, and in the case where the switch flag is so set, the identification information may be transmitted by the identification information light-emitting unit 114.

The flag set as described above may be cleared either at the time when it is read for an application or after a switch or a button held depressed (during the on state) is turned off.

Next, with reference to FIG. 32, an explanation will be given about the outline of the operation of the camera proper 14 corresponding to the case where a switch or a button of the remote controller is depressed.

Depending on the type of remote controller, the corresponding button, etc., may be absent. The camera proper 14, after power is switched on, is kept ready to receive the signal from the remote controller and perform the corresponding operation. Once the signal from the remote controller is caught, the program being executed by interrupt is suspended, and the signal from the remote controller is received, so that as explained with reference to FIGS. 24A to 26C, the receiving data of the data format of the remote controller is scored in a predetermined memory, and the operation is performed in keeping with the intended meaning.

Furthermore, in the case of the remote controller with the authentication information, in order to determine whether it has the camera identification information or not, the identification information is transmitted from the camera proper 14 as a part of the authentication information. The camera proper 14 compares the identification information contained in the transmitted authentication information with the identification information stored in the camera proper 14, and determines whether the particular remote controller is the one to which the identification information is sent from the camera proper 14, i.e. whether it is the remote controller formally authenticated by the camera proper 14.

In the case of the common remote controller without the authentication information such as the optical remote controller 92 or 94, the identification information is not used but the functions are permitted in permit mode or only the functions which are not limited can be used in limit mode. No function can be used in prohibit mode.

In the camera proper 14 that has received the command from the remote controller, the CPU of the main controller 110 performs each operation corresponding to the result of decoding the data received from the remote controller, in the manner described below.

Specifically, upon depression of the image acquisition command button 62 of the optical remote controller 12, 74, 92, 94 or 96, the image acquisition command flag is set. In the image acquisition mode, this flag is read by the program to perform the operation of starting or ending the image acquisition operation. In the setting mode, the selected item is established only for the optical remote controller 12, 74 or 96 with the authentication information. Upon depression of the telephoto button 66 or the wide-angle button 68 of the optical remote controller 12, 74, 92, 94 or 96, the zoom control unit 120 is driven. Upon depression of the plus button 70 or the minus button 72 of the optical remote controller 12 or 92, the corresponding switch flag is set.

Upon depression of any part of the arrow switch 76 of the optical remote controller 74, 94 or 96, the corresponding switch flag is set. Upon depression of the OK button 78 of the optical remote controller 74, 94 or 96, the OK button flag is set. Upon depression of the information button 84 of the optical remote controller 74, 94 or 96, the information of the image being displayed is displayed on the monitor 38, and upon another depression, the display of the particular information is suspended. Upon depression of the print button 82 of the optical remote controller 74, 94 or 96, the print menu is displayed on the monitor 38, followed by performing a predetermined printing operation. Upon depression of the menu button 80 of the optical remote controller 74, 94 or 96, the menu is displayed on the monitor 38, and can be set or changed by the arrow switch 76 and the OK button 78. Upon another depression of the menu button 80 while the menu is being displayed, the menu operation is ended. Upon depression of the erase button 86 of the optical remote controller 74, 94 or 96, the erasure confirmation menu is displayed on the monitor 38. Upon depression of a corresponding confirmation button, the erasure of the image being displayed is executed. Upon depression of the protection button 90 of the optical remote controller 74, 94 or 96, the protection flag is attached to the image displayed on the monitor 38. In the case where an attempt is made to erase this image with the protection flag by the operation of the erase button 86, an alarm to prevent the erroneous erasure is displayed on the monitor 38, so that the erasure is executed by selecting the erasure execution. Upon depression of the protection button 90 while the image with the protection flag is being displayed, the protection flag is cleared. Upon depression of the rotation button 88 of the optical remote controller 74, 94 or 96, the image displayed on the monitor 33 is rotated 90 degrees clockwise, and further depression rotates the image 90 degrees counterclockwise regarding to the original image. Still further depression restores the original image.

Incidentally, in the case of the optical remote controller 96 that is the remote controller with the authentication information (authentication command remote controller) having the limit button 98, the setting button 100, the prohibit button 102 and the permit button 104 as independent buttons, the depression of the limit button 98 transmits the limit command and the image acquisition device is switched to limit mode. Upon depression of the setting button 100, the setting command is transmitted, and the image acquisition device is switched to setting mode. Upon depression of the prohibit button 102, the prohibit command is transmitted, and the image acquisition device is switched to prohibit mode. Upon depression of the permit button 104, the permit command is transmitted and the image acquisition device is switched to permit mode.

Figure 33:
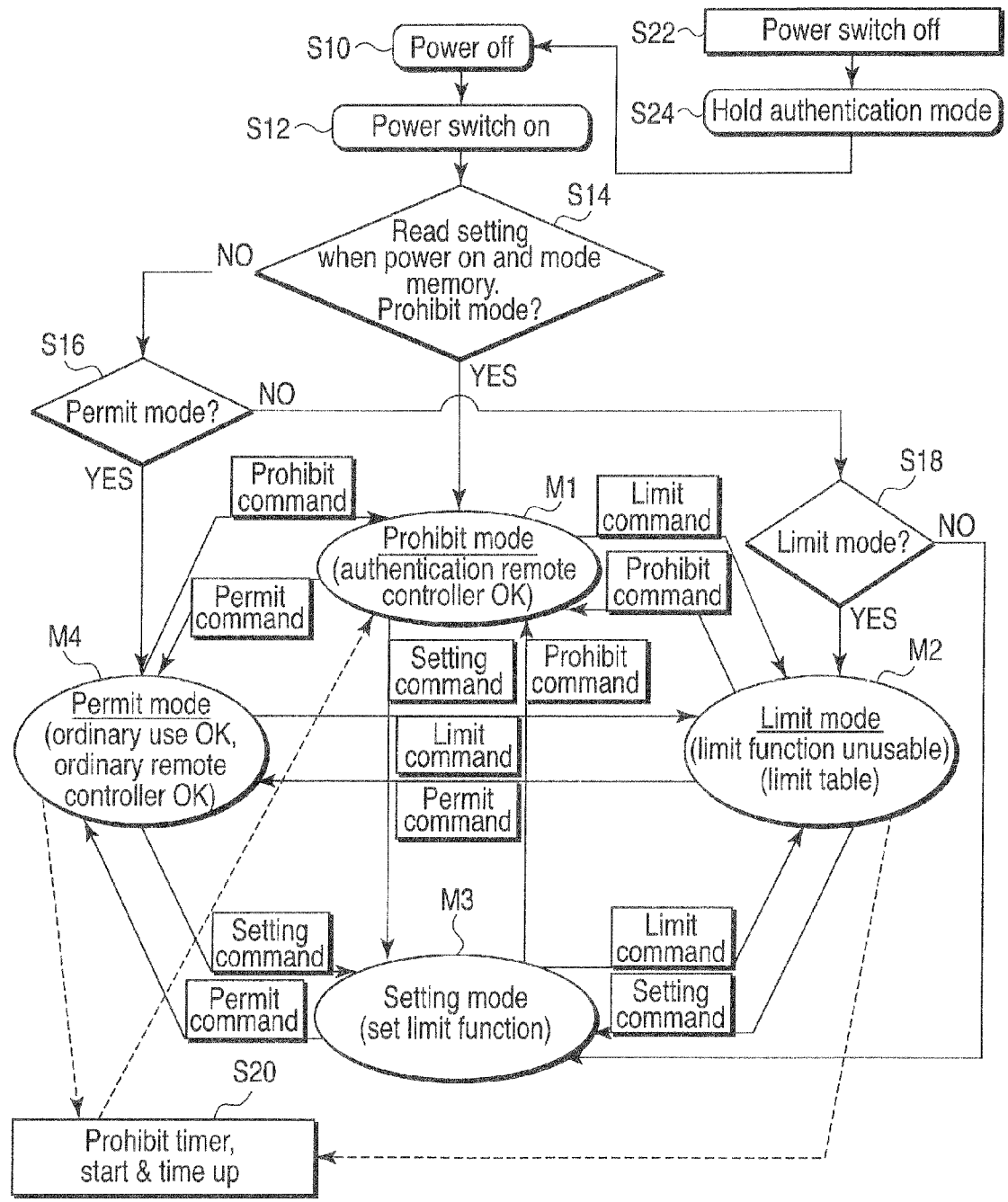
FIG. 33 is a diagram for explaining the transition of the authentication mode.

Next, the transition of the authentication mode will be explained with reference to FIG. 33.

In the case where the power switch 30 is turned on (step S12) with the power off (step S10), the authentication mode setting designation and the mode memory storage mode are read at the time of power on as explained in FIG. 29 thereby to determine whether the prohibit mode is in effect or not (step S14). On determining that the prohibit mode is in effect, the prohibit mode M1 is set.

On determining in step S14 that other than the prohibit mode is in effect, on the other hand, determination is made as to whether the permit mode is in effect or not (step S16). On determining that the permit mode is in effect, the permit mode M4 is entered.

On determining in this step (step S16) that the permit mode is not in effect, determination is made whether the limit mode is in effect or not (step S18). On determining that the limit mode is in effect, the limit mode M2 is set. On determining that neither the limit mode is in effect, on the other hand, the setting mode M3 is set.

The transition between the modes can be switched also by the authentication mode switching command from the remote controller 12, 74 or 96 that is the remote controller with the authentication information and the transition is made as shown by the prohibit command, the limit command, the permit command and the setting command in the drawing.

Further, in the case where the camera proper 14 is switched to the limit mode M2 or the permit mode M4 in which the camera proper 14 can be used for some purpose, the prohibit timer 146 in the camera proper 14 begins to count from that particular time point (step S20). Upon lapse of a preset time, the camera proper 14 is automatically switched to the prohibit mode M1 and cannot subsequently be used without the remote controller with the authentication information. In order to cancel the prohibit mode M1, the remote controller with the authentication information is required. Even after the power of the camera proper 14 is switched off, the prohibit timer 146 continues to count, and upon lapse of a predetermined time, the prohibit mode M1 is automatically entered. Therefore, the camera proper 14, even if lost in permit mode M4 or limit mode M2, cannot be used upon lapse of the preset time. The set time can be designated on menu by the user, and may be 10 minutes, one hour, one day or one week. By setting the prohibit timer 146 to a short time, the owner can use the camera proper 14 freely in permit mode M4 without taking the trouble of operating the remote controller with the authentication information each time. Also, should the camera be stolen, the fact that the prohibit mode M1 is entered in a short time can secure comparative safety.

In the case where the power switch 30 is depressed again (step S22) and the power is switched off, the authentication mode in effect is held in the mode memory 134 (step S24). Then, the power-off state is obtained (step S10).

Next, the state transition and the process in the image acquisition device will be explained with reference to FIGS. 34A to 34G. Although the case in which the image acquisition device is the digital camera 10 is explained as an example, the digital movie camera 54 can be also handled in similar manner except for the switch operation, etc.

Figure 34A:
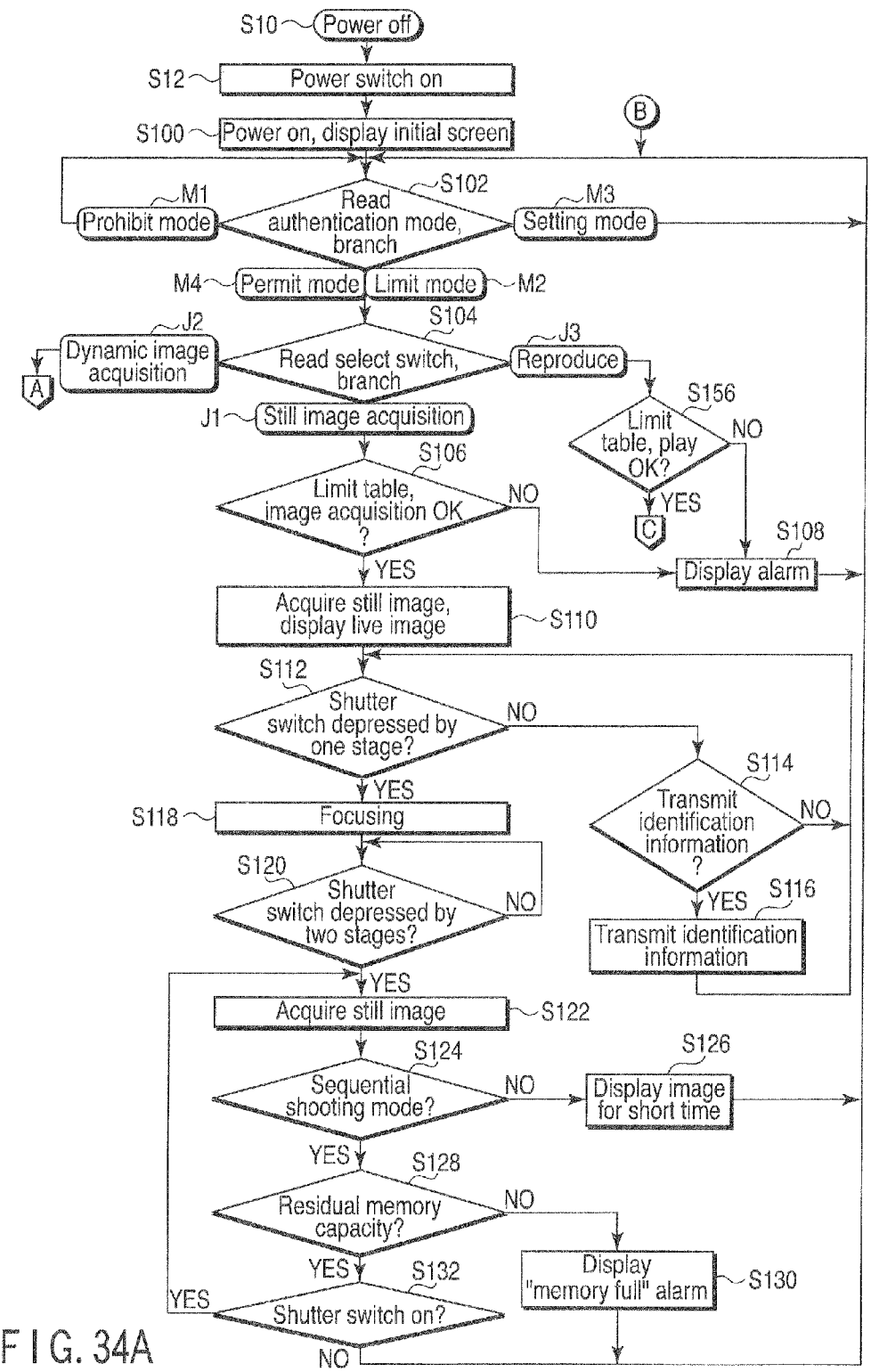
FIG. 34A is a diagram showing a first part of a series of flowcharts for explaining the process and the status transition in the image acquisition device.

First, the image acquisition mode will be mainly explained. Upon depression of the power switch 30 (step S12) with the power off (step S10) as shown in FIG. 34A, the power of the camera proper 14 is switched on, and the initial screen is displayed on the monitor 38 (step S100). A mark, etc., indicating the residual capacity of the battery is displayed on this initial screen. After that, as explained with reference to FIG. 33, the authentication mode setting designation with power on and the storage mode of the mode memory 134 are read, and the operation branches in accordance with the mode (step S102).

On determining that the permit mode M4 or the limit mode M2 is in effect, the state of the select switch 36 is read, and the operation branches to the still image acquisition mode J1, the dynamic image acquisition mode J2 or the play mode J3 (step S104).

In the case where the still image acquisition mode J1 is selected by the select switch 36 in limit mode, the function limit table held in the mode memory 134 or the nonvolatile memory in the main control unit 116 is read to determine whether the image acquisition operation is permitted or not (step S106). On determining that the image acquisition operation is not permitted, an alarm is displayed on the monitor 38 (step S106), and after waiting for a preset time, the process is returned to step S102. In this case, as long as the limit table is not rewritten by switching to the setting mode using the optical remote controller 12, 74 or 96 that is the remote controller with the authentication information, the processing loop of step S102, step S104, step S106, step S108, step S102 and so forth is circulated in that order. In such a case, the alarm display may be limited only for the first circulation or once every predetermined number of circulations in step S108.

On determining that the image acquisition operation is permitted by the function limit table in limit mode or the permit mode is in effect, on the other hand, the live image is displayed on the monitor 38 while at the same time displaying the current, number of the image acquisition pixels consumed and the remaining number of available image, frames (step S110). Then, it is determined whether the first stage of the shutter switch 28 is turned on or not (step S112). In the case where the particular stage is not turned on, whether the transmission button 32 is depressed or not is determined by the switch flag (step S114). Unless the transmission button 32 is depressed either, the process returns to step S112. In the case where the transmission button 32 is depressed, on the other hand, the identification information is transmitted by the identification information light-emitting unit 114 (step S116) and the process returns to step S112. Incidentally, despite the foregoing explanation that whether the transmission button 32 is depressed or not is detected by flag sense, and in accordance with the result thereof, whether the identification information is to be transmitted or not is determined, it is of course possible to make an interruption without transmitting the identification information in accordance with the flag sense (this is also the case with steps S142, S144, S212 and S214 described below). Also, though not specifically shown, in the case where another switch or button such as the zoom switch 46 is operated during the execution along the loop of steps S112 and S114, an interruption corresponding to the particular operation is of course generated and the corresponding operation performed.

In step S112 described above, on determining that the first stage of the shutter switch 28 is turned on, the image is focused (step S118), followed by waiting until the second stage of the shutter switch 28 is reached (step S120). Once the second stage of the shutter switch 28 turns on, the still image is acquired (step S122). After that, whether the sequential shooting mode is set or not is checked (step S124). In the case where the sequential shooting mode is not in effect, the acquired image is displayed on the monitor 38 for a short time (step S126), after which the process returns to step S102.

In the case where the sequential shooting mode is set, on the other hand, checking whether the residual capacity of the built-in memory 110 and/or the removable memory 112 is not less than a predetermined amount (step S128), and in the case where the residual capacity is less than the predetermined amount, a "memory full" alarm is displayed on the monitor 38 (step S130), after which the process returns to step S102. In the case where the residual memory capacity is not less than the predetermined amount, on the other hand, checking whether the shutter switch 28 is kept on or not (step) S132) and in the case where it is off, the process returns to step S102. In the case where the shutter switch 28 is on, on the other hand, the process returns to step S122, and the next still image is acquired.

Figure 34B:
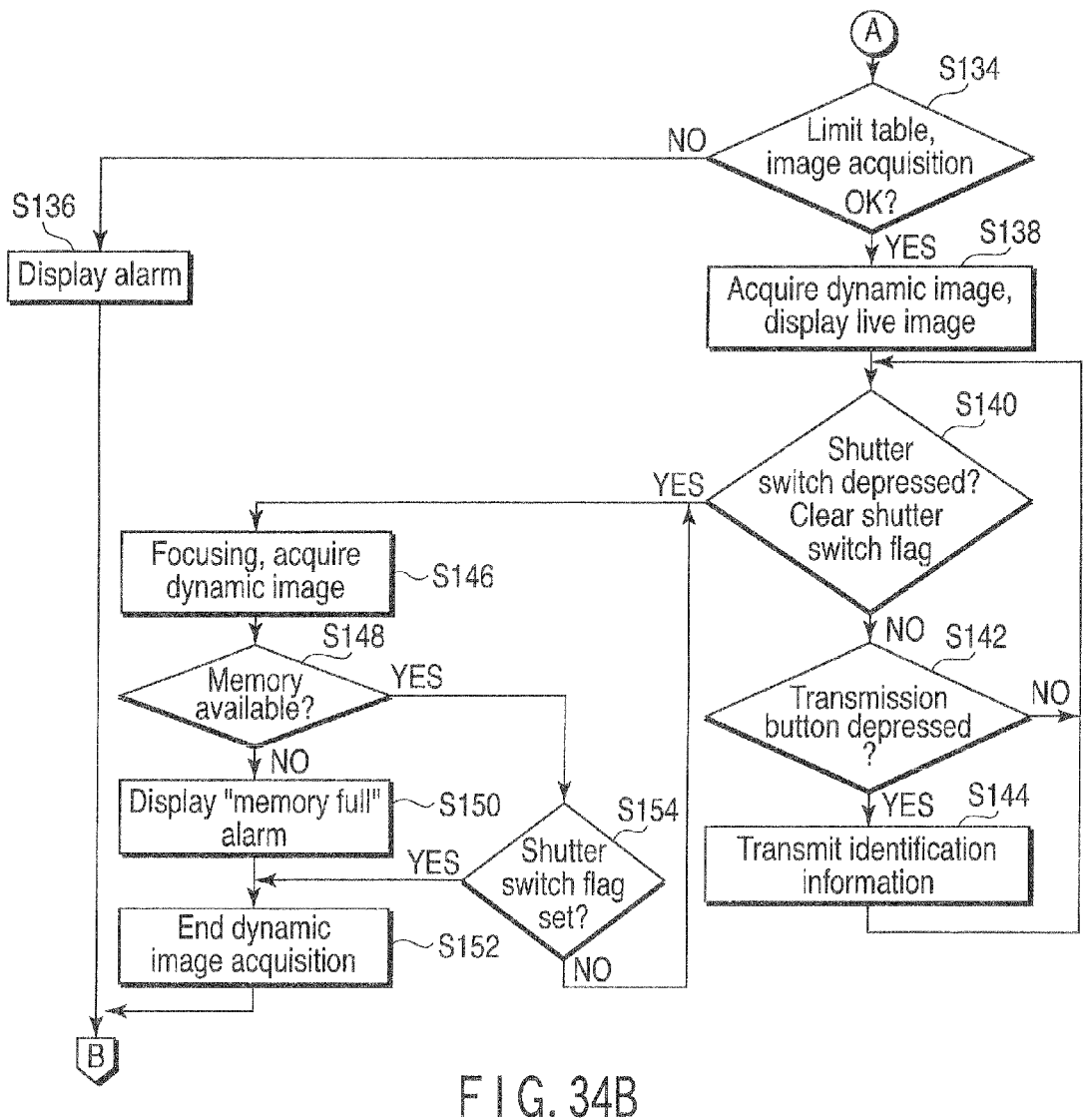
FIG. 34B is a diagram showing a second part of a series of flowcharts for explaining the process and the status transition in the image acquisition device.

In the case where the dynamic image acquisition mode J2 is selected by the select switch 36 in step S104 in limit mode, on the other hand, the function limit table held in the mode memory 120 or the nonvolatile memory in the main control unit 102 is read to determine whether the image acquisition operation is permitted or not (step S134), as shown in FIG. 34B. On determining that the image acquisition operation is not permitted, an alarm is displayed on the monitor 38 (step S136) and after waiting until a preset time arrives, the process returns to step S102. In this case, as long as the limit table is not rewritten by switching to the setting mode using the optical remote controller 12, 74 or 96 that is the remote controller with the authentication information, the processing loop of step S102, step S104, step S134, step S136, step S102 and so forth is circulated in that order. In such a case, the alarm display may be limited only for the first circulation or once every predetermined number of circulations in step S136.

On determining that the image acquisition operation is permitted according to the function limit table in limit mode or in the case where the permit mode is in effect, on the other hand, the live image is displayed on the monitor 38 together with the available image acquisition time with the current number of image acquisition pixels consumed (step S138).

By determining whether the shutter switch 28 is turned on or not, by the shutter switch flag which is set upon depression of the shutter switch 28 (step S140). On determining that the shutter switch flag is not turned on, it is determined whether the transmission button 32 is depressed or not (step S142), and if the transmission button 32 is not depressed, the process returns to step S140 to continue to display the live image. In the case where the transmission button 32 is depressed, on the other hand, the identification information is transmitted by the identification information light-emitting unit 114 (step S144), and the process returns to seep S140. Incidentally, though not specifically shown, if another switch or button such as the zoom switch 46 is operated during the loop execution of steps S140 and S142, the corresponding operation is of course performed.

Once the shutter switch flag is set, the particular shutter switch flag is cleared, after which the focusing operation is performed and the dynamic image begins to be acquired (step S146). While the dynamic image is being acquired, the residual capacity of the built-in memory 110 and/or the removable memory 112 is checked (step S146). In the case where the residual memory capacity is less than a predetermined amount, the "memory full" alarm is displayed on the monitor 38 (step S150), after which the dynamic image ceases to be acquired (step S152), and the process returns to step S102. In the case where the residual memory capacity is not less than the predetermined amount, on the other hand, whether the shutter switch flag is set or not is confirmed (step S154), and in the case where it is clear, the process returns to step S146 and the dynamic image continues to be acquired. Once the shutter switch flag is set, the process advances to step S152 to end the dynamic image acquisition, after which the process returns to step S102. In this way, the dynamic image continues to be acquired after the depression of the shutter switch 28 until it is depressed again.

As shown in FIG. 34A, in the case where the play mode J3 is selected by the select switch 36 in step S104 in limit mode, on the other hand, the function limit table held in the mode memory 134 or the nonvolatile memory in the main control unit 116 is read to determine whether the reproduction is permitted or not (step S156). On determining that the reproduction is not permitted, the process proceeds to step S108 to display an alarm on the monitor 38, after which the process returns to step S102 at a preset time. In this case, as long as the limit table is not rewritten by switching to the setting mode using the optical remote controller 12, 74 or 96 that is the remote controller with the authentication information, the processing loop of step S102, step S104, step S156, step S108, step S102 and so forth is circulated in that order. In such a case, the alarm display may be limited only for the first circulation or once every predetermined number of circulations in step S108.

In the case where the reproduction is permitted in limit mode or in the case where the permit mode is in effect, the play mode is entered as shown in FIG. 34C. Specifically, the last one of the images recorded in the built-in memory 110 and the removable memory 112 is displayed on the monitor 38 (step S158). Next, whether any of the switches or buttons is depressed or not is checked, and in the case where it is depressed in limit mode M2, whether the limit function is involved or not is checked based on the function limit table (step S160). On determining that the limit function is involved (step S162), the process returns to step S158 ignoring the depression of the switches or buttons.

In the case where the switch or button involves no limit function or the permit mode is in effect, on the other hand, the corresponding operation described below is performed.

Specifically, assume that the arrow switch 40 of the camera proper 14 is depressed (step S164). In the case where the lower part (album) of the arrow switch 40 is depressed (step S166), the image recorded in the album is displayed on the monitor 38 (step S168). Upon depression of the menu button 44 while the particular image is being displayed (step S170), the album display function is ended and the process returns to seep S160. Incidentally, the album is defined as a function in which the access point to each one of a group of images relating to a given event is written in the index information held separately from the image group so that upon designation of the album name, a series of the images about the event can be collectively displayed or otherwise collectively handled.

Upon depression of the upper part (calendar) of the arrow switch 40 (step S172), on the other hand, the images recorded for the current month are displayed in calendar form on the monitor 38 (step S174). Further, the arrow switch 40 makes it possible to display the images for the previous months or an image acquired on a selected day. Upon depression of the menu button 44 while this image is being displayed (step S176), the calendar display function is ended, and the process returns to step S160.

Also, upon depression of the right part (+) of the arrow switch 40 (step S178), the next image is displayed (step S180) and then the process returns to step S160. In the case where the current image is the last one, the first image is displayed. Also, upon depression of the left part (−) of the arrow switch 40 (step S182), on the other hand, the previous image is displayed (step S184), after which the process returns to step S160. Incidentally, in the case where the current image is the first one, the last image is displayed.

In the case where the OK button 42 is depressed (step S186), whether the current image is a dynamic one or not is confirmed (step S188), and in the case where it is not a dynamic image, the depression of the OK button 42 is ignored, and the process returns to step S160. In the case where the current image is a dynamic one, on the other hand, the dynamic image is displayed (step S190), and the process returns to step S160.

Upon depression of the zoom switch 46 (step S192) in the case where the T button is involved (step S194), the image being displayed is enlarged (step S196), and the process returns to step S160. Upon depression of the W button while the image is displayed in enlarged form, the display of one-frame image is restored. In the case where the W button is involved (step S198), the image being displayed is reduced as an index display (step S200) and the process returns to step S160. Each time the W button is depressed, a list of four, nine, sixteen and twenty five frames is displayed in that order. Each time the T button is depressed while the reduced list is being displayed, on the other hand, the display returns to the descendant order of 25, 16, 9, 4 and 1 frame.

Upon depression of the erase button 48 (step S202), the confirmation as to whether the image is really erased or not is displayed on the monitor 38 (step S204), and in the case where the erase suspension is selected, the process returns to step S160 without erasure. In the case where the execution of the erase operation is selected, on the other hand, the particular frame is erased and the immediately preceding image is displayed (step S206), followed by returning to step S160. Incidentally, in the case where the image to be erased is protected, an alarm indicating that the image being displayed is to be protected is displayed on the monitor 38, and the selection to execute the erasure is ignored.

Upon depression of the print button 50 (step S208), the required printing operation such as the transmission of the image to the printer is performed (step S210), and the process returns to step S160.

Also, upon depression of the transmission button 32 (step S212), the identification information light-emitting unit 114 transmits the identification information (step S214) and the process returns to step S160.

As shown in FIG. 34A, in the case where step S102 determines that the prohibit mode M1 or the setting mode M3 is in effect, on the other hand, the operation is performed only by the authentication command from the optical remote controller 12, 74 or 96 that is the remote controller with the authentication information. On determining that the prohibit mode M1 or the setting mode M3 is in effect, therefore, only the determination process of step S102 is repeated.

Upon receipt of the command from the optical remote controller 12, 74 or 96 that is the remote controller with the authentication information or the optical remote controller 92 or 94 that is the remote controller without the authentication information, as shown in FIG. 34D, the CPU of the main control unit 116 is interrupted (step S216), and then followed by the determination as to whether the command received from the particular remote controller is the authentication command or the general command (step S218).

Figure 34E:
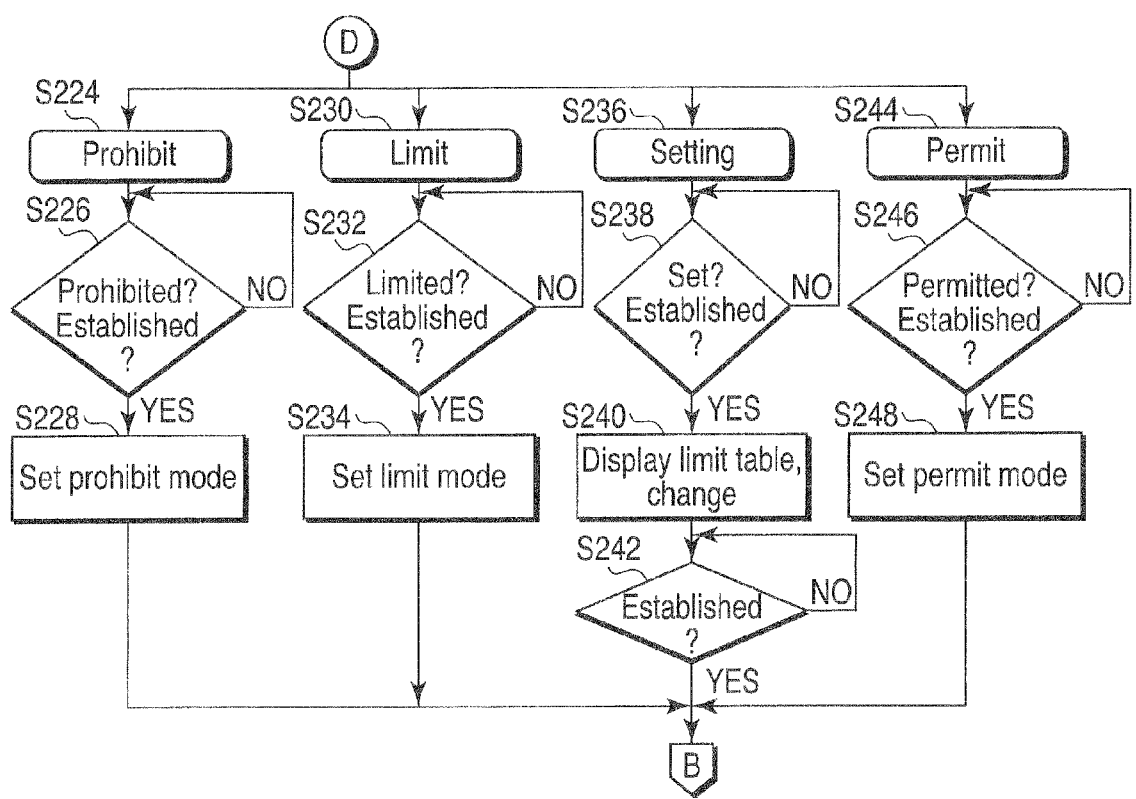
FIG. 34E is a diagram showing a fifth part of a series of flowcharts for explaining the process and the status transition in the image acquisition device.

On determining that the authentication command is received from the optical remote controller 12, 74 or 96 that is the remote controller with the authentication information, the content of the particular authentication command is determined (step S220). On determining that the authentication mode switching command is received (step S222), as shown in FIG. 34E, the operation is selectively executed in accordance with the content of the command. Incidentally, the operation corresponding to this authentication mode switching command is executed in all the authentication modes including, but not limited to, the prohibit mode.

Specifically, in the case where the authentication mode switching command is the prohibit command (step S224), the confirmation of the setting of the prohibit mode is displayed on the monitor 38, and this mode is determined as establishment in the case where the image acquisition execution command is sent as an authentication command or as an general command from the optical remote controller 12, 74 or 96 that is the remote controller with the authentication information (step S226). Then, the storage mode of the mode memory 134 is set to the prohibit mode M1 (step S228), and the process returns to step S102. By setting the prohibit mode M1 and returning to step S102 in this way, only the determination process of step S102 is repeated, and the operation of the switches and buttons of the camera proper 14 is not accepted, and only the operation of the optical remote controller 12, 74 or 96 that is the remote controller with the authentication information is accepted. The confirmation screen in step S226, though inserted for preventing the erroneous touching of the buttons of the remote controller and for confirmation of the important function of switching the authentication mode, may be done without.

Further, in the case where the authentication mode switching command is the limit command (step S230), the confirmation of the setting of the limit mode is displayed on the monitor 38, and upon receipt of the image acquisition execution command as an authentication command or as an general command from the optical remote controller 12, 74 or 96 that is the remote controller with the authentication information, the limit mode is determined as established (step S232). Then, the storage mode of the mode memory 134 is set to the limit mode M2 (step S234) and the process returns to step S102. By thus setting the limit mode M2, only the operation permitted by the limit table can be performed in accordance with the operation of the switches or buttons on the camera proper 14 or the authentication command or the general command from the optical remote controller 12, 74, 92, 94 or 96. Incidentally, the confirmation screen in step S232, though inserted for preventing the erroneous touching of the buttons of the remote controller and for confirmation of the important function of switching the authentication mode, may be done without.

Further, in the case where the authentication mode switching command is the setting command (step S236), the confirmation of the setting of the setting mode is displayed on the monitor 38, and with the arrival of the image acquisition execution command as an authentication command from the optical remote controller 12, 74 or 96 that is the remote controller with the authentication information, the setting mode is determined as established (step S238). Then, the storage mode of the mode memory 134 is set to the setting mode M3, and the process is executed to display and change the limit table on the monitor 38 (step 3240). Incidentally, the confirmation screen for step S238, though inserted for preventing the erroneous touching of the buttons of the remote controller and for confirmation of the important function of switching the authentication mode, may be done without. Also, in the process executed to display and change the limit table in step S240 described above, the function and the state of the limit flag in the function limit table shown in FIG. 30 are displayed on the monitor 38, and the limit function is selected in circulation while at the same time setting and changing the on/off state of the flag using the plus and minus buttons 70, 72, the telephoto button and the wide-angle button 66, 68 or the arrow switch 76 and the OK button 78 of the remote controller. Once the setting change is complete, the image acquisition command button 62 is depressed. With the arrival of the image acquisition execution command as the authentication command, therefore, the content thereof is established and held in the mode memory 134 or the nonvolatile memory in the main control unit 116 (step S242), followed by returning to step S102. After setting the setting mode M3 in this way and returning to step S102, only the determination process in step S102 is repeated, so that only the operation of the optical remote controller 12, 74 or 96 that is the remote controller with the authentication information is accepted and not the operation of the switches and buttons on the camera proper 14.

Further, in the case where the authentication mode switching command is the permit command (step S244), the confirmation of the setting of the permit mode is displayed on the monitor 38, and with the arrival of the image acquisition execution command as an authentication command or as a general command from the optical remote controller 12, 74 or 96 that is the remote controller with the authentication information, the permit command is determined as established (step S246). Then, the storage mode of the mode memory 134 is set to the permit mode M4 (step S248) and the process returns to step S102. By setting the permit mode M4 in this way, the operation of the switches or buttons on the camera proper 14 or all the operations corresponding to the authentication command or the general command from the optical remote controller 12, 74, 92, 94 or 96 can be performed after the process returns to step S102. Incidentally, the confirmation screen for step S246, though inserted for preventing the erroneous touch of the buttons of the remote controller and for confirmation of the important function of switching the authentication mode, may be done without.

Also, as shown in FIG. 34D, on determining in step S220 that the content of the authentication command is the image acquisition command (step S250), the storage mode of the mode memory 134 is read and the operation branches in accordance with the particular mode (step S252).

On determining that the permit mode M4 or the limit mode M2 is in effect, the state of the select switch 36 on the camera proper 14 is read, and the operation branches in accordance with whether the still image acquisition mode J1, the dynamic image acquisition mode J2 or the play mode J3 is in effect (step S254).

In the case where the still image acquisition mode J1 is selected by the select switch 36 and the limit mode is in effect, the function limit table held in the mode memory 134 or the nonvolatile memory in the main control unit 116 is read, thereby determining whether the image acquisition operation is permitted or not (step S256). On determining that the image acquisition operation is not permitted, an alarm is displayed on the monitor 38 (step S258), and after waiting for a preset time, the process returns to step S102. In this case, as long as the limit table is not rewritten by switching to the setting mode using the optical remote controller 12, 74 or 96 that is the remote controller with the authentication information, the processing loop of step S102, step S104, step S106, step S108, step S102 and so forth is circulated in that order. In such a case, the alarm display may be limited only for the first circulation or once every predetermined number of circulations in step S108.

Figure 34F:
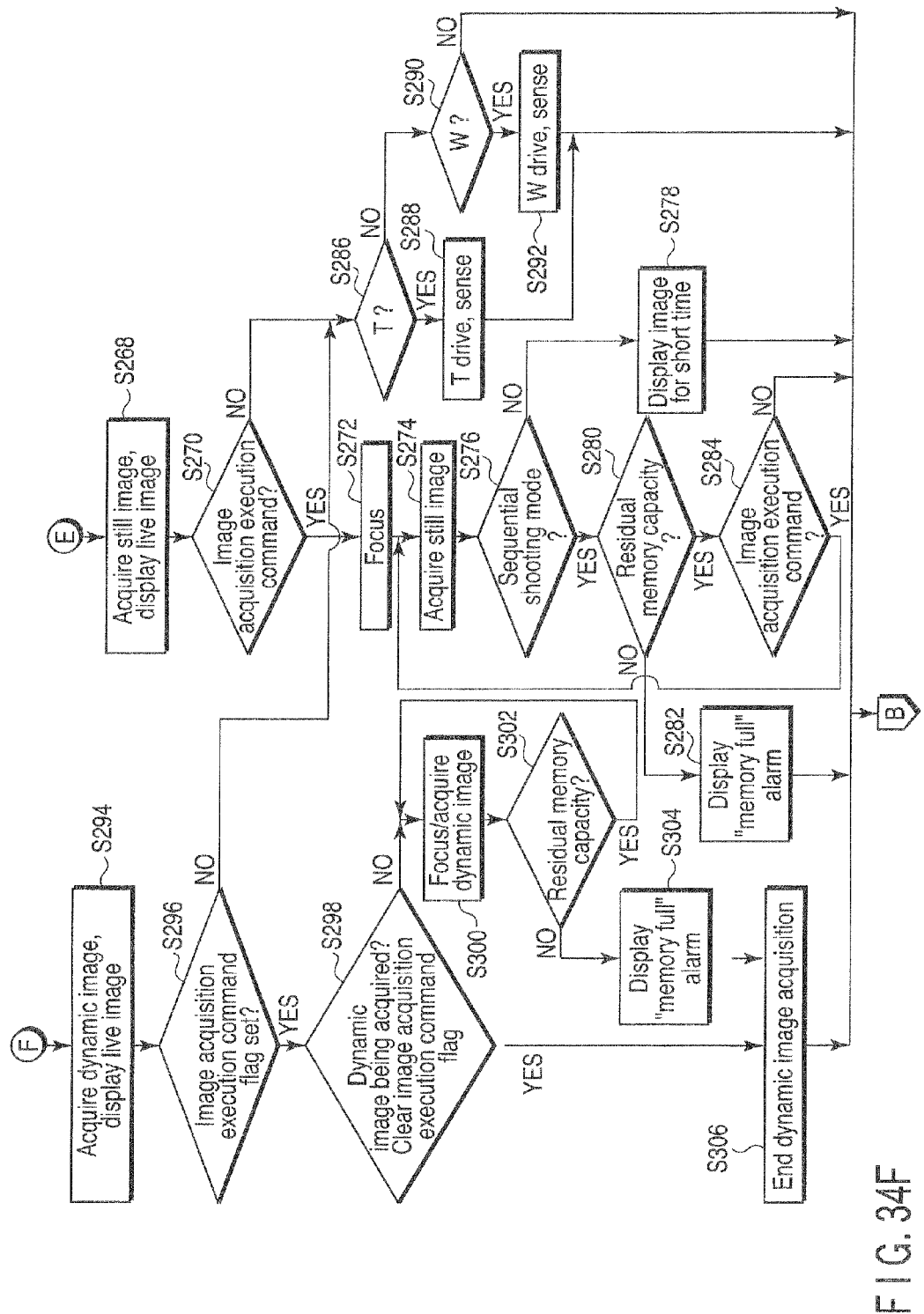
FIG. 34F is a diagram showing a sixth part of a series of flowcharts for explaining the process and the status transition in the image acquisition device.

On determining that the image acquisition operation is permitted by the function limit table in limit mode or in the case where the permit mode is in effect, in contrast, the process is transferred to the operation of acquisition of the still image by the operation of the remote controller as shown in FIG. 34F.

In the case where the select switch 36 selects the dynamic image acquisition mode J2 in step S168 and the limit mode is in effect, on the other hand, the function limit table held in the mode memory 134 or the nonvolatile memory of the main control unit 116 is read to determine whether the image acquisition is permitted or not (step S256). On determining that the image acquisition is not permitted, the process advances to step S258 in which an alarm is displayed on the monitor 38, and after waiting for a preset time, the process returns to step S102. In this case, as long as the limit table is not rewritten by switching to the setting mode using the optical remote controller 12, 74 or 96 that is the remote controller with the authentication information, the processing loop of step S102, step S104, step S106, step S108, step S102 and so forth is circulated in that order. In such a case, the alarm display may be limited only for the first circulation or once every predetermined number of circulations in step S108.

On determining that the image acquisition is permitted by the function limit table in limit mode or the permit mode is in effect, in contrast, the process transfers to the operation of the remote controller to acquisition of a dynamic image as shown in FIG. 34F.

Further, in the case where the select switch 36 selects the play mode J3 in step S254 and the limit mode is in effect, the function limit table held in the mode memory 134 or the nonvolatile memory of the main control unit 116 is read, thereby determining whether the reproduction is permitted or not (step S262). In the case where the determination is that the reproduction is not permitted, an alarm is displayed on the monitor 38 (step S264), and after waiting for a preset time, the process returns to step S102. In this case, as long as the limit table is not rewritten by switching to the setting mode using the optical remote controller 12, 74 or 96 that is the remote controller with the authentication information, the processing loop of step S102, step S104, step S156, step S108, step S102 and so forth is circulated in that order. In such a case, the alarm display may be limited only for the first circulation or once every predetermined number of circulations in step S108.

Figure 34G:
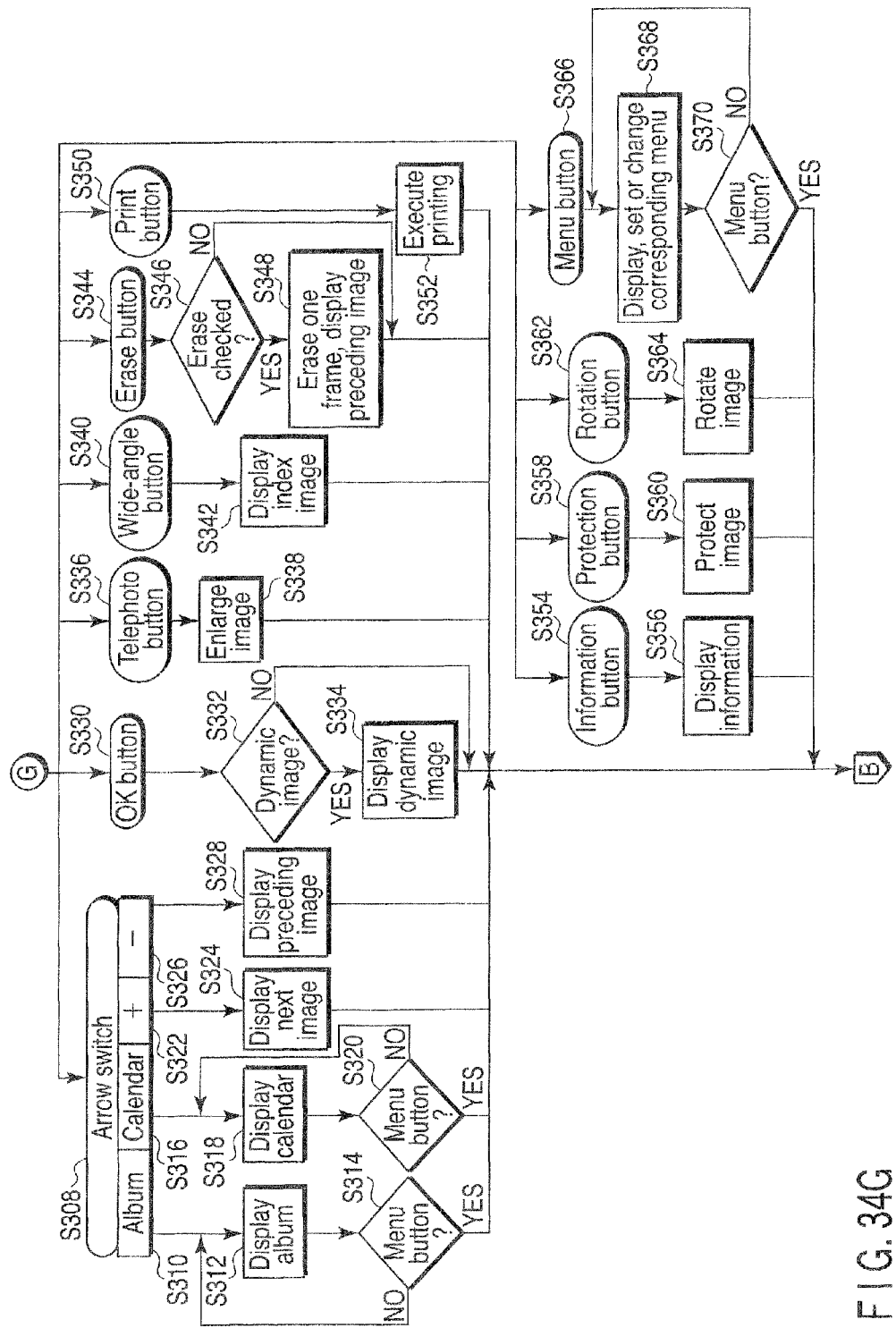
FIG. 34G is a diagram showing a seventh part of a series of flowcharts for explaining the process and the status transition in the image acquisition device.

In the case where the reproduction is permitted and the limit mode is in effect or in the case where the permit mode is in effect, in contrast, the play operation is performed by manipulation of the remote controller as shown in FIG. 34G.

Also, on determining in step S128 that the general command is received from the optical remote controller 12 or 74 that is an authentication mode switching remote controller of a remote controller with the authentication information or from the optical remote controller 92 or 94 that is a common remote controller without the authentication function, the storage mode of the mode memory 134 is read, and the process branches in accordance with the particular mode (step S266).

On determining that the permit mode M4 or the limit mode M2 is in effect, the process advances to step S254. Also, on determining that the prohibit mode M1 or the setting mode M3 is in effect, the camera proper 14 cannot be operated by the general command from the optical remote controller 12 or 74 that is the authentication mode switching remote controller or from the optical remote controller 92 or 94 that is the common remote controller, and therefore, by advancing to step S264, an alarm on a preset time is displayed on the monitor 38, after which the process returns to step S102. Once the process is returned to step S102, only the determination process of step S102 is repeated, and the operation of the switches or buttons on the camera proper 14 is never accepted. As described above, an arrangement can be made so that in prohibit mode M1 or setting mode M3, no operation is accepted other than the operation of the camera proper 14 or the optical remote controller 92 or 94 that is the common remote controller and the operation of the optical remote controller 12 or 74 that is the authentication mode switching remote controller to send out the authentication mode switching command, and such operation as image acquisition or reproduction can be performed only by the optical remote controller 96 that is the authentication command remote controller in the remote controller with the authentication information.

In the image acquisition operation of acquisition of a still image by the operation of the remote controller in the permit mode M4 or the limit mode M2, as shown in FIG. 34F, a live image is displayed on the monitor 38 (step S268), and the determination is made as to whether the authentication command from the optical remote controller 12, 74 or 96 that is the remote controller with the authentication information or the general command from the optical remote controller 92 or 94 that is a common remote controller without the authentication function received in step S216 is an image acquisition execution command or not (step S270). On determining that the authentication command or the general command is the image acquisition execution command, the focus operation is performed (step S272) and a still image is acquired (step S274). After that, whether the sequential shooting mode is set or not is checked (step S276). In the case where the sequential shooting mode is not in effect, the acquired image is displayed on the monitor 38 for a short time (step S278), after which the process returns to step S102. In this case, the process proceeds from step S102 to step S104, step S106, step S110 and so on in that order, and the image acquisition operation of acquisition of the next still image by the shutter switch 28 of the camera proper 14 becomes possible. Further, the operation of acquisition of the next still image is made possible by the interruption of the command received from the optical remote controller 12, 74 or 96 that is the remote controller with the authentication information or from the optical remote controller 92 or 94 that is a common remote controller.

On determining in step S276 that the sequential shooting mode is set, on the other hand, the residual capacity of the built-in memory 110 and/or the removable memory 112 is checked to see whether it is not less than a predetermined amount (step S280). In the case where the residual capacity is less than the predetermined amount, a "memory full" alarm is displayed on the monitor 38 (step S282), after which the process returns to step S102. In this case, the process proceeds from step S102 to step S104, step S106, step S110 and so on in that order. Although the sequential shooting is impossible, due to lack of residual memory capacity, the operation of acquisition of the next still image by the shutter switch 28 of the camera proper 14 becomes possible. Further, the operation of acquisition of the next still image is also possible due to the interruption from the command reception from the optical remote controller 12, 74 or 96 that is the remote controller with the authentication information or from the optical remote controller 92 or 94 that is a common remote controller.

Further, on determining in step S280 that the residual memory capacity is sufficient, on the other hand, whether the image acquisition execution command has arrived or not from the optical remote controller 12, 74 or 96 that is the remote controller with the authentication information or from the optical remote controller 92 or 94 that is a common remote controller is confirmed (step S284), and in the case where the image acquisition execution command has arrived, the process returns to step S274 to acquire the next image. Specifically, as long as the image acquisition command button 62 of the optical remote controller 12, 74 or 96 that is the remote controller with the authentication information or of the optical remote controller 92 or 94 that is a common remote controller is kept depressed, the sequential shooting is carried out. In the case where the image acquisition execution command fails to arrive, on the other hand, the process returns to step S102. In this case, the process proceeds from step S102 to step S104, step S106, step S110 and so on in that order. The operation of acquisition of the next still image by the shutter switch 28 of the camera proper 14 becomes possible. Further, the operation of acquisition of the next still image is also possible due to the interruption from the command reception from the optical remote controller 12, 74 or 96 that is the remote controller with the authentication information or from the optical remote controller 92 or 94 that is a common remote controller.

Also, in the case where step S270 determines that the received authentication command or general command is not the image acquisition execution command, whether the authentication command or general command is the T button command as the result of depression of the telephoto button 66 of the optical remote controller 12, 74 or 96 that is the remote controller with the authentication information or of the optical remote controller 92 or 94 that is a common remote controller or not is determined (step S286). On determining that the T button command is involved, the lens unit 16 is driven to the telephoto side as long as the T button command comes (step S288), and once the T button command stops, the drive is suspended and the process returns to step S102. In this case, the process proceeds from step S102 to step S104, step) S106, step S110 and so on in that order. The operation of acquisition of the next still image by the shutter switch 28 of the camera proper 14 becomes possible. Further, the operation of acquisition of the next still image is also possible due to the interruption from the command reception from the optical remote controller 12, 74 or 96 that is the remote controller with the authentication information or from the optical remote controller 92 or 94 that is a common remote controller.

On determining in step S286 that the T button command is not received, on the other hand, whether the authentication command or general command is the W button command due to the depression of the wide-angle button 68 of the optical remote controller 12, 74 or 96 that is the remote controller with the authentication information or of the optical remote controller 92 or 94 that is a common remote controller or not is determined (step S290). On determining that the W button command is involved, the lens unit 16 is driven to the wide-angle side as long as the W button command arrives (step S292), and once the W button command is stopped, the drive is suspended, and the process returns to seep S102. On determining in step S290 that the W button command is not involved, the process returns to step S102. In these cases, the process proceeds from step S102 to step S104, step S106, step S110 and so on in that order. The operation of acquisition of the next still image by the shutter switch 28 of the camera proper 14 becomes possible. Further, the operation of acquisition of the next still image is also possible due to the interruption from the optical remote controller 12, 74 or 96 that is the remote controller with the authentication information or from the optical remote controller 92 or 94 that is a common remote controller.

In the image acquisition operation of acquisition of a dynamic image by the operation of the remote controller in the permit mode M4 or the limit mode M2, on the other hand, as shown in FIG. 34F, a live image is displayed on the monitor 38 (step S294) while at the same time determining whether the image acquisition execution command flag is on or not; the flag being turned on in accordance with the reception of the image acquisition execution command upon depression of the image acquisition command button 62 of the optical remote controller 12, 74 or 96 that is the remote controller with the authentication information or of the optical remote controller 92 or 94 that is a common remote controller (step S296). On determining that the image acquisition execution command flag is set, determination is made as to whether the dynamic image is being acquired or not while at the same time clearing the image acquisition execution command flag (step S296). On determining that the dynamic image is not being acquired, on the other hand, the focusing operation is performed and the dynamic image acquisition operation started (step S300). Then, the residual memory capacity of the built-in memory 110 and/or the removable memory 112 is checked (step S302). In the case where the residual memory capacity is less than a predetermined amount, the "memory full" alarm is displayed on the monitor 38 (step S304) thereby to end the dynamic image acquisition operation (step S306), and the process returns to step S102. In this case, the process proceeds from step S102, step S104, step S134, step S138 and step S140 in that order and the loop of step S138 and step S140 is repeated. In the process, the user, already informed from the alarm indication in step S304 that a dynamic image can no longer be acquired, turns the select switch 36 of the camera proper 14.

On determining in step S302 that the residual memory capacity is sufficient, on the other hand, the process returns to step S300 and the dynamic image acquisition operation is continued.

Further, en determining in step S298 that a dynamic image is being acquired, the process advances to step S306, which ends the image acquisition operation, and then returns to step S102. Specifically, a dynamic image is acquired in response to the command of the remote controller from the time when the image acquisition execution command is received upon depression of the image acquisition command button 62 of the optical remote controller 12, 74 or 96 that is the remote controller with the authentication information or of the optical remote controller 92 or 94 that is a common remote controller to the time when the image acquisition execution command is received due to the next depression of the image acquisition command button 62. Specifically, upon receipt of the image acquisition execution command during the loop of step S300 to step S302 to step S300, the operation from step S216 is executed by interruption, and on determining in step S298 that a dynamic image is being acquired, the image acquisition operation is ended. In the case where the acquisition of a dynamic image is ended in this way and the process returns to step S102, the process advances from step S102, step S104, step S134, step S138 and step S140 in that order, and the loop of step S138 and step S140 is repeated. As a result, the acquisition of the next dynamic image by the shutter switch 28 of the camera proper 14 becomes possible. The operation of acquisition of the next dynamic image is also made possible by the interrupt due to the command reception from the optical remote controller 12, 74 or 96 that is the remote controller with the authentication information or from the optical remote controller 92 or 94 that is a common remote controller.

On determining in step S296 that the image acquisition execution command flag is not on, the process proceeds to step S286 to determine whether the T button command is in effect or not. As described above, on determining that the T button command is involved, the lens unit 16 is driven to the telephoto side as long as the T button command comes (step S288), and once the T button command stops, the drive is suspended and the process returns to step S102. In the case where the T button command is received in a dynamic image acquisition loop in steps S300 and S302, the lens unit 16 is driven by interrupt, and the zoom-up image acquisition becomes possible. Once the process returns to step S102, the process advances from step S102, step S104, step S134, step S138 and step S140 in that order and the loop of step S138 and step S140 is repeated. At the same time, a dynamic image acquisition loop of steps S300 and S302 is continuously executed, and a dynamic image continues to be acquired until the process proceeds to step S306 due to the interruption upon receipt of the image acquisition execution command by the depression of the image acquisition command button 62 of the optical remote controller 12, 74 or 96 that is the remote controller with the authentication information or of the optical remote controller 92 or 94 that is a common remote controller.

Further, on determining in step S286 that the T button command is not involved, determination is made as to whether the W button command is involved or not (step S290), and in the case where the W button command is in effect, the lens unit 16 is driven to the wide angle side as long as the W button command continues to arrive (step S292). Once the W button command ceases to arrive, the drive is suspended and the process returns to step S102. Also in this case, like in the case of the T button command, the zoom-down image acquisition operation is performed if a dynamic image is being acquired, and a dynamic image continues to be acquired until interrupted by the reception of the next image acquisition execution command.

Further, on determining in step S290 that neither the W button command is involved, the process returns to step S102 without doing anything.

As described above, in the case where a dynamic image is being acquired, the dynamic image acquisition operation can be ended or the zoom operation can be performed by the interrupt due to the reception of the image acquisition execution command or the T or W button command from the optical remote controller 12, 74 or 96 that is the remote controller with the authentication information or from the optical remote controller 92 or 94 that is a common remote controller.

With regard to the dynamic image, the recording time can be limited to, say, 15 seconds, and in accordance with the memory capacity corresponding to the number of seconds of the particular time, the residual memory capacity is determined in step S216. In this way, the dynamic image acquisition operation can be automatically ended.

In the play operation by the operation of the remote controller in the permit mode M4 or the limit mode M2, on the other hand, the last image recorded in the built-in memory 110 or the removable memory 112 is displayed on the monitor 38, thereby performing the operation corresponding to the switches and buttons of the optical remote controller 12, 74 or 96 that is the remote controller with the authentication information or of the optical remote controller 92 or 94 that is a common remote controller.

Specifically, as shown in FIG. 34G in the case where the authentication command or the general command received from the remote controller in step S216 is the operation command for the arrow switch 76 of the optical remote controller 74 or 96 that is the remote controller with the authentication information or from the optical remote controller 94 that is a common remote controller (step S308), and in the case where the operation is the down operation command (album) by down switch operation of the arrow switch 76 (step S310), then the image recorded in the album is displayed on the monitor 38 (step S31.2). Upon depression of the menu button 80 of the optical remote controller 74 or 96 that is the remote controller with the authentication information or of the optical remote controller 94 that is a common remote controller while this image is being displayed (step S314), the album display function is ended and the process returns to step S102. In this case, the process advances from step S102 to step S104, step S156, step S153, step S160 and so on, in that order, and in accordance with the switches or buttons of the camera proper 14, the play operation becomes possible. The play operation or other operations are also made possible by the interruption due to the command reception from the optical remote controller 12, 74 or 96 that is the remote controller with the authentication information or from the optical remote controller 92 or 94 that is a common remote controller.

In the case of the up operation command (calendar) by the up switch operation of the arrow switch 76 (step S316), on the other hand, the images recorded for the current month are displayed in calendar form on the monitor 38 (step S318). Further, the images for the previous months or the images acquired for the selected day can be selected and displayed by the arrow switch 76. Upon depression of the menu button 80 during this display (step S320), the calendar display function is ended and the process returns to step S102. In this case, the process advances from step S102 to step S104, step S156, step S158, step S160 and so on, in that order, and in accordance with the switches or buttons of the camera proper 14, the play operation becomes possible. The play operation or other operations are also made possible by the interruption due to the command reception from the optical remote controller 12, 74 or 96 that is the remote controller with the authentication information or from the optical remote controller 92 or 94 that is a common remote controller.

Also, in the case of the right operation command by the right switch operation of the arrow switch 76 (step S322), the next image is displayed on the monitor 38 (step S324), and the process returns to step S102. Incidentally, assuming that this right switch is operated in the case where the current image is the last one, the first image is displayed. In this case, the process advances from step S102 to step S104, step S156, step S158, step S160 and so on, in that order, and in accordance with the switches or buttons of the camera proper 14, the play operation becomes possible. The play operation or other operations are also made possible by the interruption due to the command reception from the optical remote controller 12, 74 or 96 that is the remote controller with the authentication information or from the optical remote controller 92 or 94 that is a common remote controller. The display in step S158 after returning to step S102, however, maintains the display of the image updated in step S324.

Also, in the case of the left operation command due to the left switch operation of the arrow switch 76 (step S326), the previous image is displayed on the monitor 38 (step S328) and the process returns to step S102. Incidentally, in the case where the current image is the first one, the last image is displayed by the left switch operation. In this case, the process advances from step S102 to step S104, step S156, step S158, step S160 and so on, in that order, and in accordance with the switches or buttons of the camera proper 14, the pray operation becomes possible. The play operation or other operations are also made possible by the interruption due to the command reception from the optical remote controller 12, 74 or 96 that is the remote controller with the authentication information or from the optical remote controller 92 or 94 that is a common remote controller. The display in step S158 after returning to step S102, however, maintains the display of the image updated in step S324.

Further, in the case where the authentication command or the general command received from the remote controller in step S216 is the OK command due to the operation of the OK button 78 of the optical remote controller 74 or 96 that is the remote controller with the authentication information or of the optical remote controller 94 that is a common remote controller (step S330), whether the current image is a dynamic image or not is checked (step S332), and if not a dynamic image, it is ignored and the process returns to step S102. In the case where it is a dynamic image, on the other hand, the particular dynamic image is displayed (step S334), and the process returns to step S102. In these cases, the process advances from step S102 to step S104, step S156, step S158, step S160 and so on, in that order, and in accordance with the switches or buttons of the camera proper 14, the play operation becomes possible. The play operation or other operations are also made possible by the interruption due to the command reception from the optical remote controller 12, 74 or 96 that is the remote controller with the authentication information or from the optical remote controller 92 or 94 that is a common remote controller. The display in step S158 after returning to step S102, however, maintains the display of the image displayed in step S334.

In the case where the authentication command or the general command received from the remote controller in step S216 is the T button command issued by the operation of the telephoto button 66 of the optical remote controller 12, 74 or 96 that is the remote controller with the authentication information or of the optical remote controller 92 or 94 that is a common remote controller (step S336), the image displayed on the monitor 38 is enlarged (step S338) and the process returns to step S102. In this case, the process advances from step S102 to step S104, step S156, step S158, step S160 and so on, in that order, and in accordance with the switches or buttons of the camera proper 14, the play operation becomes possible. The play operation or other operations are also made possible by the interruption due to the command reception from the optical remote controller 12, 74 or 96 that is the remote controller with the authentication information or from the optical remote controller 92 or 94 that is a common remote controller. The display in step S158 after returning to step S102, however, maintains the display of the image enlarged in step S338.

Also, in the case where the authentication command or the general command received from the remote controller in step S216 is the W button command issued by the operation of the wide-angle button 68 of the optical remote controller 12, 74 or 96 that is the remote controller with the authentication information or of the optical remote controller 92 or 94 that is a common remote controller (step S340), on the other hand, the image displayed on the monitor 38 is reduced and displayed in the form of index (step S342), and the process returns to step S102. In this case, the process advances from step S102 to step S104, step S156, step S158, step S160 and so on, in that order, and in accordance with the switches or buttons of the camera proper 14, the play operation becomes possible. The play operation or other operations are also made possible by the interruption due to the command reception from the optical remote controller 12, 74 or 96 that, is the remote controller with the authentication information or from the optical remote controller 92 or 94 that is a common remote controller. The display in step S158 after returning to step S102, however, maintains the reduced list display of step S342.

Incidentally, in the reduced list display in step S342, 4 frames, 9 frames, 16 frames and 25 frames can be sequentially displayed as a list each time the wide-angle button 68 is depressed. Also, each depression of the telephoto button 66 during the reduced list display returns the display from 25 frames to 16 frames, 9 frames, 4 frames and 1 frame in that order in step S338.

Upon depression of the wide-angle button 68 during the enlarged display in step S338 which is made in accordance with the depression of the telephoto button 66 during the normal image display, on the other hand, the operation of restoring the enlarged display to the original size is performed in step S342.

Also, in the case where the authentication command or the general command received from the remote controller in step S216 is the erase command due to the operation of the erase button 86 of the optical remote controller 74 or 96 that is the remote controller with the authentication information or of the optical remote controller 94 that is a common remote controller (step S344), the confirmation as to whether the image is really erased or not is displayed on the monitor 38 (step S346), and in the case where the erase suspension is selected, the process returns to step S102 without erasure. In this case, the process advances from step S102 to step S104, step S156, step S158, step S160 and so on, in that order, and in accordance with the switches or buttons of the camera proper 14, the play operation becomes possible. The play operation or other operations are also made possible by the interruption due to the command reception from the optical remote controller 12, 74 or 96 that is the remote controller with the authentication information or from the optical remote controller 92 or 94 that is a common remote controller.

On determining in step S346 that the execution of the erasure is selected, on the other hand, the particular frame is erased and the immediately preceding image is displayed (step S348), followed by returning to step S102. Incidentally, in the case where the image to be erased is protected, an alarm indicating that the image is protected is displayed on the monitor 38, and the execution of the erasure is ignored. After returning to step S102, the process advances from step S102 to step S104, step S156, step S158, step S160 and so on in that order, thereby making possible the play operation corresponding to the switches and buttons of the camera proper 14. The play operation or other operations are also made possible by the interruption due to the command reception from the optical remote controller 12, 74 or 96 that, is the remote controller with the authentication information or from the optical remote controller 92 or 94 that is a common remote controller.

Also, in the case where the authentication command or the general command received from the remote controller in step S216 is the print command due to the operation of the print button 82 of the optical remote controller 74 that is the remote controller with the authentication information or of the optical remote controller 94 that is a common remote controller (step S350), the required print operation such as the image transmission to the printer is carried out (step S352), and the process returns to step S102. In this case, the process advances from step S102 to step S104, step S156, step S158, step S160 and so on, in that order, and in accordance with the switches or buttons of the camera proper 14, the play operation becomes possible. The play operation or other operations are also made possible by the interruption due to the command reception from the optical remote controller 12, 74 or 96 that is the remote controller with the authentication information or from the optical remote controller 92 or 94 that is a common remote controller.

Also, in the case where the authentication command or the general command received from the remote controller in step S216 is the information display command due to the operation of the information button 84 of the optical remote controller 74 or 96 that is the remote controller with the authentication information or of the optical remote controller 94 that is a common remote controller (step S354), the information on the image displayed on the monitor 38 is displayed (step S356), and the process returns to step S102. In this case, the process advances from step S102 to step S104, step S156, step S158, step S160 and so on, in that order, and in accordance with the switches or buttons of the camera proper 14, the play operation becomes possible. The play operation or other operations are also made possible by the interruption due to the command reception from the optical remote controller 12, 74 or 96 that is the remote controller with the authentication information or from the optical remote controller 92 or 94 that is a common remote controller. The display in step S158 after returning to step S102, however, maintains the display of the image in step S356.

Also, in the case where the authentication command or the general command received from the remote controller in step S216 is the protection command due to the operation of the protection button 90 of the optical remote controller 74 or 96 that is the remote controller with the authentication information or of the optical remote controller 94 that is a common remote controller (step S358), the protection flag is attached to the image displayed on the monitor 38 (step 3360), and the process returns to step S102. In this case, the process advances from step S102 to step S104, step S156, step S158, step S160 and so on, in that order, and in accordance with the switches or buttons of the camera proper 14, the play operation becomes possible. The play operation or other operations are also made possible by the interruption due to the command reception from the optical remote controller 12, 74 or 96 that is the remote controller with the authentication information or from the optical remote controller 92 or 94 that is a common remote controller.

Also, in the case where the authentication command or the general command received from the remote controller in step S216 is the rotation command due to the operation of the rotation button 88 of the optical remote controller 74 or 96 that is the remote controller with the authentication information or of the optical remote controller 94 that is a common remote controller (step S362), the image displayed on the monitor 38 is rotated 90 degrees clockwise (step S364) and the process returns to step S102. In this case, the process advances from step S102 to step S104, step S156, step S158, step S160 and so on, in that order, and in accordance with the switches or buttons of the camera proper 14, the play operation becomes possible. The play operation or other operations are also made possible by the interruption due to the command reception from the optical remote controller 12, 74 or 96 that is the remote controller with the authentication information or from the optical remote controller 92 or 94 that is a common remote controller. The display in step S158 after returning to step S102, however, maintains the display of the image rotated in step S364. Incidentally, another depression of the rotation button 83 causes the image rotated 90 degrees counterclockwise from the original image to be displayed in step S364, and a further depression restores the original image.

Further, in the case where the authentication command or the general command received from the remote controller in step S216 is the menu command due to the operation of the menu button 80 of the optical remote controller 74 or 96 that is the remote controller with the authentication information or of the optical remote controller 94 that is a common remote controller (step S366), the menu can be displayed and set. There are a multiplicity of menu functions. The menu can be set in detail hierarchically from the top menu. The display content of the top menu is varied depending on the position of the select switch 36. Thus, the position of the select switch 36 is read and the corresponding menu is displayed on the monitor 38 (step S368).

In the still image acquisition mode J1, the voice recording, macro, scene selection and the mode menu are displayed. In the dynamic image acquisition mode J2, on the other hand, the voice recording, macro, auto stabilization and the mode menu are displayed. In the play mode J3, the menu is varied with the content reproduced. Specifically, at the time of reproducing the still image, the storage play, information display, slide show and the mode menu are displayed. At the time of displaying a dynamic image, on the other hand, the storage play, information display, end of dynamic image play and the mode menu are displayed. At the time of voice reproduction, the storage play, information display, end of voice reproduction and the mode menu are displayed. At the time of calendar play, the calendar play end, information display, slide show and the mode menu are displayed. At the time of album play, the album selection, information display, album play end and the mode menu are displayed. The operation and display of the low-order menu of each case will not be described in detail, and the mode menu shared by all the cases will be explained.

Specifically, the displayed content of the mode menu is further varied depending on the position of the select switch 36. In the still image acquisition mode J1, the image quality mode switching, the sequential shooting mode setting, the exposure correction, the digital zoom setting, the white balance setting and the setting of selection of the memory for recording the image, etc., are possible. In the dynamic image acquisition mode J2, on the other hand, the image quality mode switching, the exposure correction, the digital zoom setting, the white balance setting, the full-time auto-focus setting and the setting of selection of the memory for recording the image, etc., are possible. In the play mode J3, the rotation display, the sound recording, the image editing, the image correction and the image synthesis are possible.

To end the menu operation, the menu button 80 is depressed again (step S370). Then, the process returns to step S102. In this case, the process advances from step S102 to step S104, step S156, step S158, step S160 and so on, in that order, and in accordance with the switches or buttons of the camera proper 14, the play operation becomes possible. The play operation or other operations are also made possible by the interruption due to the command reception from the optical remote controller 12, 74 or 96 that is the remote controller with the authentication information or from the optical remote controller 92 or 94 that is a common remote controller.

As shown in FIG. 34D, in the case where step S252 determines that the setting mode M3 is in effect, on the other hand, the setting mode is entered. Specifically, in the setting mode, the function and the state of the limit flag of the function limit table shown in FIG. 30 are displayed on the monitor 38, and the circulating selection of the limit function and setting and change of the flag on/off state are carried out using the plus, minus buttons 70, 72 and the telephoto button, wide-angle button 66, 68 of the optical remote controller 12 that is the remote controller with the authentication information or the arrow switch 76 and the OK button 78 of the optical remote controller 74 or 96 that is the remote controller with the authentication information (step S372). Upon completion of the setting and change, the image acquisition command button 62 of the optical remote controller 12, 74 or 96 that is the remote controller with the authentication information is depressed. Upon receipt of the image acquisition execution command, the content thereof is established (step S374), and the process returns to step S102. At the time of returning to step S102, the setting mode M3 is in effect. Therefore, only the determination process of step S102 is repeated, and the operation of the switches and buttons of the camera proper 14 is not accepted, and only the operation of the optical remote controller 12, 74 or 96 that is the remote controller with the authentication information is accepted.

Further, on determining in step S252 that the prohibit mode M1 is in effect, the prohibit mode is entered. Specifically, in the prohibit mode, the state of the select switch 36 of the camera proper 14 is read (step S376), thereby performing the operation corresponding to the image acquisition command given as an authentication command from the optical remote controller 96 that is the authentication command remote controller in the remote controller with the authentication information.

Specifically, in the operation of acquisition of a still image due to the operation of the remote controller in prohibit mode M1 with the still image acquisition mode J1 being in effect due to the operation of the select switch 36, as shown in FIG. 34F, the live image is displayed on the monitor 38 (step S268) thereby to determine whether the authentication command received in step S216 is the image acquisition execution command from the optical remote controller 96 that is an authentication command remote controller or not (step S270). On determining that the authentication command is the image acquisition execution command, the focusing operation is performed (step S272) to acquire the still image (step S274), followed by determination of whether the sequential shooting mode is set or not (step S276). In the case where the sequential shooting mode is not set, an image already acquired is displayed for a snort time on the monitor 38 (step S278), after which the process returns to step S102. In this case, the prohibit mode M1 is set, and therefore, only the determination process of step S102 is repeated, and the operation of the switches and buttons on the camera proper 14 is not accepted. Specifically, the operation of only the optical remote controller 12, 74 or 96 that is the remote controller with the authentication information is accepted, and the authentication mode can be switched only by the interruption due to the reception of the command thereof. The next, operation of a still image acquisition, etc. can be performed only by the optical remote controller 96 that is the authentication command remote controller in the remote controller with the authentication information.

In the case where the sequential shooting mode is set in step S276, on the other hand, whether the built-in memory 110 and/or the removable memory 112 has at least a predetermined amount of the residual memory capacity or not (step S280). In the case where the residual memory capacity is less than the predetermined amount, the "memory full" alarm is displayed on the monitor 38 (step S282), and the process returns to step S102. In this case, the prohibit mode M1 is set, and therefore, only the determination process of step S102 is repeated, and the operation of the switches and buttons cm the camera proper 14 is not accepted. Specifically, the operation of only the optical remote controller 12, 74 or 96 that is the remote controller with the authentication information is accepted, and the authentication mode can be switched only by the interruption due to the reception of the command thereof. The next operation of a still image acquisition, etc. can be performed only by the optical remote controller 96 that is the authentication command remote controller in the remote controller with the authentication information.

Further, on determining in step S280 that, the residual memory capacity is sufficient, on the other hand, whether the image acquisition execution command has arrived or not from the optical remote controller 96 that is the authentication command remote controller is confirmed (step S284), and in the case where the image acquisition execution command has arrived, the process returns to step S274 to acquire the next image. Specifically, as long as the image acquisition command button 62 of the optical remote controller 96 that is the authentication command remote controller is kept depressed, the sequential shooting is carried out. In the case where the image acquisition execution command has arrived, on the other hand, the process returns to step S102. In this case, the prohibit mode M1 is set, and therefore, only the determination process of step S102 is repeated, and the operation of the switches and buttons on the camera proper 14 is not accepted. Specifically, the operation of only the optical remote controller 12, 74 or 96 that is the remote controller with the authentication information is accepted, and the authentication mode can be switched only by the interruption due to the reception of the command thereof. The next operation of a still image acquisition, etc. can be performed only by the optical remote controller 96 that is the authentication command remote controller in the remote controller with the authentication information.

Also, in the case where step S270 determines that the received authentication command is not the image acquisition execution command, whether the authentication command is the T button command as the result of depression of the telephoto button 66 of the optical remote controller 96 that is the authentication command remote controller or not is determined (step S286). On determining that the T button command is involved, the lens unit 16 is driven to the telephoto side as long as the T button command comes (step S288), and once the T button command stops, the drive is suspended and the process returns to step S102. In this case, the prohibit mode M1 is set, and therefore, only the determination process of step S102 is repeated, and the operation of the switches and buttons on the camera proper 14 is not accepted. Specifically, the operation of only the optical remote controller 12, 74 or 96 that is the remote controller with the authentication information is accepted, and the authentication mode can be switched only by the interruption due to the reception of the command thereof. The next operation of a still image acquisition, etc. can be performed only by the optical remote controller 96 that is the authentication command remote controller in the remote controller with the authentication information.

On determining in step S286 that the T button command is not received, on the other hand, whether the authentication command is the W button command due to the depression of the wide-angle button 68 of the optical remote controller 96 that is the authentication command remote controller or not is determined (step S290). On determining that the W button command is involved, the lens unit 16 is driven to the wide-angle side as long as the W button command arrives (step S292), and once the W button command is stopped, the drive is suspended, and the process returns to step S102. On determining in step S290 that the W button command is not involved, the process returns to step S102. In these cases, the prohibit mode M1 is set, and therefore, only the determination process of step S102 is repeated, and the operation of the switches and buttons on the camera proper 14 is not accepted. Specifically, the operation of only the optical remote controller 12, 74 or 96 that is the remote controller with the authentication information is accepted, and the authentication mode can be switched only by the interruption due to the reception of the command thereof. The next operation of a still image acquisition, etc. can be performed only by the optical remote controller 96 that is the authentication command remote controller in the remote controller with the authentication information.

In the image acquisition operation of acquisition of a dynamic image by the operation of the remote controller in prohibit mode M1 in the dynamic image acquisition mode J2 set by the select switch 36 in step S376, on the other hand, as shown in FIG. 34F, a live image is displayed on the monitor 38 (step S294) while at the same time determining whether the image acquisition execution command flag is on or not; the flag being turned on in accordance with the reception of the image acquisition execution command upon depression of the image acquisition command button 62 of the optical remote controller 96 that is the authentication command remote controller (step S296). On determining that the image acquisition execution command flag is set, determination is made as to whether the dynamic image is being acquired or not while at the same time clearing the image acquisition execution command flag (step S298). On determining that the dynamic image is not being acquired, on the other hand, the focusing operation is performed and the dynamic image acquisition operation started (step S300). Then, the residual memory capacity of the built-in memory 110 and/or the removable memory 112 is checked (step S302). In the case where the residual memory capacity is less than a predetermined amount, the "memory full" alarm is displayed on the monitor 38 (step S304) thereby to end the dynamic image acquisition operation (step S306), and the process returns to step S102. In these cases, the prohibit mode M1 is set, and therefore, only the determination process of step S102 is repeated, and the operation of the switches and buttons on the camera proper 14 is not accepted. In the process, the user, already informed from the alarm indication in step S304 that a dynamic image can no longer be acquired, turns the select switch 36 of the camera proper 14. Specifically, the operation of only the optical remote controller 12, 74 or 96 that is the remote controller with the authentication information is accepted, and the authentication mode can be switched only by the interruption due to the reception of the command thereof. The next operation of a still image acquisition, etc. can be performed only by the optical remote controller 96 that is the authentication command remote controller in the remote controller with the authentication information. On determining in step S302 that the residual memory capacity is sufficient, on the other hand, the process returns to step S300 and the dynamic image acquisition operation is continued.

Further, on determining in step S298 that a dynamic image is being acquired, the process advances to step S306, which ends the image acquisition operation, and then returns to step S102. Specifically, a dynamic image is acquired in response to the command of the remote controller from the time when the image acquisition execution command is received upon depression of the image acquisition command button 62 of the optical remote controller 96 that is the authentication command remote controller to the time when the image acquisition execution command is received due to the next depression of the image acquisition command button 62. Specifically, upon receipt of the image acquisition execution command during the loop of step S300 to step S302 to step S300, the operation from step S216 is executed by interruption, and on determining in step S298 that a dynamic image is being acquired, the image acquisition operation is ended. In the case where the acquisition of a dynamic image is ended in this way and the process returns to step S102, the prohibit mode M1 is set, and therefore, only the determination process of step S102 is repeated, and the operation of the switches and buttons on the camera proper 14 is not accepted. Specifically, the operation of only the optical remote controller 12, 74 or 96 that is the remote controller with the authentication information is accepted, and the authentication mode can be switched only by the interruption due to the reception of the command thereof. The next operation of a dynamic image acquisition, etc. can be performed only by the optical remote controller 96 that is the authentication command remote controller in the remote controller with the authentication information.

On determining in step S296 that the image acquisition execution command flag is not on, the process proceeds to step S268 to determine whether the T button command is in effect or not. As described above, on determining that the T button command is involved, the lens unit 16 is driven to the telephoto side as long as the T button command comes (step S288), and once the T button command stops, the drive is suspended and the process returns to step S102. In the case where the T button command is received in a dynamic image acquisition loop in steps S300 and S302, the lens unit 16 is driven by interrupt, and the zoom-up image acquisition becomes possible. Once the process returns to step S102, the prohibit mode M1 is set, and therefore, only the determination process of step S102 is repeated, and the operation of the switches and buttons on the camera proper 14 is not accepted. At the same time, a dynamic image acquisition loop of steps S300 and S302 is continuously executed, and a dynamic image continues to be acquired until the process proceeds to step S306 due to the interruption upon receipt of the image acquisition execution command by the depression of the image acquisition command button 62 of the optical remote controller 96 that is the authentication command remote controller.

Further, on determining in step S286 that the T button command is not involved, determination is made as to whether the W button command is involved or not (step S290), and in the case where the W button command is in effect, the lens unit 16 is driven to the wide angle side as long as the W button command continues to arrive (step S292). Once the W button command ceases to arrive, the drive is suspended and the process returns to step S102. Also in this case, like in the case of the T button command, the zoom-down image acquisition operation is performed if a dynamic image is being acquired, and a dynamic image continues to be acquired until interrupted by the reception of the next image acquisition execution command.

Further, on determining in step S290 that neither the W button command is involved, the process returns to step S102 without doing anything.

As described above, in the case where a dynamic image is being acquired in the prohibit mode M1, the dynamic image acquisition operation can be ended or the zoom operation can be performed by the interrupt due to the reception of the image acquisition execution command or the T or W button command from the optical remote controller 96 that is the authentication command remote controller.

With regard to the dynamic image, the recording time can be limited to, say, 15 seconds, and in accordance with the memory capacity corresponding to the number of seconds of the particular time, the residual memory capacity is determined in step S302. In this way, the dynamic image acquisition operation can be automatically ended.

In the play operation by the operation of the remote controller in prohibit mode M1 in the case where the play mode J3 is set by the select switch 36, on the other hand, the last image recorded in the built-in memory 110 or the removable memory 112 is displayed on the monitor 38, thereby performing the operation corresponding to the switches and buttons of the optical remote controller 96 that is the authentication command remote controller.

Specifically, as shown in FIG. 34G, in the case where the authentication command received from the remote controller in step S216 is the operation command for the arrow switch 76 of the optical remote controller 96 that is the authentication command remote controller (step S308), and in the case where the operation is the down operation command (album) by down switch operation of the arrow switch 76 (step S310), then the image recorded in the album is displayed on the monitor 38 (step S312). Upon depression of the menu button 80 of the optical remote controller 96 that is the authentication command remote controller while this image is being displayed (step S314), the album display function is ended and the process returns to step S102. In this case, the prohibit mode M1 is set, and therefore, only the determination process of step S102 is repeated, and the operation of the switches and buttons on the camera proper 14 is not accepted. Specifically, the operation of only the optical remote controller 12, 74 or 96 that is the remote controller with the authentication information is accepted, and the authentication mode can be switched only by the interruption due to the reception of the command thereof. Other operations such as a reproduction operation can be performed only by the optical remote controller 96 that is the authentication command remote controller in the remote controller with the authentication information.

In the case of the up operation command (calendar) by the up switch operation of the arrow switch 76 (step S316), on the other hand, the images recorded for the current month are displayed in calendar form on the monitor 38 (step S318). Further, the images for the previous months or the images acquired for the selected day can be selected and displayed by the arrow switch 76. Upon depression of the menu button 80 during this display (step S320), the calendar display function is ended and the process returns to step S102. In this case, the prohibit mode M1 is set, and therefore, only the determination process of step S102 is repeated, and the operation of the switches and buttons on the camera proper 14 is not accepted. Specifically, the operation of only the optical remote controller 12, 74 or 96 that is the remote controller with the authentication information is accepted, and the authentication mode can be switched only by the interruption due to the reception of the command thereof. Other operations such as a reproduction operation can be performed only by the optical remote controller 96 that is the authentication command remote controller in the remote controller with the authentication information.

Also, in the case of the right operation command by the right switch operation of the arrow switch 76 (step S322), the next image is displayed on the monitor 38 (step S324), and the process returns to step S102. Incidentally, assuming that this right switch is operated in the case where the current image is the last one, the first image is displayed. In this case, the prohibit mode M1 is set, and therefore, only the determination process of step S102 is repeated, and the operation of the switches and buttons on the camera proper 14 is not accepted. Specifically, the operation of only the optical remote controller 12, 74 or 96 that is the remote controller with the authentication information is accepted, and the authentication mode can be switched only by the interruption due to the reception of the command thereof. Other operations such as a reproduction operation can be performed only by the optical remote controller 96 that is the authentication command remote controller in the remote controller with the authentication information.

Also, in the case of the left operation command due to the left switch operation of the arrow switch 76 (step S326), the previous image is displayed on the monitor 38 (step S328) and the process returns to step S102. Incidentally, in the case where the current image is the first one, the last image is displayed by the left switch operation. In this case, the prohibit mode M1 is set, and therefore, only the determination process of step S102 is repeated, and the operation of the switches and buttons on the camera proper 14 is not accepted. Specifically, the operation of only the optical remote controller 12, 74 or 96 that is the remote controller with the authentication information is accepted, and the authentication mode can be switched only by the interruption due to the reception of the command thereof. Other operations such as a reproduction operation can be performed only by the optical remote controller 96 that is the authentication command remote controller in the remote controller with the authentication information.

Further, in the case where the authentication command received from the remote controller in step S216 is the OK command due to the operation of the OK button 78 of the optical remote controller 96 that is the authentication command remote controller (step S330), whether the current image is a dynamic image or not is checked (step S332), and if not a dynamic image, it is ignored and the process returns to step S102. In the case where it is a dynamic image, on the other hand, the particular dynamic image is displayed (step S334), and the process returns to step S102. In these cases, the prohibit mode M1 is set, and therefore, only the determination process of step S102 is repeated, and the operation of the switches and buttons on the camera proper 14 is not accepted. Specifically, the operation of only the optical remote controller 12, 74 or 96 that is the remote controller with the authentication information is accepted, and the authentication mode can be switched only by the interruption due to the reception of the command thereof. Other operations such as a reproduction operation can be performed only by the optical remote controller 96 that is the authentication command remote controller in the remote controller with the authentication information.

In the case where the authentication command received from the remote controller in step S216 is the T button command issued by the operation of the telephoto button 66 of the optical remote controller 96 that is the authentication command remote controller (step S336), the image displayed on the monitor 38 is enlarged (step S338) and the process returns to step S102. In this case, the prohibit mode M1 is set, and therefore, only the determination process of step S102 is repeated, and the operation of the switches and buttons on the camera proper 14 is not accepted. Specifically, the operation of only the optical remote controller 12, 74 or 96 that is the remote controller with the authentication information is accepted, and the authentication mode can be switched only by the interruption due to the reception of the command thereof. Other operations such as a reproduction operation can be performed only by the optical remote controller 96 that is the authentication command remote controller in the remote controller with the authentication information.

Also, in the case where the authentication command received from the remote controller in step S216 is the W button command issued by the operation of the wide-angle button 68 of the optical remote controller 96 that is the authentication command remote controller (step S340), on the other hand, the image displayed on the monitor 38 is reduced and displayed in the form of index (step S342), and the process returns to step S102. In this case, the prohibit mode M1 is set, and therefore, only the determination process of step S102 is repeated, and the operation of the switches and buttons on the camera proper 14 is not accepted. Specifically, the operation of only the optical remote controller 12, 74 or 96 that is the remote controller with the authentication information is accepted, and the authentication mode can be switched only by the interruption due to the reception of the command thereof. Other operations such as a reproduction operation can be performed only by the optical remote controller 96 that is the authentication command remote controller in the remote controller with the authentication information.

Incidentally, in the reduced list display in step S256, 4 frames, 9 frames, 16 frames and 25 frames can be sequentially displayed as a list each time the wide-angle button 68 is depressed. Also, each depression of the telephoto button 66 during the reduced list display returns the display from 25 frames to 16 frames, 9 frames, 4 frames and 1 frame in that order in step S342.

Upon depression of the wide-angle button 68 during the enlarged display in step S338 which is made in accordance with the depression of the telephoto button 66 during the normal image display, on the other hand, the operation of restoring the enlarged display to the original size is performed in step S342.

Also, in the case where the authentication command received from the remote controller in step S216 is the erase command due to the operation of the erase button 86 of the optical remote controller 96 that is the authentication command remote controller (step S344), the confirmation as to whether the image is really erased or not is displayed on the monitor 38 (step S346), and in the case where the erase suspension is selected, the process returns to step S102 without erasure. In this case, the prohibit mode M1 is set, and therefore, only the determination process of step S102 is repeated, and the operation of the switches and buttons on the camera proper 14 is not accepted. Specifically, the operation of only the optical remote controller 12, 74 or 96 that is the remote controller with the authentication information is accepted, and the authentication mode can be switched only by the interruption due to the reception of the command thereof. Other operations such as a reproduction operation can be performed only by the optical remote controller 96 that is the authentication command remote controller in the remote controller with the authentication information.

On determining in step S346 that the execution of the erasure is selected, on the other hand, the particular frame is erased and the immediately preceding image is displayed (step S348), followed by returning to step S102. Incidentally, in the case where the image to be erased is protected, an alarm indicating that the image is protected is displayed on the monitor 38, and the execution of the erasure is ignored. After returning to step S102, the prohibit mode M1 is set, and therefore, only the determination process of step S102 is repeated, and the operation of the switches and buttons on the camera proper 14 is not accepted. Specifically, the operation of only the optical remote controller 12, 74 or 96 that is the remote controller with the authentication information is accepted, and the authentication mode can be switched only by the interruption due to the reception of the command thereof. Other operations such as a reproduction operation can be performed only by the optical remote controller 96 that is the authentication command remote controller in the remote controller with the authentication information.

Also, in the case where the authentication command received from the remote controller in step S216 is the print command due to the operation of the print button 82 of the optical remote controller 96 that is the authentication command remote controller (step S350), the required print operation such as the image transmission to the printer is carried out (step S352), and the process returns to step S102. In this case, the prohibit mode M1 is set, and therefore, only the determination process of step S102 is repeated, and the operation of the switches and buttons on the camera proper 14 is not accepted. Specifically, the operation of only the optical remote controller 12, 74 or 96 that is the remote controller with the authentication information is accepted, and the authentication mode can be switched only by the interruption due to the reception of the command thereof. Other operations such as a reproduction operation can be performed only by the optical remote controller 96 that is the authentication command remote controller in the remote controller with the authentication information.

Also, in the case where the authentication command received from the remote controller in step S216 is the information display command due to the operation of the information button 34 of the optical remote controller 96 that is the authentication command remote controller (step S354), the information on the image displayed on the monitor 38 is displayed (step S356), and the process returns to step S102. In this case, the prohibit mode M1 is set, and therefore, only the determination process of step S102 is repeated, and the operation of the switches and buttons on the camera proper 14 is not accepted. Specifically, the operation of only the optical remote controller 12, 74 or 96 that is the remote controller with the authentication information is accepted, and the authentication mode can be switched only by the interruption due to the reception of the command thereof. Other operations such as a reproduction operation can be performed only by the optical remote controller 96 that is the authentication command remote controller in the remote controller with the authentication information.

Also, in the case where the authentication command received from the remote controller in step S216 is the protection command due to the operation of she protection button 90 of the optical remote controller 96 that is the authentication command remote controller (step S358), the protection flag is attached to the image displayed on the monitor 38 (step S360), and the process returns to step S102. In this case, the prohibit mode M1 is set, and therefore, only the determination process of step S102 is repeated, and the operation of the switches and buttons on the camera proper 14 is not accepted. Specifically, the operation of only the optical remote controller 12, 74 or 96 that is the remote controller with the authentication information is accepted, and the authentication mode can be switched only by the interruption due to the reception of the command thereof. Other operations such as a reproduction operation can be performed only by the optical remote controller 96 that is the authentication command remote controller in the remote controller with the authentication information.

Also, in the case where the authentication command received from the remote controller in step S216 is the rotation command due to the operation of the rotation button 88 of the optical remote controller 96 that is the authentication command remote controller (step S362), the image displayed on the monitor 38 is rotated 90 degrees clockwise (step S364) and the process returns to step S102. In this case, the prohibit mode M1 is set, and therefore, only the determination process of step S102 is repeated, and the operation of the switches and buttons on the camera proper 14 is not accepted. Specifically, the operation of only the optical remote controller 12, 74 or 96 that is the remote controller with the authentication information is accepted, and the authentication mode can be switched only by the interruption due to the reception of the command thereof. Other operations such as a reproduction operation can be performed only by the optical remote controller 96 that is the authentication command remote controller in the remote controller with the authentication information. Incidentally, another depression of the rotation button 88 causes the image rotated 90 degrees counterclockwise from the original image to be displayed in step S364, and a further depression restores the original image.

Further, in the case where the authentication command received from the remote controller in step S216 is the menu command due to the operation of the menu button 80 of the optical remote controller 96 that is the authentication command remote controller (step S366), the menu can be displayed and set. There are a multiplicity of menu functions. The menu can be set in detail hierarchically from the top menu. The display content of the top menu is varied depending on the position of the select switch 36. Thus, the position of the select switch 36 is read and the corresponding menu is displayed on the monitor 38 (step S368).

In the still image acquisition mode J1, the voice recording, macro, scene selection and the mode menu are displayed. In the dynamic image acquisition mode J2, on the other hand, the voice recording, macro, auto stabilization and the mode menu are displayed. In the play mode J3, the menu is varied with the content reproduced. Specifically, at the time of reproducing the still image, the storage play, information display, slide show and the mode menu are displayed. At the time of displaying a dynamic image, on the other hand, the storage play, information display, end of dynamic image play and the mode menu are displayed. At the time of voice reproduction, the storage play, information display, end of voice reproduction and the mode menu are displayed. At the time of calendar play, the calendar play end, information display, slide show and the mode menu are displayed. At the time of album play, the album selection, information display, album play end and the mode menu are displayed. The operation and display of the low-order menu of each case will not be described in detail, and the mode menu shared by all the cases will be explained.

Specifically, the displayed content of the mode menu is further varied depending on the position of the select switch 36. In the still image acquisition mode J1, the image quality mode switching, the sequential shooting mode setting, the exposure correction, the digital zoom setting, the white balance setting and the setting of selection of the memory for recording the image, etc., are possible. In the dynamic image acquisition mode J2, on the other hand, the image quality mode switching, the exposure correction, the digital zoom setting, the white balance setting, the full-time auto-focus setting and the setting of selection of the memory for recording the image, etc., are possible. In the play mode J3, the rotation display, the sound recording, the image editing, the image correction and the image synthesis are possible.

To end the menu operation, the menu button 80 of the optical remote controller 96 that is the authentication command remote controller is depressed again (step S370). Then, the process returns to step S102. In this case, the prohibit mode M1 is set, and therefore, only the determination process of step S102 is repeated, and the operation of the switches and buttons on the camera proper 14 is not accepted. Specifically, the operation of only the optical remote controller 12, 74 or 96 that is the remote controller with the authentication information is accepted, and the authentication mode can be switched only by the interruption due to the reception of the command thereof. Other operations such as a reproduction operation can be performed only by the optical remote controller 96 that is the authentication command remote controller in the remote controller with the authentication information.

As described above, according to the first embodiment of the invention, the authentication command is transmitted from the optical remote controller 14 or 72 with the authentication function separate from the camera proper 14, and the function can be limited by determining the authentication command received by the camera proper 14. Should the camera proper 14 be lost, therefore, the privacy can be protected and the security maintained by limiting the use of the camera proper 14 and preventing the acquired image from being browsed, copied or transferred.

Further, by using the compact optical remote controller 14 or 72 with the authentication information for both the transmission, of the image acquisition command for the image acquisition or play operation and the transmission of the authentication mode switching command, a security system is realized which can be carried with a small burden and also easily operated.

Further, assume that the correspondence is positively established between the camera proper 14 that is the image acquisition device and the commanding device (the optical remote controller 12, 74 or 96 with the authentication information), and the command transmitted from the optical remote controller 12, 74 or 96 to the camera proper 14 is wiretapped or duplicated. Even in such a case, the transmission of the command from the legitimate remote controller can be confirmed with an improved reliability in such a manner that the identification information of the camera proper 14 is appropriately changed and transmitted to the optical remote controller 12, 74 or 96, and the particular identification information is sent together with the command from the optical remote controller 12, 74 or 96 and confirmed by the camera proper 14.

In this manner, the function of limiting the use of the image acquisition device can be provided which is easy to operate, inexpensive and high in security.

Further, the functions of the switches and buttons of the optical remote controller 12 or 72 that is the remote controller with the authentication information can be switched by the authentication setting switch 60, so that the number of the switches and buttons can be reduced to reduce the size.

Further, the camera proper 14 can perform the operation by identifying the content of the authentication command received. In the case where the authentication command received is the authentication mode switching command, the authentication mode can be switched correspondingly.

Incidentally, the camera proper 14 can use both the optical remote controller 12, 74 or 96 that is the remote controller with the authentication information and the optical remote controller 92 or 94 that is the common remote controller without the authentication information. To execute the function involving privacy, such as reproduction, the optical remote controller 12, 74 or 96 that is the remote controller with the authentication information or the like which can transmit the authentication command is required. The action of image acquisition requires no privacy protection, however, and therefore, the image acquisition operation can be performed by the optical remote controller 92 or 94 without the authentication information for transmitting the general command not containing the authentication information. During travel or the like, therefore, the optical remote controller 92 or 94 without the authentication information can be carried while the optical remote controller 12, 74 or 96 with the authentication information can be left at home. By doing so, the image acquisition operation can be performed freely, and should the camera proper 14 and the remote controller 92 or 94 be lost while traveling, the fact that the optical remote controller 12, 74 or 96 with the authentication information is left at home and not held by the third party who has acquired the camera proper 14 makes it possible to maintain the security of the images acquired.

Second Embodiment

Next, a second embodiment of the invention will be explained.

According to this embodiment, the command is transmitted or received not optically but by radio signal.

With reference to FIG. 35, a radio remote controller 182 will be explained as an example of a the commanding device according to the embodiment.

The radio remote controller 182 has a built-in antenna 164 for transmitting the command radio signal of the general command and the authentication command to the image acquisition device. Also, on the upper surface of the radio remote controller 182, like the optical remote controller 96, there are arranged an image acquisition command button 62, a telephoto button 66, a wide-angle button 68, a plus button 70, a minus button 72, a limit button 98, a setting button 100, a prohibit button 102, a permit button 104, etc. In this radio remote controller 182, however, the authentication setting switch is omitted. Thus, the setting mode is stored in accordance with the operation of the four buttons ranging from the limit button 98 to the permit button 104, and based on the current setting mode thus stored, the general command and the authentication command are switched. Nevertheless, like in the optical remote controller 12 or 74, the authentication setting switch 64 may of course be included.

Incidentally, since the switching of the authentication mode is so important, in order to prevent the erroneous operation by erroneous touch or the like, the arrangement may be made to transmit the authentication mode switching command only in the case where the image acquisition command button 62 is depressed at the same time as any one of the limit button 98, the setting button 100, the prohibit button 102 and the permit button 104.

Further, the light-receiving unit 60 for receiving the identification information is arranged at the end surface of the radio remote controller 182, so that the light-receiving unit 60 receives the identification information from the digital camera 10 or the digital movie camera 54 chat is the image acquisition device.

Next, an example of the electrical configuration of the radio remote controller 182 will be explained with reference to FIG. 36.

Whenever any of the buttons 62, 66 to 72, 98 to 104 is turned on, the control unit 148 generates a signal corresponding to the function of the particular button. Also, the control unit 148 has an authentication information generating unit 148A for generating the authentication information transmitted by the remote controller to permit the digital camera 10 or the digital movie camera 54 that is the image acquisition device to authenticate the remote controller with the authentication information. The authentication information, as described later, includes the image acquisition device identification information sent from the image acquisition device or the information derived therefrom and the information unique to the image acquisition device. Also, the control unit 148 has a unique information storage unit 148B for storing the information unique to the radio remote controller 182 to authenticate the image acquisition device corresponding to the remote controller, and this unique information is sent to the image acquisition device as part of the authentication information. The authentication information is stored in a nonvolatile memory, and the unique identification information is desirably recorded before factory shipment or distribution of the radio remote controller 182. Further, this identification information is desirably encrypted to prevent illegal use.

Also, the control unit 148 has a light-receiving processor 148C to process, in the manner explained in FIG. 14, the identification information received by the light-receiving element 60A of the light-receiving unit 60 from the image acquisition device.

The control unit 148 continues to generate the signal for a preset time as long as the button is kept depressed. In the modulator 150, the carrier wave generated and supplied by the oscillator 152 is modulated with the signal from the control unit 148, and the resulting signal is amplified by a power amplifier 186 and the corresponding radio signal radiated from the antenna 184.

In Japan, the frequency of 322 MHz or less with a large tolerable field strength (500 μV/m or less at the distance of 3 m) of a weak radio signal under the Radio Signal Law is used, so that the command radio signal may reach the image acquisition device at some distance away. Incidentally, the operating frequency is not necessarily selected in the aforementioned way and is not limited to the aforementioned frequency due to the difference in the restriction value or the operating frequency under the radio signal laws of different nations. For example, the frequency of 157.5 MHz, 450 MHz or 900 MHz may also be used but is required to meet the restrictions under the Radio Signal Law.

Figure 37:
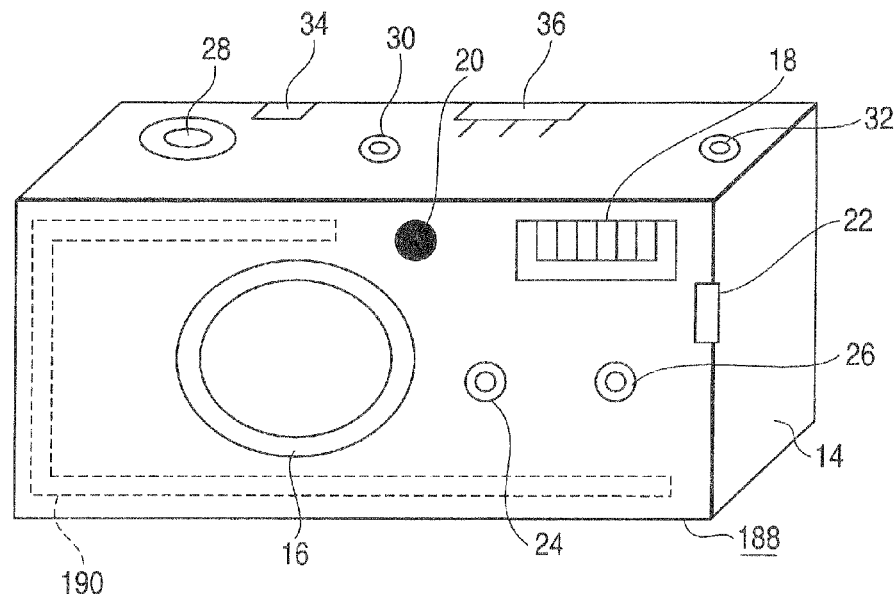
FIG. 37 is a perspective view showing the outer configuration of a digital camera as an example of the image acquisition device according to the second embodiment.

FIG. 37 is a perspective view showing the outer configuration of a digital camera 188 as an example of the image acquisition device corresponding to the radio remote controller 182 described above. The digital camera 188, though configured similarly to the digital camera 10 shown in FIG. 1, has a built-in antenna 190. Also, the light-receiving element 20 may be omitted.

Figure 38:
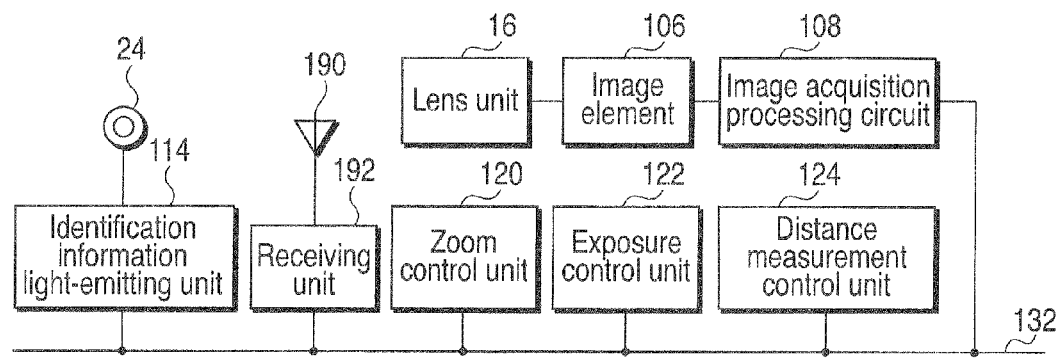
FIG. 38 is a diagram showing a part of the block configuration of the digital camera shown in FIG. 37.

FIG. 38 is a diagram showing a part of the block configuration of the digital camera 188 as an example of the image acquisition device. The light-emitting element 20 shown in the block diagram of FIG. 10 is replaced by the antenna 190, and the light-receiving unit 118 by a receiving unit 192. The other component parts are similar to the corresponding parts shown in FIG. 10. Without removing the light-receiving unit 118 and the light-receiving element 20, the receiving unit 192 and the antenna 190 may be added.

Figure 39:
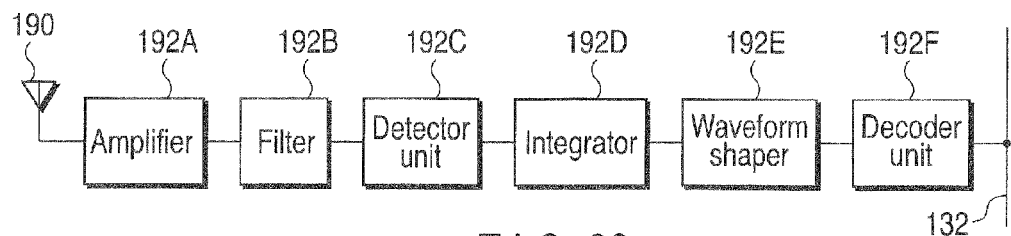
FIG. 39 is a block diagram showing the configuration of a receiving unit of the digital camera shown in FIG. 37.

The receiving unit 192 has a configuration as shown in FIG. 39. In this configuration, the processing system from the antenna 190 to the decoder unit 192F is assumed to have a configuration suitable for the frequency of the command radio signal from the radio remote controller 182. The command radio signal is converted into a current by the antenna 190, amplified by an amplifier 192A, and after being passed through the band conforming with the carrier frequency by a filter 192B, detected by a detector 192C, followed by the carrier frequency component being removed by an integrator 192D thereby to reproduce the signal component. The signal component thus reproduced is shaped by a waveform shaper 192E, and converted into a command by a decoder unit 192F.

Figure 40:
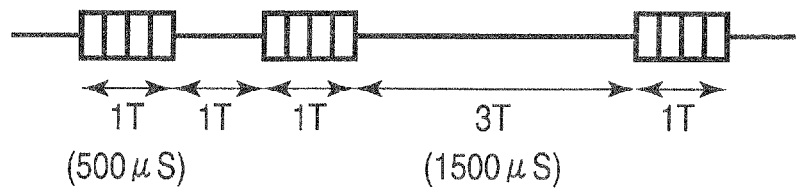
FIG. 40 is a diagram showing a signal generated by the radio remote controller shown in FIG. 35.

Next, with reference to FIG. 40, the signal reproduced by the radio remote controller 182 will be explained.

Figure 18:
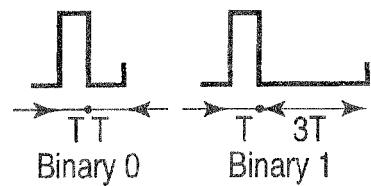
FIG. 18 is a diagram showing the structure of one bit of the data signal.

The data signal supplied from the control unit 148 to the modulator 150 is similar to that shown in FIGS. 17 to 19. In the case where the frequency of 315 MHz is used as the carrier of the command radio signal, the frequency of 315 MHz is supplied from the oscillator 152 to the frequency converter 150 to modulate the data signal. In the case of the carrier signal of 315 MHz, the signal waveform as shown in FIG. 40 is obtained. The data signal 1T of 500 us contains about 157 cycles of the 315 MHz carrier signal having the period of 3.17 µs. A predetermined output is obtained from the power amplifier 186 and radiated from the antenna 184. In the case where the carrier signal is 615 MHz, on the other hand, the data signal 1T of 500 µs contains about 315 cycles of the 630 MHz carrier signal having the period of 1.59 µs.

Figure 41:
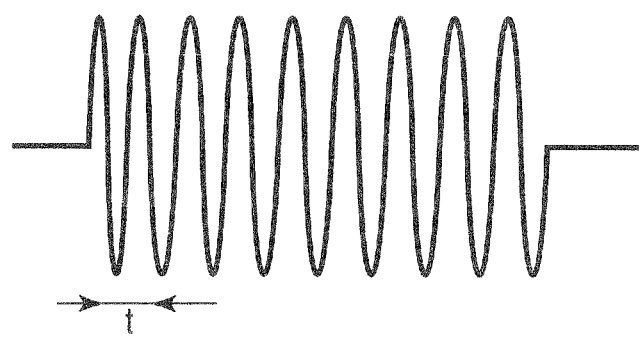
FIG. 41 is a diagram showing a carrier waveform in enlarged form.

FIG. 41 is a diagram showing the carrier waveform in enlarged form. The frequency of 315 MHz is associated with one period of about 3.17 µs, and the frequency of 630 MHz with one period of about 1.59 µs. In the case of 945 MHz, one period is about 1.06 µs and the data signal 1T of 500 µs contains about 473 cycles. In the case of 2.45 GHz, one period is about 0.41 µs and the data signal 1T of 500 µs contains about 1225 cycles. Also, in the case of 157.5 MHz, one period is about 6.35 µs and the data signal 1T of 500 µs contains about 79 cycles.

By realizing the configuration described above, an image acquisition system can be constructed in which the command from the commanding device can be transmitted by a radio signal. The remote controller command with the radio signal is lower in directivity than the optical remote controller command, and the radio signal can be caused to reach the image acquisition device from a broad range.

Third Embodiment

Now, a third embodiment of the invention will be explained.

In the case where an acquired image is recorded in a removable memory 112 in a standardized format, assume that the camera proper 14 is set in prohibit mode M1 and cannot be used. Even in that case, the removable memory 112 may be pulled off from the camera proper 14 and the images therein may be reproduced on another device, resulting in the leakage of information. In view of this, according to this embodiment, the image acquired in prohibit mode M1 is recorded only in the built-in memory 110, so that as long as the camera proper 14 remains in prohibit mode M1, the image cannot be reproduced by ether than the remote controller with the authentication information.

Specifically, unlike in the first embodiment described above, the still image acquired in step S274 is recorded only in the built-in memory 110 and the residual memory capacity is checked in step S280 only for the built-in memory 110. Also, the dynamic image acquired in step S300 is stored only in the built-in memory 110 and the residual memory capacity checked in step S302 only for the built-in memory 110. Further, in the case where the image recorded in the built-in memory 110 is copied or transferred to the removable memory 112 using the menu function (step S363), the particular image is encrypted by the encryption/decryption circuit 128 or by the main control unit 116 using a program. At the time of returning the image recorded in encrypted form in the removable memory 112 to the built-in memory 110 or reproducing it in the camera proper 14, the particular image is decrypted by the encryption/decryption circuit 128 or the main control unit 116 with the program.

Also, the owner may be desirous of hiding some image acquired in limit mode M2 or permit mode M4. In such a case, the owner of the camera proper 14 can prevent the loss of an image which otherwise might be caused by the removal of the removable memory 112, in such a manner that the prohibit timer 146 is set for a short time and the image acquired in limit mode M2 or permit mode M4 is recorded only in the built-in memory 110 but not in the removable memory 112 to prevent the image reproduction without the remote controller with the authentication information after entering the prohibit mode M1.

Specifically, the menu designating the place of recording the image is included as one of the set items of the menu, i.e., the built-in memory 110 only or the removable memory 112 only, or both the built-in memory 110 and the removable memory 112 with the priority given to one of them to record the image whenever the other is filled up.

Incidentally, to assure safe recording, the record selection menu may be so configured as to be capable of being set only with the menu (step S368) during the reproduction in prohibit mode M1.

As described above, according to the third embodiment of the invention, the image acquired by the camera proper 14 in prohibit mode M1 is stored in the built-in memory 110, and therefore, cannot be read by other devices. Also, as long as the camera proper 14 remains in prohibit mode M1, the image cannot be reproduced, copied, transferred or printed without the optical remote controller 12, 74 or 96 or the radio remote controller 182 that is the remote controller with the authentication information. Further, the image in the built-in memory 110, if transferred to the removable memory 112, is stored in encrypted form, thereby making it also possible to maintain the security of the images in the built-in memory 110. Also, the user can select whether the acquired image is to be recorded either in the built-in memory 110 or in the removable memory 112.

Fourth Embodiment

Next, a fourth embodiment of the invention will be explained.

This embodiment uses the variable identification information as identification information.

Figure 42:
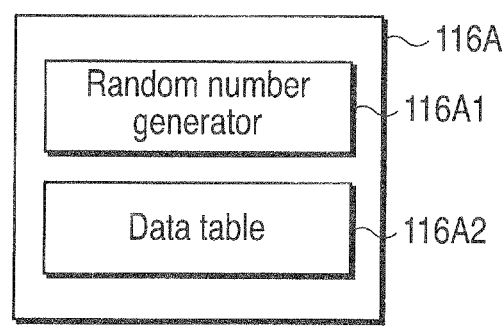
FIG. 42 is a diagram showing the configuration of the control unit of the remote controller according to a third embodiment of the invention.

As shown in FIG. 42, according to this embodiment, the identification information generating unit 116A of the main control unit 116 of the camera proper 14 includes a random number generating unit 116A1 or a data table 116A2.

The random number generator 116A1 may be of such a type that the random number is generated by the random number generation program such as the mixed congruential method or the linear congruential method using the CPU of the main control unit 116, or of such a type that, a pseudorandom number may be generated by a logic circuit such as a combination of a shift register and an exclusive-OR gate.

FIG. 43 is a diagram showing an example of the data table 116A2 random number table of 100 two-digit numerical values.

As described above, a random number is generated by the random number generating unit 116A1 for each transmission of the identification information, or the identification information is used as variable identification information by sequentially selecting the numerical values in the data table 116A2. In this way, the security can be improved against the theft or duplication of the identification information transmitted in the past.

This identification information may be used either with the information of the unique information storage unit 116B or independently.

The transmission format of the identification information is similar to the one explained with reference to FIGS. 22A to 26C.

As described above, according to the fourth embodiment of invention, the variable identification information is generated by using the random number generated by the random number generating unit 116A1 or the value selected from the data table 116A2. Thus, the security is improved against the duplication of the command by wiretapping, etc. of the identification information transmitted to the commanding device in the past.

Fifth Embodiment

Next, a fifth embodiment of the invention will be explained.

According to this embodiment, as shown in FIG. 44, the identification information generating unit 116A of the main control unit 116 of the camera proper 14 has a counter 116A3. Also, as shown in FIG. 45, the control unit 148 of the radio remote controller 182 or the optical remote controller 12, 74 or 96 that is the remote controller with the authentication information has a counter 148D. According to this embodiment, the reliability is improved by synchronously changing the identification information between the camera proper 14 and the remote controller 12, 74, 96 or 182 using the counters 116A3, 148D.

Figure 46:
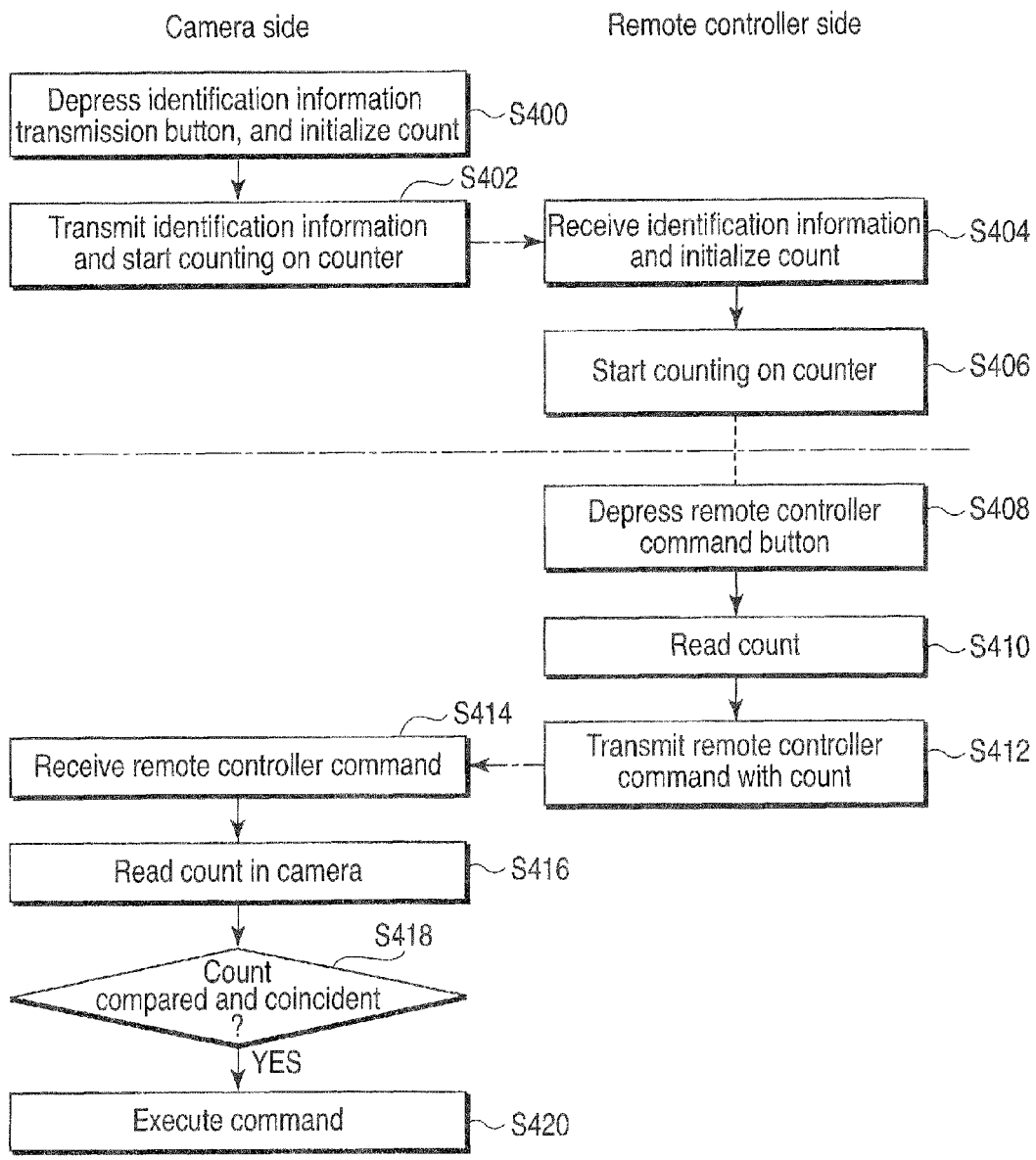
FIG. 46 is a diagram showing a flowchart for explaining the steps of comparing the counts according no the fifth embodiment.

The steps of this process will be explained with reference to FIG. 46.

Upon depression of the transmission button 32 of the camera proper 14, the main control unit 116 initializes the count, value on the counter 116A3 on the camera side (step S400). Then, the identification information combined with the initialized count value of the counter 116A3 is transmitted while at the same time starting the counting operation of the counter 116A3 (step S402).

In the optical remote controller 12, 74, or 96 or the radio remote controller 182 that is the remote controller with the authentication information, on the other hand, the control unit 148, upon reception of the identification information from the camera proper 14, rev/rites the count value of the counter 148D in the control unit 148 into the initial value of the count combined with the identification information received (step S404). Then, the count on the counter 148D is started (step S406).

Subsequently, upon depression of any button on the optical remote controller 12, 74 or 96 or the radio remote controller 182 that is the remote controller with the authentication information (step S408), the control unit 148 reads the count value on the counter 148D (step S410) and transmits the command with the authentication information combined with the count value thus read (step S412).

On the camera proper 14 side, upon reception of the command with the authentication information combined with the count value (step S414), the main control unit 116 reads the count value on the counter 116A3 in the camera proper 14 (step S416). The count value thus read is compared with the count value from the remote controller 12, 74, 96 or 182, and if both counts are coincident with each other or the result is in a tolerable range raking the error between the counts into consideration (step S418), the operation is executed in accordance to the command (step S420).

As described above, with beginning of the transmission of the identification information from the camera proper 14, the counting operation is started by the optical remote controller 12, 74 or 96 or the radio remote controller 182 with the authentication information, and the coincidence is assured between the counts on both sides. By doing so, only the command from the remote controller 12, 74, 96 or 182 of which the count coincides can be accepted.

The counting method includes the one in which the identification information is counted as 1, 2, 3, . . . each time it is issued or counted as 1, 2, 3, . . . each time the signal received is checked for coincidence, or the one in which the time is counted on the timer. Even in the case where there are a plurality of remote controllers of the same type, the command from other remote controllers is not accepted as long as the identification information changes and the count fails to coincide. As compared with the case in which only the fixed identification information is used for determination, therefore, the security can be further improved with a simple mechanism.

As described above, according to the fifth embodiment of the invention, both the optical remote controller 12, 74 or 96 or the radio remote controller 182 with the authentication information and the camera proper 14 start the counting operation with the identification information transmission as a starting point, and by assuring the coincidence between the two counts, the camera proper 14 can accept only the command from the remote controller with a coincident count value.

Incidentally, the count value of course may not be combined with the identification information but the count value itself may be used as the identification information.

Sixth Embodiment

Next, a sixth embodiment of the invention will be explained.

In order to improve the confidentiality of the image already acquired, according to this embodiment, the operation is performed also with the image acquisition execution command without the authentication information or with the command of the telephoto button 66 and the wide-angle button 68 having the zoom function in the image acquisition modes J1, J2. In play mode J3, on the other hand, the operation is performed only with the authentication command from the optical remote controller 96 that is the authentication command remote controller.

Figure 47:
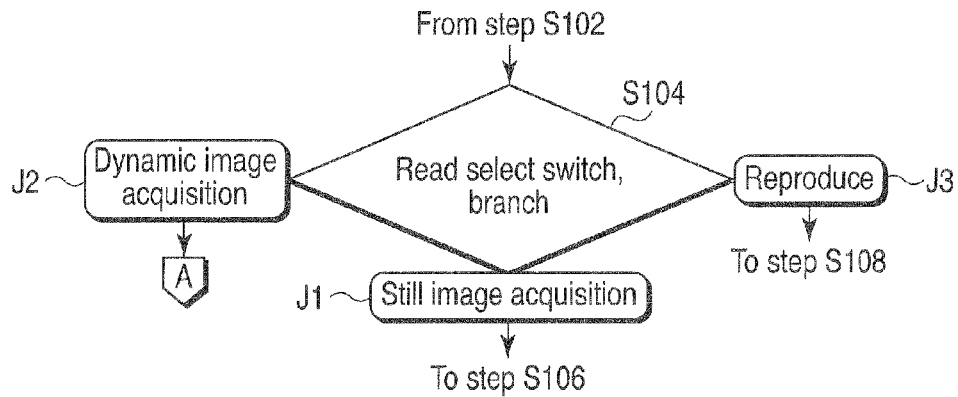
FIG. 47 is a diagram showing the flowchart for explaining the operation of the camera proper according to a sixth embodiment of the invention.

In the case where the select switch 36 is read and the process branches to play mode J3 in step S104, according to the first embodiment described above, step S156 is entered to determine whether the reproduction is permitted or not. According to the present embodiment, on the other hand, as shown in FIG. 47, the process proceeds to step S108 to display an alarm on the monitor 38 to the effect that the operation can be performed only by the authentication command remote controller.

Figure 48:
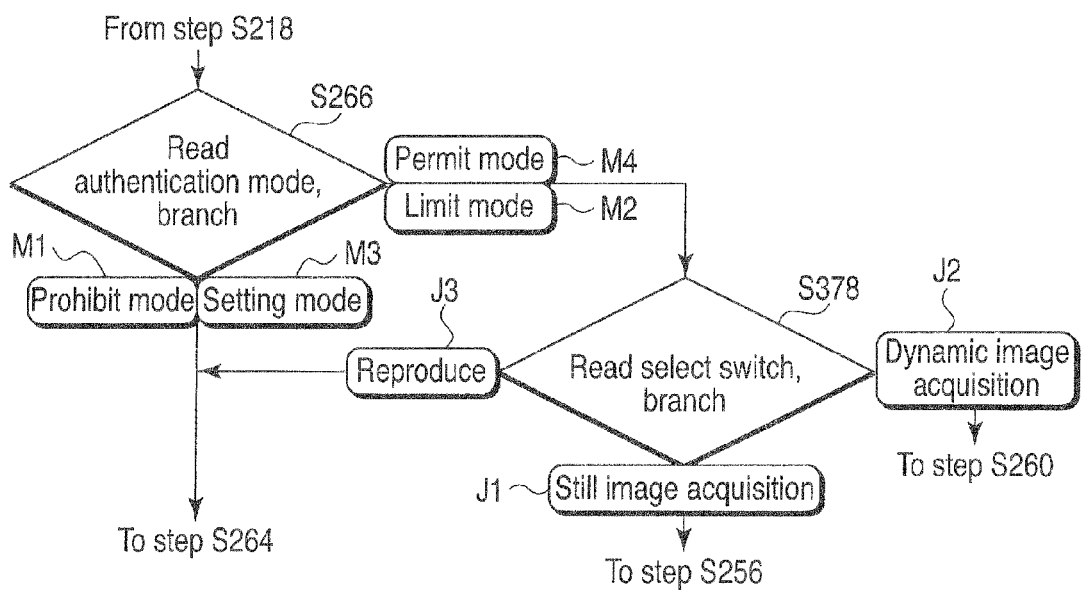
FIG. 48 is a diagram showing the flowchart for explaining the operation of the camera proper according to the sixth embodiment.

Also, on determining in step S266 that the permit mode M4 or the limit mode M2 is in effect at the time of receiving the general command, according to the first embodiment described above, the process branches from step S254 to step S262 to determine whether the reproduction is permitted or not. According to the present embodiment, on the other hand, as shown in FIG. 48, the state of the select switch 36 on the camera proper 14 is read so that the process branches to an appropriate step depending on whether the still image acquisition mode J1, the dynamic image acquisition mode J2 or the play mode J3 is in effect (step S378). On determining that the play mode J3 is in effect, the process proceeds to step S264 for displaying an alarm on the monitor 38 indicating that the operation cannot be performed except by the authentication command remote controller. On determining that the still image acquisition mode J1 is in effect in step S378, on the other hand, the process proceeds to step S256, while on determining that the dynamic image acquisition mode J2 is in effect in step S378, the process proceeds to step S260.

Figure 49A:
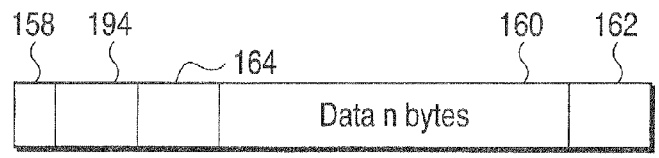
FIG. 49A is a diagram showing an example of the data format of the transmission data signal from the remote controller.
Figure 49B:
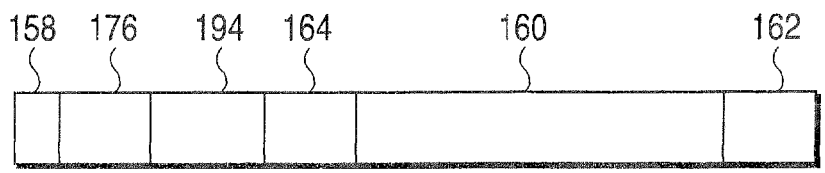
FIG. 49B is a diagram showing another example of the data format of the transmission data signal from the remote controller.
Figure 49C:
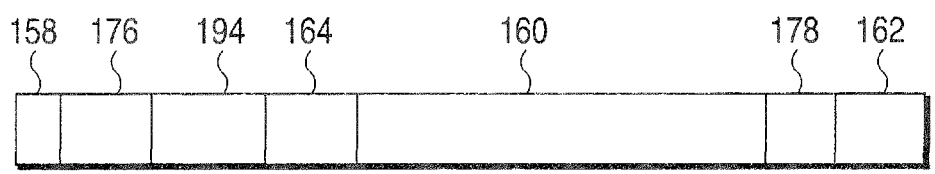
FIG. 49C is a diagram showing a further example of the data format of the transmission data signal from the remote controller.
Figure 49D:
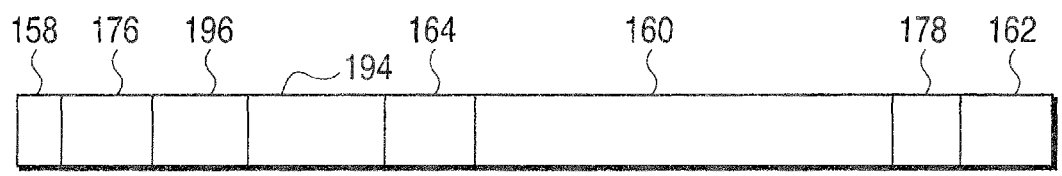
FIG. 49D is a diagram showing another example of the data format of the transmission data signal from the remote controller.
Figure 49E:
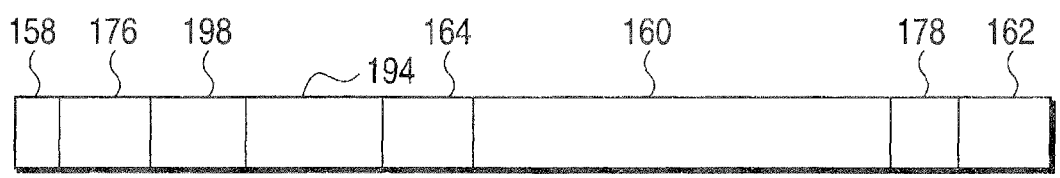
FIG. 49E is a diagram showing another example of the data format of the transmission data signal from the remote controller.

FIGS. 49A to 49C are diagrams showing the format of the transmission data for a command containing a function range designation information 194 from the optical remote controller 12, 74 or 96 or the radio remote controller 182 that is the remote controller with the authentication information. Also, FIG. 49D is a diagram showing the data format of a command containing the function range designation information 194 and a count 196 on the counter 148D as explained above in the fifth embodiment. FIG. 49E is a diagram showing the data format of a command containing the function range designation information 194 and an ID information 198. The function range designation information 194, the count 196 and the ID information 198, though explained below in the form added to the data format of the transmission data from the optical remote controller 12, 74 or 96 or the radio remote controller 182 that is the remote controller with the authentication information, may alternatively be contained, together with the command, in the n bytes of the data portion 160. Also, the identification information 164 can be transmitted in the form contained in the data portion 160 in FIG. 49A; in the header 176 or the data portion 160 in FIGS. 49B and 49C; in the header 176, the header 176, the count 196 or the data portion 160 in FIG. 49D; and in the header 176, the ID information 198 or the data portion 160 in FIG. 49E.

FIG. 49A is a diagram showing a case in which the function range designation information 194 for designating the range of the available functions is contained in the command, for example, in the authentication mode switching command. As this function range designation information 194, the limit flag of the function limit table shown in FIG. 30 may be used in correspondence in units of bits or bytes. FIG. 49B shows a case in which the header 176 and the function range designation information 194 are contained, FIG. 49C a case in which the header 176, the function range designation information 194 and the ECC 178 are contained, FIG. 49D a case in which the header 176, the count 196, the function range designation information 194 and the ECC 178 are contained, and FIG. 49E a case in which the header 176, ID information 198 unique to the device such as the serial number, the function range designation, information 194 and the ECC 178 are contained. The ID information 198 shown in FIG. 49E may be any data by which the device can be recognized, such as the serial numbers of both the optical remote controller 12, 74 or 96 or the radio remote controller 182 that is the remote controller with the authentication information and the camera proper 14, the serial number or the date or place of manufacture, the model name, the random character string, etc. Incidentally, as the ID information 196 with the format shown in FIG. 49E, the information unique to the commanding device can be used as well as the information unique to the image acquisition device received from the image acquisition device. Also, the variable information received from the image acquisition device can be used as the identification information. In this way, the commands of the commanding device can be variously combined.

As described above, according to the sixth embodiment of the invention, the image acquisition operation can be performed at any time by any person for an improved operability on the one hand, and the security of the other functions such as reproduction and copying is maintained on the other hand.

Also, by containing the function range designation information 194 in the command, or especially, in the authentication mode switching command, the user can arbitrarily designate the range of the available functions.

Also, since the authentication information contains the ID information unique to the camera proper 14, no malfunction occurs even in the case where there are a plurality of cameras proper 14 of the same configuration.

Incidentally, each commands for the image acquisition device contains the authentication information described above, and therefore, can be positively identified and executed.

Seventh Embodiment

Next, a seventh embodiment of the invention will be explained.

In order to reduce the predictability of the identification information and improve the security of the identification information, according to this embodiment, the information derived from the image information calculated based on the image information stored in the built-in memory 110 or the removable memory 112 is used as the identification information generated by the identification information generating unit 116A of the main control unit 116 of the camera proper 14. This information derived from the image information can be calculated by the identification information generating unit 116A according to the method using simple image compression such as data compression by two-dimensional sampling, specific bit plane data of the image or a combination thereof. Further, the partial image compression by the image processing circuit 126 or the encryption of a part of the image by the encryption/decryption circuit 128 may be used.

Now, this process will be explained with reference to FIGS. 50 to 52.

An original image 200 shown in FIG. 50 is one of the images stored in the built-in memory 110 or the removable memory 112. Image sizes are various. In FIG. 50, for example, 640 pixels are arranged along each row and 480 pixels along each column. The use of the whole image data as the identification information is inefficient from the viewpoint of the storage capacity or the transmission/reception time, and therefore, a part of the image is used or the data is compressed by some method or both methods are combined to generate the information derived from the image information as the identification information.

FIG. 51 is a diagram showing image-derived data 202 as an example of the information derived from the image information. The original image 200 shown in FIG. 50 is segmented into eight small areas along the rows and six small areas along the columns, and, as shown in FIG. 50, the small areas (each having 80 pixels along the rows) thus segmented are numbered 1 to 48 from the top left to the bottom right. Then, 48 data are generated by determining the average value of the pixels in each area or by determining the pixel data at a specified position in each small area as a representative value thereof thereby to generate the image-derived data 202. As an alternative, as shown in FIG. 52, the value of the least significant bit (1 or 0) of the pixel at a specified position in each small area is determined with the first, small area as bit 1, and 48 bits are assigned to the small areas up to the small area number 48 as the 48-bit image-derived data 202. The size of the original image and the information derived from the image information described above are an example. Also, in the case where the image information has yet to be recorded in the built-in memory 110 or the removable memory 112 as an image memory, a sample of the image, if any, stored in a memory (not shown) in the main control unit 116 may be used or a default value may be held in advance.

Next, a method of utilizing the information derived from the image information will be explained with reference to FIG. 53.

In the case where new identification information is transmitted, the identification information generating unit 116A of the main control unit 116 of the camera proper 14 first selects the original image (step ST26). Next, while using the CPU of the main control unit 116 or the image processing circuit 126 as required, the image-derived information is extracted by a method such as image compression and held in a nonvolatile memory such as a mode memory 134 (step ST28). Then, the main control unit 116 transmits the image-derived information to the commanding device as the identification information or a part thereof (step ST30).

In the optical remote controller 12, 74 or 96 or the radio remote controller 182 that is the remote controller with the authentication information, upon reception of the identification information containing the information derived from the image information transmitted from the camera proper 14, the CPU of the control unit 148 is interrupted. The control unit 148 stores the received identification information in the nonvolatile memory of the authentication information generating unit 148A, or overwrites it on the data, if any, received before (step ST32). At the time of transmitting the command with the authentication information (authentication command), the control unit 148 transmits it with the identification information received and stored (step ST34).

The CPU of the main control unit 116 is interrupted upon reception of the authentication command by the camera proper 14. The main control unit 116 extracts the identification information contained in the received authentication command (step ST36), and compares the extracted identification information with the image-derived identification information in store (step ST38). In the case where both coincide with each other, the particular command is executed (step ST40), while in the case of incoincidence, on the other hand, the command is ignored and the process returns to the state before interruption (step ST42). Incidentally, an alarm may be issued with a sound or light before returning to the state before interruption. Steps ST36 and ST38 correspond to steps S216 and S218 shown in FIG. 34D.

As described above, according to the seventh embodiment of the invention, the predictability of the identification information is suppressed to a low level and, therefore, the command can be transmitted and received with higher safety.

Eighth Embodiment

Next, an eighth embodiment of the invention will be explained.

This embodiment includes structures capable of confirming whether the identification information has been securely received from the intended camera when the commanding device receives it from the camera proper 14.

The same information as the unique information stored in the unique information storage unit 116B of the main control unit 116 of the camera proper 14 is stored in the fixed information storage unit 138B of the control unit 148 of the commanding device. The information of the unique information storage unit 116B of the main control unit 116 of the camera proper 14 is contained in the identification information which may be transmitted, as explained in FIGS. 21 to 26C, to the optical remote controller 12, 74 or 96 that is the remote controller with the authentication information from the camera proper 14. On the remote controller side, the received unique information of the camera proper 14 is compared with the corresponding unique information of the camera proper 14 stored in the remote controller, and only in the case of coincidence is the particular identification information from the intended camera proper 14 regarded as effective.

As described above, the eighth embodiment of the invention makes it possible to determine whether the identification information is that transmitted from the intended image acquisition device or not, and therefore, the identification information can be transmitted/received with higher safety.

Ninth Embodiment

Next, a ninth embodiment of the invention will be explained.

In this embodiment, the information derived from the identification information calculated based on the identification information sent from the camera proper 14 is used as the identification information generated by the authentication information generating unit 148A of the control unit 148 of the optical remote controller 12, 74 or 96 or the radio remote controller 182 that is the remote controller with the authentication information.

A method of utilizing the information derived from the identification information according to this embodiment will be explained with reference to FIG. 54.

The identification information is transmitted from the camera proper 14 to the optical remote controller 12, 74 or 96 or the radio remote controller 182 that is the remote controller with the authentication information (step ST12).

Upon reception of this identification information by the remote controller 12, 74, 96 or 182 with the authentication information, the CPU of the control unit 148 is interrupted, and the control unit 148 stores the received identification information in the authentication information generating unit 148A (step ST44). Then, the authentication information generating unit 148A generates and holds the information derived from the identification information according to a predetermined rule such as encryption, bit shift or arithmetic operation by the hash function (step ST46). The authentication command, if transmitted to the camera proper 14, contains the information derived from the identification information stored therein (step ST48).

Upon reception of the authentication command by the camera proper 14, the CPU of the main control unit 116 is interrupted, and the main control unit 116 extracts the information derived from the identification information contained in the received authentication command (step ST50). Then, the decryption, the bit shift or the arithmetic operation is conducted with the hash function on the identification information transmitted in step ST12 in the manner corresponding to the arithmetic operation in the remote controller 12, 74, 96 or 182 to check whether the result is coincident or not (step ST52). In the case where both are coincident, the command is executed (step ST40), while in the case of incoincidence, the result is ignored and the state before interruption is restored (step ST42). Incidentally, before returning to the state before interruption, an alarm may be generated with a sound or light. Steps ST50 and ST52 correspond to steps S216 and S218 in FIG. 34D.

As described above, according to the ninth embodiment of the invention, the identification information is utilized by being converted according to a predetermined rule, and therefore, the predictability of the information derived from the identification information contained in the authentication command can be suppressed, thereby making it possible to transmit/receive the command with higher safety.

Tenth Embodiment

Next, a tenth embodiment of the invention will be explained.

According to this embodiment, the information unique to the commanding device stored in the unique information storage unit 148B of the control unit 148 of the commanding device is attached, in addition to the identification information, to the command transmitted from the commanding device to the camera proper 14. The unique information of the commanding device is stored also in the unique information storage unit 116B of the camera to determine the coincidence or incoincidence at the time of receiving the command.

As a result, the camera proper 14 can confirm more positively whether the command is the one from the commanding device corresponding to the particular camera proper 14 or not. Also, according to this method, the remote controller can be identified simply by providing the unique information storage unit on both the remote controller and the camera proper 14 regardless of the optical remote controller 92 or 94 or the common remote controller lacking the authentication function.

The information unique to the remote controller can be transmitted either in the form contained in the data section 160 having the command data format shown in FIGS. 24A to 26C, the n-byte data section 160 shown in FIGS. 49A to 49E or the header 176.

As described above, according to the tenth embodiment of the invention, the remote controller corresponding to the camera proper 14 can be identified more positively by the transmission/reception of the unique information of the remote controller, thereby making possible the command transmission/reception with higher safety.

Eleventh Embodiment

Next, an eleventh embodiment of the invention will be explained.

This embodiment represents a case in which the identification information is transmitted from the image acquisition device to the commanding device in response to the identification information transmission command or the prohibit mode command sent from the commanding device to the image acquisition device. This corresponds to the cause B or the cause C in FIG. 21.

According to this embodiment, an optical remote controller 204 capable of transmitting the identification information transmission command as shown in FIG. 55 is used. This optical remote controller 204 takes the form in which an identification information transmission command button 206 is added to the optical remote controller 96 for the camera as an example of the authentication command remote controller shown in FIG. 9. Further, a lamp 208 and a speaker 210 used in a thirteenth embodiment described later are added.

In this optical remote controller 204, upon depression of the identification information transmission command button 206, the Identification information transmission command is sent from the light-emitting unit 58. The transmission data has such a form that a telegraphic message such as "ZZID-INFOTRANSMISSION" is inserted, in place of the data section 160 shown in FIGS. 25A to 25C or the authentication mode switching command data 180 shown in FIGS. 26A to 26C as an authentication command, or in the n-byte portion of the data section 160 shown in FIGS. 49A to 49E. Incidentally, this telegraphic message may be a sentence not encrypted, but is preferably encrypted.

Next, an example of the electrical configuration of the optical remote controller 204 will be explained with reference to FIG. 56.

Upon depression of the identification information transmission command button 206, the identification information transmission command is transmitted from the light-emitting unit 58. Also, as explained later, a power supply is connected to the lamp 208 through a current-limiting resistor 212 to turn on the lamp 208 under the control of the control unit 148. Also, a sound is generated from the speaker 210 through a drive unit 214 by the signal from the control unit 148. The other functions are similar to those explained with reference to FIG. 16.

Figure 57:
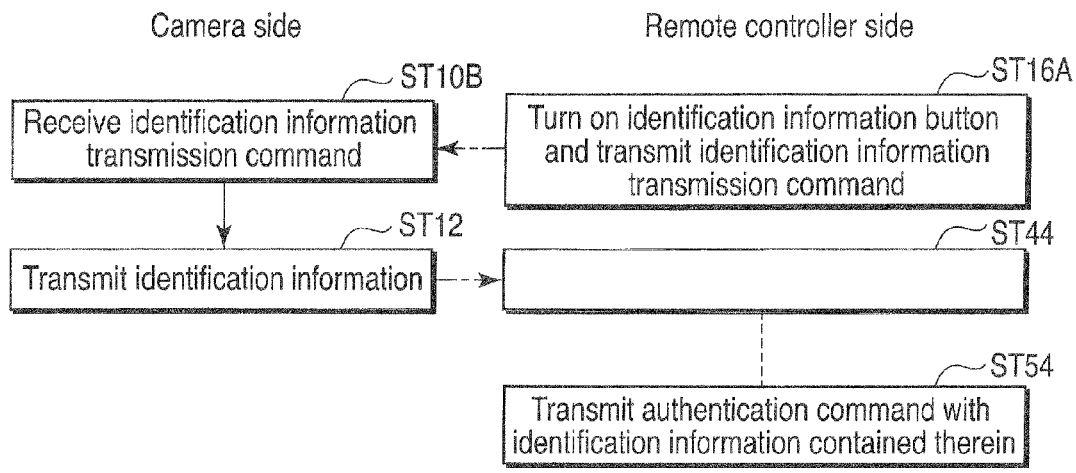
FIG. 57 is a diagram showing a flowchart for explaining the transmission of the identification information in response to the reception of an identification information transmission command for the cause B in FIG. 21.

Next, the transmission of the identification information in response to the reception of the identification information transmission command with the cause B in FIG. 21 will be explained with reference to FIG. 57.

Specifically, upon depression of the identification information transmission command button 206 of the optical remote controller 204 that is the authentication remote controller, the identification information transmission command is transmitted from the optical remote controller 204 (step ST16A).

In the camera proper 14, upon reception of the identification information transmission command thus transmitted, the CPU of the main control unit 116 is interrupted (step ST10B) and the identification information is transmitted (step ST12).

Upon reception of the identification information in the optical remote controller 204, the CPU of the control unit 148 is interrupted, and the control unit 148 stores the received identification information in the authentication information generating unit 148A (step ST44). Subsequently, at the time of transmitting the authentication command, the identification information thus stored is contained in the authentication command (step ST54).

Incidentally, a similar operation can of course be performed by adding the identification information transmission command button 206 to another remote controller with the authentication information (the optical remote controller 12, 74 or 96 or the radio remote controller 182).

Figure 58:
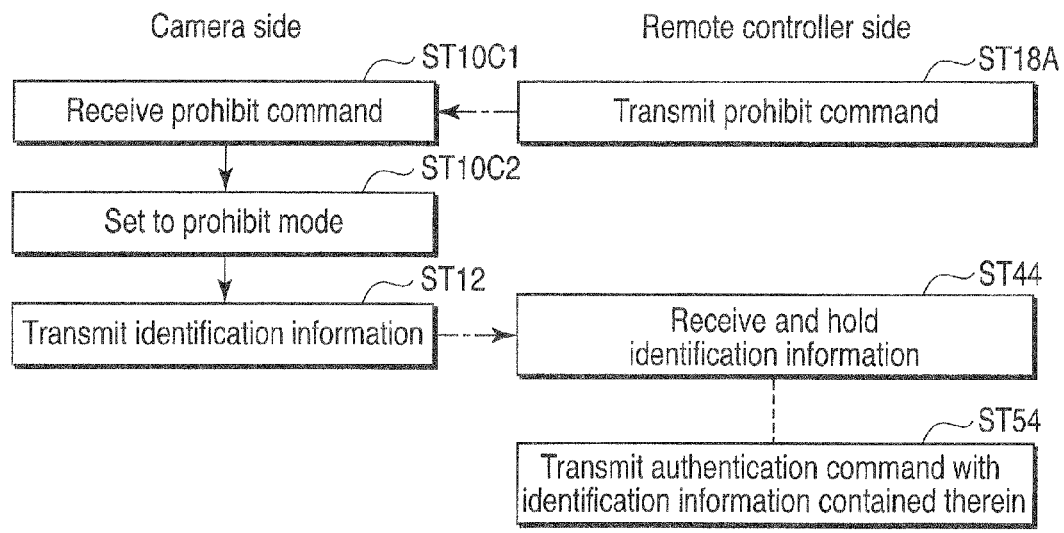
FIG. 58 is a diagram showing a flowchart for explaining the transmission of the identification information in response to the reception of a prohibit mode command for the cause C in FIG. 21.

Next, the transmission of the identification information in response to the reception of the prohibit mode command with the cause C shown in FIG. 21 will be explained with reference to FIG. 58. Specifically, in the case where the prohibit mode command is transmitted from the optical remote controller 12, 74, 96 or 204 or the radio remote controller 182 that is the remote controller with the authentication information (step ST18A) and received by the camera proper 14, then the CPU of the main control unit 116 is interrupted (step ST10C1). The main control unit 116 sets the prohibit mode (step ST10C2) and transmits the identification information to the remote controller (step ST12).

In the remote controller 12, 74, 96, 182 or 204, upon reception of the identification information, the CPU of the control unit 148 is interrupted, and the control unit 148 stores the received identification information in the authentication information generating unit 148A (step ST44). Subsequently at the time of transmitting the authentication command, the identification information thus stored is contained in the authentication command (step ST54).

As described above, according to the eleventh embodiment of the invention, the identification information transmission command from the remote controller is sent to the camera whenever desired, so that the remote controller receives and uses the new identification information. In this way, the risk of the illegal use which otherwise might be caused by the wiretapping of the past identification information is reduced and the command can be transmitted/received with higher safety.

Also, the aforementioned effect is produced by receiving the new identification information from the camera proper 14 in response to the prohibit mode command from the remote controller, i.e. when the camera is locked.

Twelfth Embodiment

Next, a twelfth embodiment of the invention will be explained.

Figure 59:
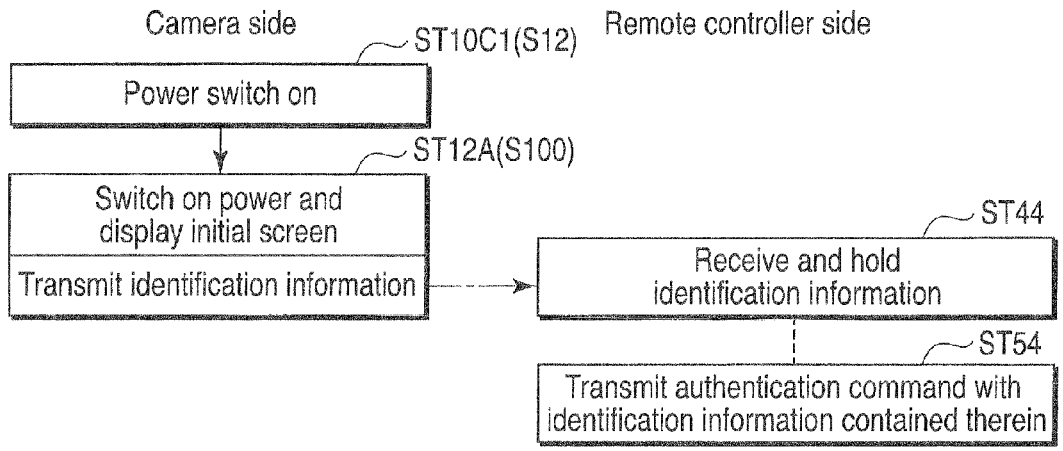
FIG. 59 is a diagram showing a flowchart for explaining the transmission of the identification information corresponding to the power-on state for the cause D in FIG. 21 according to a twelfth embodiment of the invention.

According to this embodiment, the transmission of the identification information in response to switching on power with the cause D shown in FIG. 21 will be explained with reference to FIG. 59.

Specifically, once the power switch 30 of the camera proper 14 is turned on (step ST10D), the main control unit 116 switches on the power supply and displays the initial screen while at the same time transmitting the identification information (step ST12A).

In the optical remote controller 12, 74, 96 or 204 or the radio remote controller 182 that is the remote controller with the authentication information, the CPU of the control unit 148 is interrupted upon reception of the identification information. The control unit 148 holds the received identification information in the authentication information generating unit 148A (step ST44). The authentication command, if transmitted subsequently, contains the identification information thus held (step ST54).

Step ST10D described above corresponds to step S12 shown in FIG. 34A, and step ST12A to a part of step S100 shown in FIG. 34A. Incidentally, the message such as "identification information in transmission" may be displayed on the monitor 38 in the initial screen display state thereof. Further, an arrangement may be made in which the process is not passed to the next step during display, and in combination with the display on the remote controller as in the thirteenth embodiment described later, the OK button 42 is depressed upon confirmation of the reception from the remote controller, followed by proceeding to the next step.

As explained above, according to the twelfth embodiment of the invention, the remote controller receives and uses the identification information each time the power of the camera proper 14 is switched on. In this way, the risk of illegal use which otherwise might be caused by wiretapping of the past identification information can be reduced to assure the command transmission and reception with higher safety.

Thirteenth Embodiment

Next, a thirteenth embodiment of the invention will be explained.

Figure 56:
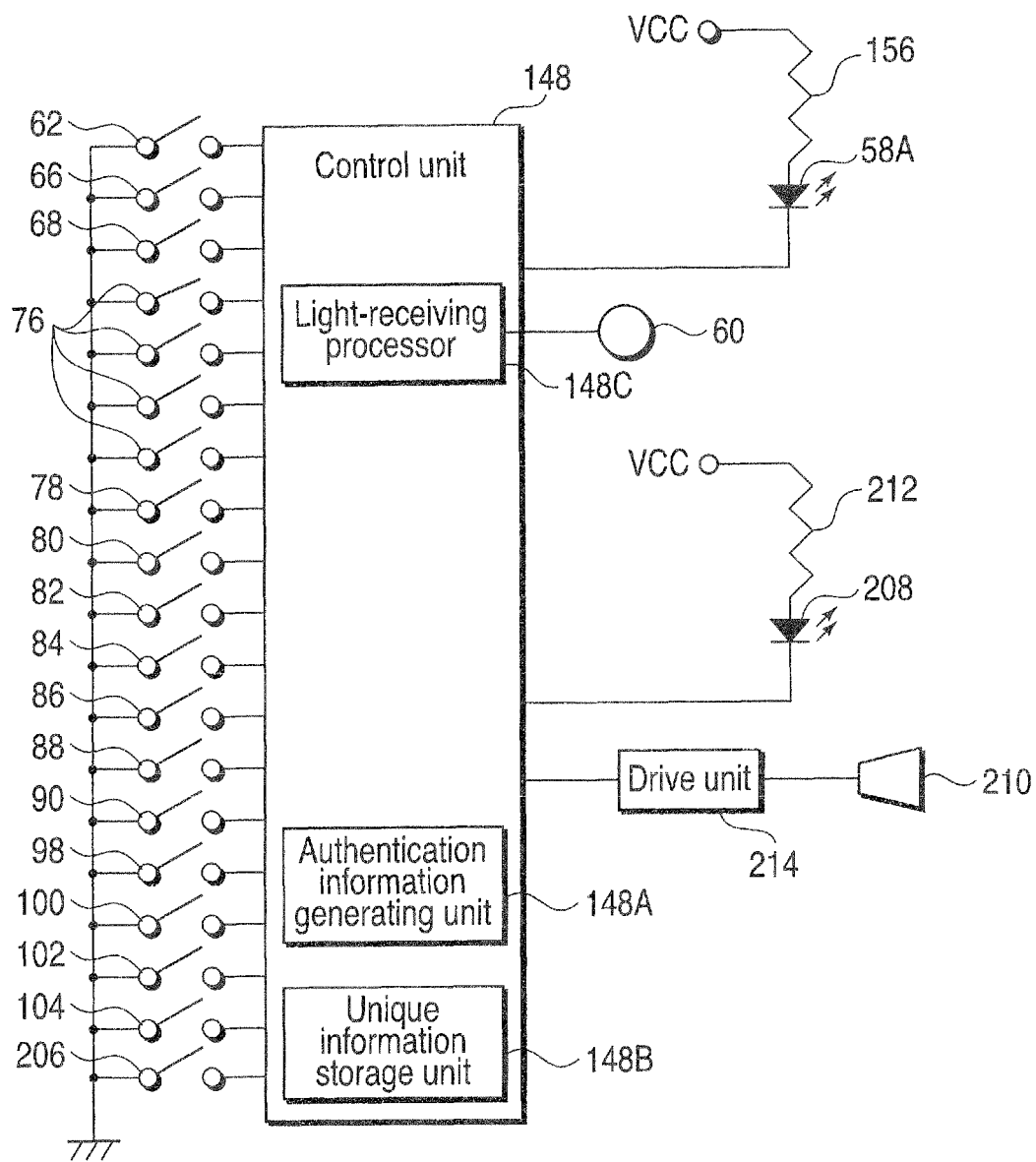
FIG. 56 is a block diagram showing an example of the electrical configuration of the optical remote controller shown in FIG. 55.

According to this embodiment, an optical remote controller 204 having a lamp 208 and a speaker 210 as shown in FIGS. 55 and 56 is used to announce that the identification information has been received from the camera proper 14.

Figure 60:
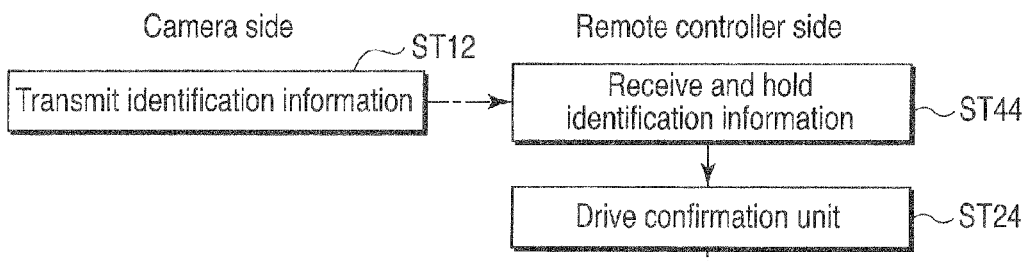
FIG. 60 is a diagram showing a flowchart for explaining the function to announce that the identification information has been received by the remote controller from the camera proper according to a thirteenth embodiment of the invention.

As shown in FIG. 60, assume that the identification information is transmitted from the camera proper 14 (step ST12) and received by the optical remote controller 204 that is the remote controller with the authentication information. Then, the CPU of the control unit 148 is interrupted. The control unit 148 holds the received identification information in the authentication information generating unit 148A (step ST44). Then, the lamp 208 is turned on and/or the speaker 210 is driven to announce that the identification information has been securely received and is held securely (step ST24). The authentication command, when transmitted subsequently, contains the identification information thus held.

As described above, according to the thirteenth embodiment of the invention, the remote controller with the authentication information can confirm that the identification information has been securely received from the camera proper 14. Should normal transmission or reception fail, therefore, a countermeasure such as retransmission can be easily carried out to assure command transmission and reception with higher safety.

Incidentally, a similar operation can of course be performed also in the case where the lamp 208 and the speaker 210 are added to another remote controller with the authentication information (the optical remote controller 12, 74 or 96 or the radio remote controller 132).

Fourteenth Embodiment

Next, a fourteenth embodiment of the invention will be explained.

According to this embodiment, the identification information transmitted from the camera proper 14 to the remote controller is returned again to the camera proper 14 to assure coincidence, thereby to further improve the reliability of the identification information.

Figure 61:
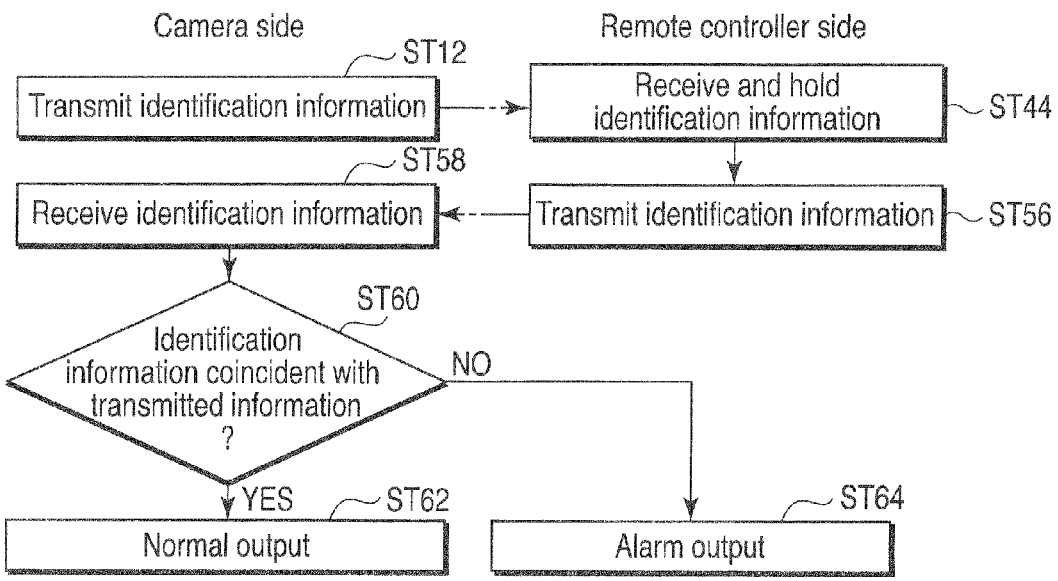
FIG. 61 is a diagram showing a flowchart for explaining the coincidence confirmation function according to a fourteenth embodiment of the invention.

This coincidence confirmation function will be explained with reference to FIG. 61. The camera proper 14 has the function to transmit the identification information and the function to receive the command from the remote controller. The remote controller also has the function to transmit the command and the function to receive the identification information.

In the case where the camera proper 14 transmits the identification information (step ST12) and the optical remote controller 12, 74, 96 or 204 or the radio remote controller 182 that is the remote controller with the authentication information receives the identification information, then the CPU of the control unit 148 is interrupted. The control unit 148 holds the received identification information in the authentication information generating unit 148A (step ST44). Then, the identification information thus received and held is transmitted to the camera proper 14 (step ST56).

In the case where the camera proper 14 receives the identification information, the CPU of the main control unit 116 is interrupted (step ST58). The main control unit 116 compares the received identification information with the transmitted identification information (step ST60), and if they coincide with each other, announces the normal transmission and reception using the light-emitting element 22, the speaker 52 or the monitor 38 (step ST62). In the case of incoincidence, on the other hand, an error is announced in a different pattern than normal using the light-emitting element 22, the speaker 52 or the monitor 38 (step ST64).

As described above, according to the fourteenth embodiment of the invention, the coincidence is taken by transmitting and returning the identification information, and therefore, the identification information can be transmitted/received more positively to ensure command transmission and reception with higher safety.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image acquisition system comprising:
    an image acquisition device having a image acquisition unit; and
    a remote controller configured as a member separate from the image acquisition device and adapted to transmit a command to the image acquisition device to control the image acquisition device, thereby permitting the image acquisition device to perform an operation corresponding to the command;
    wherein the image acquisition device includes an identification information transmission unit configured to transmit identification information to the remote controller to permit the image acquisition device to identify the remote controller;
    wherein the remote controller includes:
        an identification information receiving unit configured to receive the identification information transmitted from the image acquisition device; and
        a command transmission unit configured to transmit a command to control the image acquisition device as an authentication command containing authentication information for permitting the image acquisition device to authenticate the remote controller, the authentication information containing one of the identification information and information derived from the identification information received by the identification information receiving unit; and
    wherein the image acquisition device further includes:
        a command receiving unit configured to receive the authentication command transmitted from the command transmission unit of the remote controller;
        an authentication information recognition unit configured to recognize the authentication information contained in the authentication command received by the command receiving unit and containing the one of the identification information and the information derived from the identification information;
        a function limiting unit configured to limit a predetermined function of the image acquisition device based on the authentication information recognized by the authentication information recognition unit;
        a command determination unit configured to determine the content of the authentication command received by the command receiving unit; and
        a mode setting unit configured to, in the case where the content of the authentication command determined by the command determining unit is an authentication mode switching command for giving a command to switch an authentication mode for the image acquisition device, set the authentication mode of the image acquisition device in accordance with the authentication mode switching command; and
    wherein the function limiting unit of the image acquisition device limits the function of the image acquisition device in accordance with the authentication mode set by the mode setting unit.

2. The image acquisition system according to claim 1, wherein the image acquisition device further includes an image output unit configured to output an image acquired by the image acquisition unit, and the function limiting unit of the image acquisition device limits the functions for the image output unit.

3. The image acquisition system according to claim 1, wherein the identification information transmitted by the identification information transmission unit of the image acquisition device is variable.

4. The image acquisition system according to claim 1, wherein the identification information transmitted by the identification information transmission unit of the image acquisition device is encrypted.

5. The image acquisition system according to claim 1, wherein the identification information transmitted by the identification information transmission unit of the image acquisition device is one of an image acquired by the image acquisition device and information derived from the image.

6. The image acquisition system according to claim 1, wherein the identification information transmitted by the identification information transmission unit of the image acquisition device contains information unique to the image acquisition device.

7. The image acquisition system according to claim 6, wherein the remote controller further includes:
    a storage unit configured to store information which is the same as the information unique to the image acquisition device; and
    a comparator unit configured to compare the information unique to the image acquisition device contained in the identification information received by the identification information receiving unit with the information stored in the storage unit.

8. The image acquisition system according to claim 1, wherein the information derived from the identification information contained in the authentication information contained in the authentication command transmitted by the command transmission unit of the remote controller is the identification information received by the identification information receiving unit and converted according to a predetermined rule.

9. The image acquisition system according to claim 1, wherein:
    the command transmission unit of the remote controller transmits the authentication command containing information unique to the remote controller, and
    the image acquisition device further includes:
        a storage unit configured to store information which is the same as the information unique to the remote controller; and
        a comparator unit configured to compare the information unique to the remote controller contained in the authentication command received by the command receiving unit with the information stored in the storage unit.

10. The image acquisition system according to claim 3, wherein the identification information which is variable includes invariable information unique to the image acquisition device and variable identification information which is variable.

11. The image acquisition system according to claim 10, wherein the command transmission unit of the remote controller regards, as the information derived from the identification information contained in the authentication information, the variable identification information contained in the identification information received by the identification information receiving unit and information unique to the remote controller.

12. The image acquisition system according to claim 1, wherein the image acquisition device further includes:
   a random number generating unit configured to generate a random number; and
   an identification information generating unit configured to generate identification information containing the random number generated by the random number generating unit as the identification information transmitted by the identification information transmission unit.

13. The image acquisition system according to claim 1, wherein the image acquisition device further includes an identification information generating unit configured to generate identification information containing data selected from a prestored table as the identification information transmitted to the remote controller.

14. The image acquisition system according to claim 1, wherein:
   the remote controller further includes a remote controller-side counting unit configured to start a counting operation from a time of receiving the identification information by the identification information receiving unit,
   the command transmission unit of the remote controller transmits the authentication command containing a count value of the remote controller-side counting unit when transmitting the authentication command after receiving the identification information,
   the image acquisition device further includes:
      an image acquisition device-side counting unit configured to start a counting operation with the transmission of the identification information by the identification information transmission unit as a starting point; and
      a comparator unit configured to compare, upon reception of the authentication command by the command reception unit, the count value of the remote controller-side counting unit contained in the received authentication command with a count value of the image acquisition device-side counting unit, and
   the function limiting unit of the image acquisition device sets a limit to the function based on a comparison result of the comparator unit.

15. The image acquisition system according to claim 1, wherein the image acquisition device further includes an identification information transmission command unit configured to give a transmission command to transmit the identification information, and the identification information transmission unit of the image acquisition device transmits the identification information in response to the transmission command from the identification information transmission command unit.

16. The image acquisition system according to claim 1, wherein the command transmission unit of the remote controller further includes an identification information transmission command transmission unit configured to transmit an identification information transmission command to instruct the image acquisition device to transmit the identification information, and the identification information transmission unit of the image acquisition device transmits the identification information in accordance with reception of the identification information transmission command transmitted from the identification information transmission command transmission unit of the remote controller.

17. The image acquisition system according to claim 1, wherein the image acquisition device is operable in a plurality of modes including a prohibit mode in which execution of functions of the image acquisition device are not permitted by any operation other than operation by the remote controller, and the identification information transmission unit of the image acquisition device transmits the identification information at a time of switching to the prohibit mode in accordance with a prohibit mode switching command received from the command transmission unit of the remote controller to switch to the prohibit mode.

18. The image acquisition system according to claim 1, wherein the identification information transmission unit of the image acquisition device transmits the identification information while a power supply of the image acquisition device is turned on.

19. The image acquisition system according to claim 1, wherein the remote controller further includes a confirmation unit configured to announce reception, if any, of the identification information by the identification information receiving unit from the image acquisition device.

20. The image acquisition system according to claim 1, wherein the remote controller further includes an identification information returning unit configured to return, to the image acquisition device, the identification information received from the image acquisition device by the identification information receiving unit, and the image acquisition device further includes a confirmation unit configured to compare the identification information returned by the identification information returning unit of the remote controller with the identification information transmitted by the identification information transmission unit, and to output the comparison result.

21. The image acquisition system according to claim 1, wherein the command transmission unit of the remote controller transmits, to the image acquisition device, the command to control the image acquisition device as one of the authentication command and a general command without the authentication information.

22. The image acquisition system according to claim 1, wherein the remote controller transmits, as the authentication command, the authentication mode switching command for limiting the function by the function limiting unit of the image acquisition device and an image acquisition command for an image acquisition operation of the image acquisition device.

23. The image acquisition system according to claim 21, wherein the remote controller further includes a switching unit configured to switch the general command and the authentication command to be transmitted by the command transmission unit.

24. The image acquisition system according to claim 21, wherein the command transmission unit of the remote controller transmits an image acquisition command for an image acquisition operation of the image acquisition device as the general command, and the authentication mode switching command for limiting the function by the function limiting unit of the image acquisition device as the authentication command.

25. The image acquisition system according to claim 24, wherein the remote controller further includes a switching unit configured to switch the general command and the authentication mode switching command to be transmitted by the command transmission unit.

26. The image acquisition system according to claim 1, wherein the function limiting unit of the image acquisition device limits the function of the image acquisition device in accordance with the content of the authentication command determined by the command determination unit.

27. The image acquisition system according to claim 1, wherein the mode setting unit of the image acquisition device further sets a prohibit mode as the authentication mode at a time of switching on power for the image acquisition device, and the function limiting unit of the image acquisition device prohibits the image acquisition device from execution of the functions thereof by other than the remote controller in the case where the prohibit mode is set by the mode setting unit.

28. The image acquisition system according to claim 1, wherein the mode setting unit of the image acquisition device has a memory configured to store a currently set authentication mode at a time of switching off power of the image acquisition device.

29. The image acquisition system according to claim 28, wherein the memory of the mode setting unit of the image acquisition device comprises a nonvolatile memory capable of holding its storage contents even in the case where the power is switched off.

30. The image acquisition system according to claim 28, wherein the mode setting unit of the image acquisition device further reads the authentication mode stored in the memory and sets the authentication mode at a time of switching on the power of the image acquisition device.

31. The image acquisition system according to claim 1, wherein the mode setting unit of the image acquisition device sets the authentication mode only in response to the authentication mode switching command from the remote controller.

32. The image acquisition system according to claim 1, wherein the image acquisition device further includes a time measuring unit configured to count time, the mode setting unit of the image acquisition device further sets a prohibit mode as the authentication mode based on the time counted by the time measuring unit, and the function limiting unit of the image acquisition device prohibits the image acquisition device from execution of the functions thereof by other than the remote controller in the case where the prohibit mode is set by the mode setting unit.

33. The image acquisition system according to claim 32, wherein the time measuring unit of the image acquisition device continues to count the time even after power of the image acquisition device is switched off, and the mode setting unit of the image acquisition device sets the prohibit mode upon counting of a predetermined time by the time measuring unit.

34. The image acquisition system according to claim 1, wherein the mode setting unit of the image acquisition device sets the authentication mode to a prohibit mode one of immediately, upon elapse of a preset time and in accordance with a result of a voltage monitor, in the case where a battery is one of consumed and removed, and the function limiting unit of the image acquisition device prohibits execution of the function of the image acquisition device by other than the remote controller in the case where the prohibit mode is set by the mode setting unit.

35. The image acquisition system according to claim 1, wherein the authentication command is transmitted one of optically and by radio.

36. The image acquisition system according to claim 1, further comprising, in addition to the remote controller having the command transmission unit configured to transmit the authentication command, a remote controller lacking the command transmission unit but having a general command transmission unit configured to transmit a general command which is a command without the authentication information, and wherein the function limiting unit of the image acquisition device permits a predetermined function of the image acquisition device only in a range permitted in advance for the general command.

37. The image acquisition system according to claim 1, wherein the image acquisition device further includes a built-in memory, and the function limiting unit of the image acquisition device causes an acquired image to be stored only in the built-in memory in the case where a prohibit mode prohibiting the execution of the function of the image acquisition device by other than the remote controller is set as the authentication mode by the mode setting unit and in the case where an image acquisition operation is performed by the image acquisition unit based on the authentication command from the remote controller identified by the command identification unit.

38. The image acquisition system according to claim 1, wherein the image acquisition device further includes a built-in memory, and the function limiting unit of the image acquisition device, in an operation of one of reading, displaying, copying, moving and printing an image stored in the built-in memory, limits the operation to be performed only in response to the authentication command from the remote controller authenticated by the authentication information recognized by the authentication information recognition unit.

39. The image acquisition system according to claim 38, wherein the image acquisition device is configured to mount a removable memory thereon, and the image stored in the built-in memory, if one of copied and moved to the removable memory, is encrypted and stored in the removable memory.

40. The image acquisition system according to claim 39, wherein the remote controller further includes a selecting unit configured to select whether the image acquired by the image acquisition unit is recorded in the built-in memory or in the removable memory.

41. The image acquisition system according to claim 1, wherein the function limiting unit of the image acquisition device is adapted not to limit a function for an image acquisition operation of the image acquisition unit regardless of a recognition result of the authentication information by the authentication information recognition unit, and adapted to limit other functions based on authentication information added to the authentication command received by the command receiving unit and recognized by the authentication information recognition unit.

42. The image acquisition system according to claim 41, wherein the command transmission unit of the remote controller transmits the authentication command further with function range information designating a limited range of a function, and the function limiting unit of the image acquisition device limits the function in accordance with the function range information added to the authentication command received by the command receiving unit.

43. A method of authentication for an image acquisition device between the image acquisition device and a remote controller configured as a member separate from the image acquisition device for transmitting a command to the image acquisition device to control the image acquisition device, thereby permitting the image acquisition device to perform an operation corresponding to the command, the method comprising:

transmitting identification information from the image acquisition device to the remote controller to permit the image acquisition device to identify the remote controller;

in the remote controller, receiving the identification information transmitted by the image acquisition device, and transmitting, to the image acquisition device, an authentication command containing authentication information which contains one of the received identification information and information derived from the identification information and which permits the image acquisition device to authenticate the remote controller; and in the image acquisition device:

receiving the authentication command transmitted from the remote controller;

recognizing the authentication information contained in the received authentication command containing the one of the received identification information and the information derived from the identification information;

limiting a predetermined function of the image acquisition device based on the recognized authentication information;

determining the content of the received authentication command; and in the case where the content of the received authentication command is determined to be an authentication mode switching command for giving a command to switch an authentication mode for the image acquisition device, setting the authentication mode of the image acquisition device in accordance with the received authentication mode switching command;

wherein the predetermined function of the image acquisition device is limited in the limiting in accordance with the set authentication mode.

* * * * *